(12) United States Patent
Garbajs et al.

(10) Patent No.: US 8,359,392 B2
(45) Date of Patent: Jan. 22, 2013

(54) SYSTEM AND METHOD FOR SECURELY COMMUNICATING ON-DEMAND CONTENT FROM CLOSED NETWORK TO DEDICATED DEVICES, AND FOR COMPILING CONTENT USAGE DATA IN CLOSED NETWORK SECURELY COMMUNICATING CONTENT TO DEDICATED DEVICES

(75) Inventors: Gregor Garbajs, Ljubljana (SI); Gregor Zebic, Trzin (SI)

(73) Assignee: Gregor Zebic, Trzin (SI)

( * ) Notice: Subject to any disclaimer, the term of this patent is extended or adjusted under 35 U.S.C. 154(b) by 362 days.

(21) Appl. No.: 12/668,340

(22) PCT Filed: Jul. 9, 2008

(86) PCT No.: PCT/IB2008/003397
§ 371 (c)(1),
(2), (4) Date: Jun. 3, 2010

(87) PCT Pub. No.: WO2009/037582
PCT Pub. Date: Mar. 26, 2009

(65) Prior Publication Data
US 2010/0241753 A1    Sep. 23, 2010

Related U.S. Application Data

(60) Provisional application No. 60/929,698, filed on Jul. 9, 2007, provisional application No. 60/935,240, filed on Aug. 1, 2007.

(51) Int. Cl.
*G06F 15/16* (2006.01)
(52) U.S. Cl. .......... 709/227; 709/225; 709/226; 725/87; 725/91; 725/109; 725/110; 380/229; 380/255
(58) Field of Classification Search .................. 709/228, 709/229, 225–227; 380/229, 255; 725/87, 725/91, 109, 110
See application file for complete search history.

(56) References Cited

U.S. PATENT DOCUMENTS 5,481,720 A * 1/1996 Loucks et al. .................. 726/21
(Continued)

FOREIGN PATENT DOCUMENTS

EP    1043648 A2    10/2000
(Continued)

OTHER PUBLICATIONS

HP Intel Solution Center: "Save Delivery of Blockbuster Movies to the Digital Home"; Internet Citation, 2004; URL: http://www.intel.com/business/bss/solutions/blueprints/pdf/widevine.pdf.

*Primary Examiner* — Backhean Tiv
(74) *Attorney, Agent, or Firm* — Gottlieb, Rackman & Reisman, P.C.

(57) ABSTRACT

A system for securely communicating content as streaming data is provided. The system includes a closed network created on a public network, and a dedicated device for receiving twice-encrypted streamed content from the closed network. Upon authentication of the dedicated device, a content enabling component in the closed network twice-encrypts previously once-encrypted streamed content by using randomly selected encryption algorithms, and streams the twice-encrypted streamed content to the dedicated device during a closed network communication session and through a closed connection established between the closed network and the dedicated device. The dedicated device includes a content enabling component having a unique content enabling component identifier and a unique decryption key. The dedicated device decrypts the twice-encrypted streamed content by using its unique information and decryption key as well as randomly selected information received from the closed network during the closed network communication session and through the closed connection.

17 Claims, 34 Drawing Sheets

U.S. PATENT DOCUMENTS

| | | | | |
|---|---|---|---|---|
| 6,236,728 | B1* | 5/2001 | Marchant | 380/28 |
| 6,662,228 | B1* | 12/2003 | Limsico | 709/225 |
| 7,630,985 | B2* | 12/2009 | Sunada | 1/1 |
| 7,765,584 | B2* | 7/2010 | Roskind | 726/5 |
| 8,196,189 | B2* | 6/2012 | Roskind | 726/5 |
| 2001/0044786 | A1* | 11/2001 | Ishibashi | 705/77 |
| 2002/0019814 | A1* | 2/2002 | Ganesan | 705/59 |
| 2002/0036800 | A1* | 3/2002 | Nozaki et al. | 358/1.15 |
| 2003/0204716 | A1* | 10/2003 | Rockwood et al. | 713/150 |
| 2004/0225732 | A1* | 11/2004 | Coons et al. | 709/224 |
| 2006/0117104 | A1* | 6/2006 | Taniguchi et al. | 709/225 |
| 2007/0192252 | A1* | 8/2007 | Shear et al. | 705/51 |
| 2008/0263610 | A1* | 10/2008 | Murray et al. | 725/110 |
| 2008/0294775 | A1* | 11/2008 | Roberts et al. | 709/225 |
| 2010/0251347 | A1* | 9/2010 | Roskind | 726/5 |

FOREIGN PATENT DOCUMENTS

EP    1845682 A1    10/2007

* cited by examiner

SYSTEM AND METHOD FOR SECURELY COMMUNICATING ON-DEMAND CONTENT FROM CLOSED NETWORK TO DEDICATED DEVICES, AND FOR COMPILING CONTENT USAGE DATA IN CLOSED NETWORK SECURELY COMMUNICATING CONTENT TO DEDICATED DEVICES

CROSS-REFERENCE TO RELATED APPLICATIONS

This application is the U.S. national phase of international application PCT/IB08/03397, filed Jul. 9, 2008. This application claims the benefit of priority to U.S. provisional application No. 60/929,698, filed Jul. 9, 2007, and U.S. provisional application No. 60/935,240, filed Aug. 1, 2007. The entire contents of these applications are hereby incorporated by reference.

BACKGROUND OF THE DISCLOSURE

1. Field of the Disclosure

The present disclosure relates to a system and method for securely communicating content as streaming data from a closed network to dedicated devices authorized to receive the streaming content from the closed network. More particularly, the present disclosure relates to a system and method in which a dedicated device receives encrypted streaming content from a global, secured and closed network which ensures that the dedicated device is authorized to receive the streaming content, and a component of the dedicated device for decrypting the encrypted streaming content also permits limited use of the streaming content so that the streaming content is prevented from being distributed outside the dedicated device. A component of the closed network also inserts at least two packets of respectively unique hidden data identifying a user of the dedicated device to which a streamed content is to be delivered. If the streamed content is somehow transferred outside the dedicated device, the user can be identified by the hidden data.

The present disclosure also relates to a system and method for distributing aggregated content usage, subscriber and payment data compiled in the closed network to enable providers of the content, advertisers, and content production companies, etc. to obtain content usage and subscriber data that is representative of all users of the closed network.

2. Description of the Background Art

In recent years, the Internet has become a popular medium for exchanging content such as software, games, movies, music, images and documents. Due to high-speed broadband connections to the Internet, users no longer exclusively acquire content with computer-readable media such as CD-ROMs, DVD-ROMs and other optical media. Instead, users can now obtain content from content providers over the Internet at any time. The Internet also enables users to share content with other users.

While the Internet has made content distribution easier, it has also created significant problems for owners and providers (e.g., licensees) of copyrighted content, because the Internet is largely an open, uncontrollable and unsecured network. Consequently, owners and providers of copyrighted content often attempt to restrict use of their content to particular users through licenses, watermarking, and encryption schemes, for example. In the case of licenses, a user who purchases a software application, for example, may be required to obtain a license to use the software. The user would then be required to register with the software owner or provider, or with a third party clearinghouse, in order to be able to use the software. Such a license may be for a limited number of users or computers, and the software would only operate correctly for those registered users or computers. However, if the software is surreptitiously hacked to remove the license restrictions from the software, the hacker could distribute the software over the Internet to an unlimited number of users.

Watermarking is a technique which allows a content owner or provider to add hidden copyright notices or other verification or notification messages to content such as software, video data, audio data and documents, for example. The notices or messages include a group of bits describing information pertaining to the source of the content and may also include information pertaining to a purchaser of the content. For example, watermarking techniques are currently used by distributors of digital audio and video data in which the purchaser's identity is encoded into the content, and use of the content is restricted to particular devices that are registered to be owned by the purchaser. If the purchaser creates unauthorized copies of copyrighted content containing the watermarks, the purchaser's identity will be included in the unauthorized copies, allowing the infringer to be identified by an enforcement agency or the copyright owner.

Algorithms are used to encode and insert watermarks into predetermined portions of content, such as before the first bit or packet of the content or after the last bit or packet of the content, for example. If the watermarking algorithm is deciphered, however, the watermark can then be removed from the content, in which case the infringing user of the content will not be identified, and the infringing user can freely distribute the unauthorized copy of the content over the Internet to an unlimited number of users. In response to watermarking algorithm deciphering, watermarking algorithms have become more complex in recent years. However, due to the demand for cheaper or free content over the Internet, complex watermarking algorithms have been deciphered at an alarming rate. This trend will likely continue as long as there is a demand for Internet-based copyright infringement.

Encryption schemes are also used to protect copyrighted content.

Two commonly used encryption schemes are public key cryptography and secret key cryptography. In public key cryptography, a content user is assigned a public key and a private key, which are mathematically related to each other. The public key is known by the content user and an owner or provider of the copyrighted content. When distributing content to the content user, the owner or provider of the copyrighted content encrypts the content with the public key known to both parties, and the content user decrypts the content by using his or her private key, which is known only to the content user. One problem with public key cryptography is that the content user's computer can be hacked to steal the content user's private key. The stolen private key of the content user can then be used to decrypt copyrighted content of the owner or provider of the copyrighted content. Another problem with public key cryptography is the authenticity of the public key, since the public key may be known to a large number of parties.

In secret key cryptography, a secret key is held by both the content user and the owner or provider of the copyrighted content. When distributing content to the content user, the owner or provider of the copyrighted content encrypts the content with the secret key, and the content user decrypts the content by using the same secret key. One problem with secret key cryptography is that the private key may be compromised during transit of the content, or an unauthorized party may hack either the content user's computer or the distribution system of the owner or provider of the copyrighted content to steal the secret key used for encrypting and decrypting the content.

Despite well intentioned attempts to secure copyrighted content that is distributed over the Internet, the demand for cheaper or free copyrighted content has led to the deciphering or cracking of even the most complex protection schemes and algorithms. A natural reaction would be to develop even more complex protection schemes and algorithms, but more complex protection schemes and algorithms will likely continue to be deciphered or cracked in the future.

While efforts have been made to secure copyrighted content that is distributed over the Internet, a problem that is often overlooked or disregarded is that copyrighted content is distributed over the Internet, which is largely an open, uncontrollable and unsecured network. Due to the popularity and accessibility of the Internet, the potential exists for copyrighted content owners and providers to be able to provide their content to millions or even billions of users. That attractive potential, however, is diluted by the pervasiveness of Internet-based copyright infringement. It has been estimated that Internet-based copyright infringement results in billions of dollars a year in lost revenue for copyright owners and providers. Lost revenue for copyright owners inevitably provides a disincentive to continue developing copyrightable content.

Most nations have copyright enforcement policies in place, but enforcement of the policies varies for each nation. Internet-based servers which facilitate infringement of copyrighted content are often located in countries with relatively lenient copyright infringement policies or a history of limited enforcement. Legislative prohibitions to copyright enforcement have been proposed, but such legislative prohibitions are often slow to adapt to ever-changing permutations in the methods of infringing copyrighted content. Moreover, enforcement of copyright laws often merely results in criminal sanctions imposed against typically egregious infringers. As a result, copyright owners are often forced to bring private lawsuits against infringers to recover lost revenue caused by the infringement.

Furthermore, many national governments spend billions of dollars a year in prosecuting copyright infringers and fostering the development of more complex encryption schemes to protect copyrighted and sensitive content from unauthorized distribution. The constant development of more complex encryption schemes is required because existing encryption schemes continue to be compromised at an alarming rate. In addition to financial resources allocated to prosecuting infringers and fostering the development of more complex encryption schemes, national and local governments also lose tax resources when copyrighted content is unlawfully distributed.

Accordingly, the rampant Internet-based copyright infringement that is prevalent today harms not only copyrighted content owners and licensees, but the governments of the content owners and licensees as well.

What is desired, therefore, is a secure, global network in which owners of copyrighted content or non-copyrighted content can deposit their content to be distributed to interested users, and only authorized users are able to obtain the content from the secure network. Such a secure, global network provides a mutual benefit to both copyrighted content owners and content users. Knowing their copyrighted content would be securely distributed and not subject to the rampant Internet-based copyright infringement that is prevalent today, copyrighted content owners or providers would not hesitate to embrace such a global network. As a result, content users would benefit from an abundance of copyrighted content available from one, central source.

Another consideration of the present disclosure is the presently inaccurate or incomplete compilations of data obtained for discerning patterns in content use and interest for various demographic groups. Ratings systems seek to compile data on content usage for particular demographic groups so that advertising agencies, content producers and other entities interested in catering to a particular demographic group can provide content, merchandise and/or services that may be of interest to that demographic group.

A significant drawback to conventional rating systems, however, is that the compilation of data is based on a sample of users that may not be truly representative of a particular demographic group or the population at large. Conventional ratings systems typically compile content usage data from either random demographic samplings, or from users who agree to have their content usage monitored in order to obtain an offered benefit (i.e., self-selection ratings systems). In the case of random demographic samplings, individuals are chosen based on statistical probabilities. For example, in a city having 300,000 residents, 100 individuals who are between the ages of forty and forty-nine and who are married and have children living at home may be selected to represent their demographic group. There is, however, no reasonable assurance that those 100 individuals will provide a truly representative sample of the demographic group of married adults between the ages of forty and forty-nine who have children living at home. Furthermore, random demographic samplings are typically limited to real-time monitoring. As a result, random demographic ratings systems may not accurately capture content use if a portion of the 100 selected individuals are away from home during the time a content is broadcast, but who have programmed a recorder to record the content so that it can be viewed after the monitored broadcast time.

In the case of self-selection ratings systems, the demographic group being studied is skewed towards those that are interested in obtaining the offered consideration. That is, the demographic pool whose content usage is being monitored may not be truly representative of a particular demographic group, because the offered consideration may not be attractive to a truly representative sample of the demographic group of interest.

What is desired, therefore, is a system which can accurately compile content usage data for a truly representative sample of the population.

SUMMARY OF THE DISCLOSURE

A first exemplary aspect of the present disclosure provides a system for securely communicating content as streaming data.

The system comprises a collection database for collecting content. The collection database has a unique collection database identifier, and each content collected in the collection database has a respectively unique content identifier.

The system also comprises a closed network created on a public network. The closed network twice-encrypts streamed content to be streamed to an authenticated device, and transmits the twice-encrypted streamed content to the authenticated device during a closed network communication session established between the closed network and the authenticated device and through a closed connection established between the closed network and the authenticated device.

The system also comprises a dedicated device connected to the closed network. The dedicated device has a unique user identifier assigned to a user of the dedicated device, a unique content enabling component identifier, and a unique decryption key.

The dedicated device comprises a first connection component for communicating with the closed network, and a processing unit for requesting streamed content from the closed network via the first connection unit and receiving twice-encrypted streamed content from the closed network via the first connection unit. The dedicated device also comprises a first content enabling component for decrypting the twice-encrypted streamed content received by the processing unit. The first content enabling component has the unique content enabling component identifier and the unique decryption key for decrypting the twice-encrypted streamed content received from the processing unit.

The closed network comprises a second connection component for establishing a closed connection between the first connection component of the dedicated device and the closed network. The closed network also comprises a first network including at least one content database for encrypting and storing each streamed content collected in the collection database with the collection database identifier and its respective content identifier. The streamed content that is encrypted by the at least one content database with the collection database identifier and its respective content identifier constitutes once-encrypted streamed content. The at least one content database also streams requested twice-encrypted streamed content to the dedicated device.

In addition, the closed network comprises a second content enabling component for twice-encrypting the once-encrypted streamed content requested by the dedicated device. The closed network also comprises a second network including a plurality of mirrored authentication centers, which each have a respectively unique authentication center identifier. Furthermore, the closed network comprises an authentication server for storing a user identifier of each dedicated device authorized to communicate with the closed network, and performing authentication of dedicated devices authorized to communicate with the closed network.

The first content enabling component of the dedicated device is operable to initiate communication with the closed network by transmitting, via the first connection component, an authentication request including the content enabling component identifier of the first content enabling component to the second connection component, and the second connection component is operable to establish a closed connection between the dedicated device and the closed network upon authentication of the first content enabling component.

The first content enabling component is also operable to transmit, via the first connection component, the user identifier of the dedicated device to one of the plurality of authentication centers through the established closed connection. The authentication center to which the first content enabling component transmitted the user identifier of the dedicated device is hereinafter referred to as "the accessed authentication center."

The accessed authentication center is operable to authenticate the dedicated device by determining whether the user identifier received from the dedicated device matches a user identifier stored in the authentication server.

Upon authenticating the dedicated device, the accessed authentication center is operable to (i) establish a closed network communication session with the dedicated device to enable the dedicated device to transmit, to the content database through the established closed connection, a content request for streamed content stored in the at least one content database; (ii) randomly select the authentication center identifier of another one of the plurality of authentication centers upon establishing the closed network communication session; (iii) notify the first content enabling component of the authentication center identifier of the randomly chosen authentication center through the established closed connection; and (iv) notify the second content enabling component of the authentication center identifier of the randomly chosen authentication center.

The content database, upon receiving the content request, is operable to notify the second content enabling component of the requested streamed content identified in the received content request.

According to the first exemplary aspect, the second content enabling component, upon being notified of the requested streamed content, is operable to twice-encrypt the requested once-encrypted streamed content stored in the content database with the authentication center identifier of the randomly chosen authentication center. The content database is operable to stream the twice-encrypted streamed content to the dedicated device via the second communication component through the established closed connection.

Furthermore, the first content enabling component is operable to decrypt the twice-encrypted streamed content by using the decryption key of the first content enabling component and the notified authentication center identifier of the randomly chosen authentication center, transmit the decrypted streamed content to the processing unit to be output by the processing unit, and control the dedicated device so as not to permanently store the streamed content.

A system for securely communicating encrypted content as streaming data to an authenticated device is provided according to a second exemplary aspect of the present disclosure.

The system comprises a closed network created on a public network. The closed network encrypts streamed content according to an encryption algorithm formed from combining two randomly chosen encryption algorithms, and transmits the encrypted streamed content to an authenticated device during a closed network communication session established between the closed network and the authenticated device and through a closed connection established between the closed network and the authenticated device.

The system also comprises a dedicated device connected to the closed network. The dedicated device has a unique user identifier assigned to a user of the dedicated device, a unique content enabling component identifier, and a unique decryption key.

The dedicated device comprises a first connection component for communicating with the closed network, and a processing unit for requesting streamed content from the closed network and receiving encrypted streamed content from the closed network via the first connection unit. The dedicated device also comprises a first content enabling component for decrypting the encrypted streamed content received by the processing unit. The first content enabling component has the unique content enabling component identifier and the unique decryption key for decrypting the encrypted stream content received from the processing unit.

The closed network comprises a second connection component for establishing a closed connection between the first connection component of the dedicated device and the closed network, and a second content enabling component for encrypting streamed content to be streamed to the dedicated device.

The closed network also comprises a first network including at least one content database for storing streamed content and a plurality of first encryption algorithms, and streaming encrypted streamed content to the dedicated device. In addition, the closed network comprises a second network including a plurality of mirrored authentication centers, which each store a plurality of second encryption algorithms and have a respectively unique authentication center identifier. Furthermore, the closed network comprises an authentication server for storing a user identifier of each dedicated device authorized to communicate with the closed network, and performing authentication of dedicated devices authorized to communicate with the closed network.

The first content enabling component is operable to initiate communication with the closed network by transmitting, via the first connection component, an authentication request including the content enabling component identifier of the first content enabling component to the second connection component, and the second connection component is operable to establish a closed connection between the dedicated device and the closed network upon authentication of the first content enabling component.

The first content enabling component is also operable to transmit, via the first connection component, the user identifier of the dedicated device to one of the plurality of authentication centers through the established closed connection. The authentication center to which the first content enabling component transmitted the user identifier of the dedicated device is hereinafter referred to as "the accessed authentication center."

The accessed authentication center is operable to authenticate the dedicated device by determining whether the user identifier received from the dedicated device matches a user identifier stored in the authentication server.

Upon authenticating the dedicated device, the accessed authentication center is operable to (i) establish a closed network communication session with the dedicated device, upon authenticating the dedicated device, to enable the dedicated device to transmit, to the content database through the established closed connection during the established closed network communication session, a content request for streamed content stored in the content database; (ii) randomly select the authentication center identifier of another one of the plurality of authentication centers upon establishing the closed network communication session; (iii) notify the first content enabling component of the authentication center identifier of the randomly chosen authentication center through the established closed connection; and (iv) notify the second content enabling component of the authentication center identifier of the authentication center identifier of the randomly chosen authentication center.

The content database, upon receiving the content request, is operable to notify the second content enabling component of the content identified in the content request.

According to the second exemplary aspect, the second content enabling component, upon being notified of the requested streamed content, is operable to (i) randomly select one of the plurality of first encryption algorithms stored in the content database; (ii) randomly select one of the plurality of second encryption algorithms stored in stored in the accessed authentication center; (iii) combine the randomly selected one of the first and second encryption algorithms to form, during the established closed network communication session, a present encryption algorithm for encrypting the streamed content requested by the dedicated device; and (iv) encrypt, according to the formed present encryption algorithm, the streamed content identified in the content request with the authentication center identifier of the randomly chosen authentication center.

The content database is operable to stream the encrypted streamed content and notify the first content enabling component of a present decryption algorithm corresponding to the present encryption algorithm through the established closed communication.

Furthermore, the first content enabling component is operable to decrypt the encrypted content by using the present decryption algorithm corresponding to the formed present encryption algorithm, and control the dedicated device so as not to permanently store the streamed content.

BRIEF DESCRIPTION OF THE DRAWINGS

Other objects, features and advantages of the disclosure will become apparent to those skilled in the art from the following detailed description of exemplary embodiments, in conjunction with the accompanying drawings, in which like reference numerals have been used to designate like elements, and in which:

FIG. 8 is a conceptual diagram of closed communications established in the closed network and authentication paths in the closed network;

DETAILED DESCRIPTION OF EXEMPLARY EMBODIMENTS

The following detailed description is presented to enable a person skilled in the art to make and use the present disclosure. Various modifications to the exemplary embodiments described herein will be apparent to those skilled in the art, and the generic principles described herein may be applied to other embodiments without departing from the spirit and scope of the present disclosure. Thus, the present disclosure is not intended to be limited to the exemplary embodiments disclosed herein, but is to be accorded the widest scope consistent with the principles and features disclosed herein.

To facilitate an understanding of the principles and features of the present disclosure, the following detailed description presents a disclosure of various components and aspects of an exemplary system. It is to be understood that the system includes various components and aspects which may be used in combination or independently.

System Overview

Figure 1:
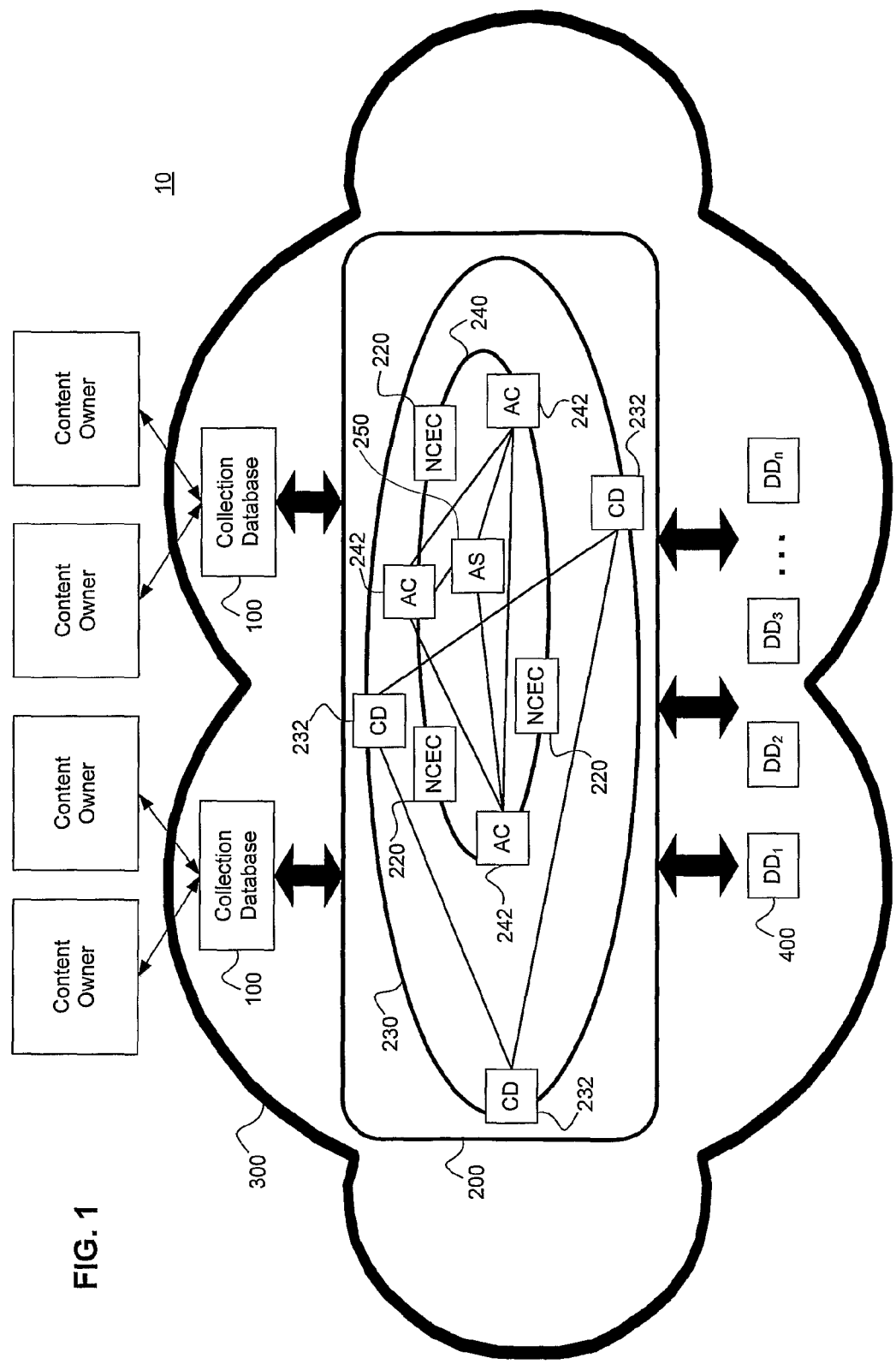
FIG. 1 is a conceptual diagram of a system for securely communicating content as stream data according to an exemplary embodiment.

FIG. 1 illustrates a broad overview of a system 10 for securely communicating content as streaming data according to an exemplary embodiment. The term "content" as used herein encompasses both copyrighted content and non-copyrighted content.

As shown in FIG. 1, the system 10 includes a plurality of collection databases 100, a closed network 200, a public network 300, and a plurality of dedicated devices (DD) 400. The system 10 is for securely distributing streaming content from the closed network 200 to a dedicated device 400, which receives the streamed content from the closed network 200 over existing communication infrastructures. The closed network 200 is a proprietary network which ensures that only authorized dedicated devices 400 can receive and reproduce the streamed content.

As described above, the Internet has problematically facilitated rampant infringement of content, including copyrighted content. The system 10 virtually prevents infringement of content due to the secure interactions between the closed network 200 and the dedicated devices 400. When streaming content to the dedicated device 400, the closed network 200 employs a proprietary encryption scheme for uniquely encrypting each streamed content so that only the requesting dedicated device 400 can reproduce the content. The unique and proprietary encryption of each streamed content makes infringement of content extremely difficult and prohibitively expensive. In addition, a content enabling component in the dedicated device 400 prevents the streamed content from being distributed outside the dedicated device 400. Even if the streamed content is somehow extracted from the dedicated device 400, several uniquely distinct identifiers of the user of the dedicated device 400 are inserted into each streamed content to permit identification of an infringing user, as well as the dedicated device 400 to which the streamed content was distributed. The term "unique," as used in the present disclosure, means unlike any other.

An overview of the elements of the system 10 will first be described. Each of the elements of the system 10 will then be more fully described hereinafter.

The collection databases 100 are for collecting content, such as copyrighted content, for example, from an owner of the content. The content owner may add content to the collection databases 100 (i.e., push the content), or the collection databases 100 may be configured to automatically pull the content from a database of the content owner whenever content is newly added to the database of the content owner. In addition, a content owner may request that content previously collected in one of the collection databases 100 be returned to him or her. The push and pull features for adding and removing content will be further described below.

According to an exemplary embodiment, a content owner is limited to adding his or her content to only one or more content databases 100 that can authenticate the content owner. Alternatively, a content owner may add his or her content to any one of the plurality of content databases 100, provided that the content owner can be verified. An authorized distributor (e.g., licensee) of the content owner may similarly add content to one or more of the plurality of content databases 100. Accordingly, the term "content owner" as used herein is intended to encompass both content owners and authorized distributors of the content owners. The term "content" as used herein includes any digital or digitzed content and/or data, including, but not limited to: application software; game software; computer files; audio data; video data; audio and video (A/V) data; documents; image data that is photographed, created by an individual or computer, or scanned from an existing image; message data, alphanumeric data; numeric data; speech data; text data; and character data.

While a plurality of collection databases 100 are illustrated in FIG. 1, the present disclosure may be implemented with only one collection database 100. For the sake of simplicity, the plurality of collection databases 100 may be collectively described hereinafter, unless otherwise noted. The collection database 100 is connected to the closed network 200 via the public network 300. The public network 300 may be the Internet, for example, or any other network which is not private. As used herein, a "private network" is intended to encompass a network for which access is restricted to only authorized users. As used herein, a "closed network" is any authenticated network which encapsulates data for secure connections between components of the network. Conversely, the public network 300 is a network that can be accessed without restriction. As shown in FIG. 1, the dedicated devices 400 are also connected to the closed network 200 via the public network 300.

The closed network 200 is a secure network that can be accessed by only authorized dedicated devices 400 and authorized collection databases 100. As shown in FIG. 1, the closed network 200 is created on the public network 300. The closed network 200, according to an exemplary embodiment, is a parallel environment that is not locatable on the Internet. The closed network 200 does not have an address (e.g., URL) on the Internet or any other public network. That is, the components of the closed network 200 do not have public addresses, except for a connection component of the closed network 200 whose address (e.g., IP address) may be preprogrammed in the dedicated devices 400. Consequently, the closed network 200 is a parallel environment to the Internet. Access to the closed network 200 is thus restricted to only those dedicated devices 400 and collection databases 100 that have been authorized to access the closed network 200. The closed network 200 may therefore be a virtual private network created on the public network 300. Alternatively, the closed network 200 may be an intranet that is available to only authorized collection databases 100 and authorized dedicated devices 400. The constituent elements of the closed network 200 will be described further below.

The dedicated devices 400 connected to the closed network 200 are termed "dedicated devices" because they are dedicated to operate with the closed network 200. The dedicated devices 400 may include any consumer or professional appliance, provided that such appliances are equipped with a content enabling component that will be further described below. For the sake of simplicity, the plurality of dedicated devices 400 may be collectively described hereinafter, unless otherwise noted.

A content user is required to posses a dedicated device 400 in order to access content that is available in the closed network 200. The dedicated device 400 and closed network 200 are configured to enable a user of the dedicated device 400 to request and receive streamed content from the closed network 200 on demand. Each dedicated device 400 includes a content enabling component, which is a component that is necessary to access the closed network 200. As described above, the closed network 200 is not locatable on the public network 300. Therefore, without a dedicated device 400 having the content enabling component installed or equipped therein, a user will not be able to access the closed network 200. Moreover, the content available in the closed network 200 cannot be used without the decoding and processing functions of the content enabling component of the dedicated device 400. This is because the closed network 200 makes content unusable unless it is decoded by the content enabling component of the particular dedicated device 400 that requested distribution of the content from the closed network 200.

The closed network 200 also includes at least one content enabling component. The content enabling components of the closed network 200 and the dedicated devices 400 primarily perform different functions in the context of processing content, but the content enabling components of the closed network 200 and the dedicated devices 400 serve as unified communication access-point-standard equipment. The content enabling components in the closed network 200 and the dedicated devices 400 are responsible for point-to-point identification and communication in the system 10 according to an exemplary embodiment. In essence, the content enabling components of the closed network 200 and the dedicated devices 400 enable access to the secured content available in the closed network 200.

Dedicated Device

Figure 2:
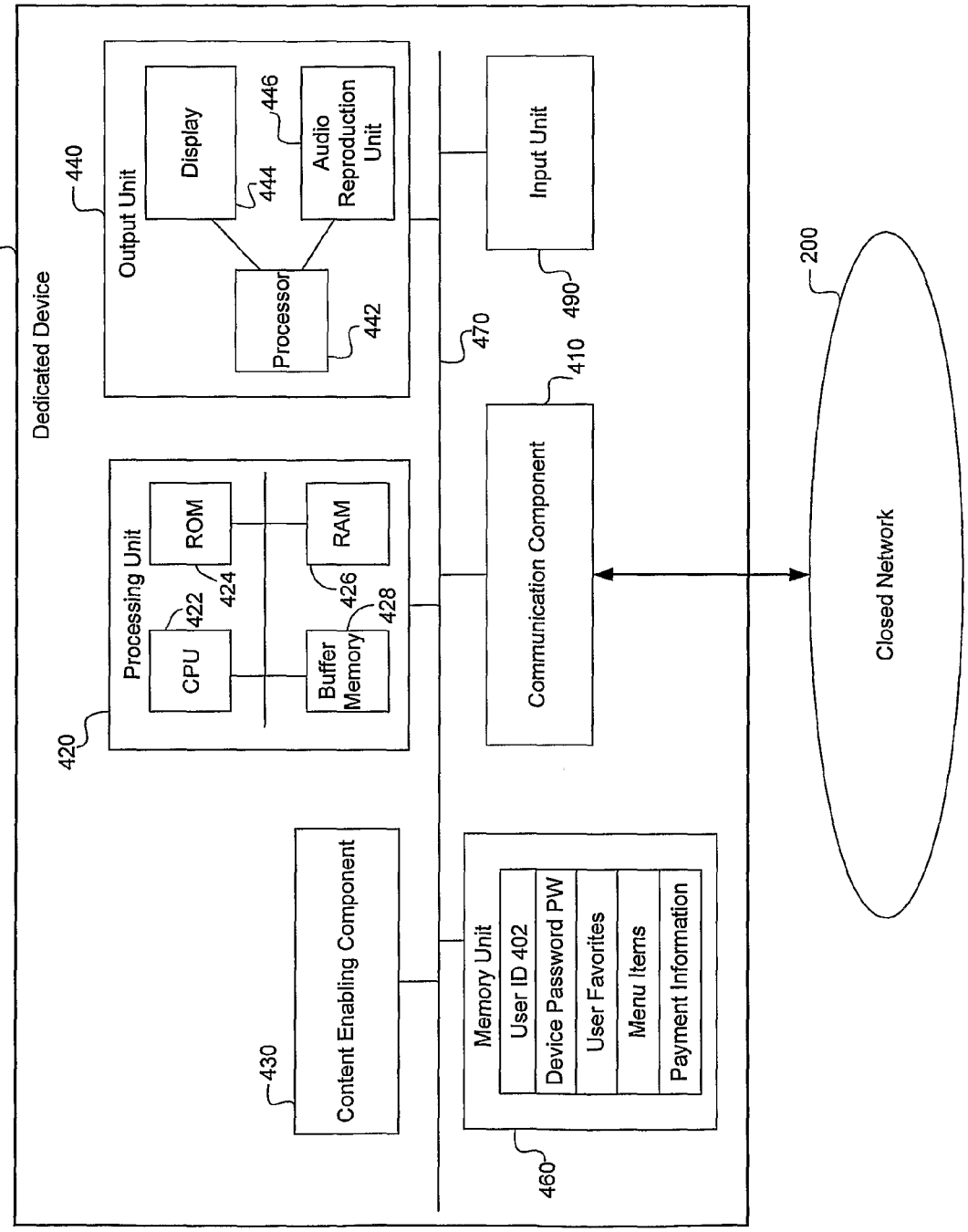
FIG. 2 is a conceptual diagram illustrating the components of a dedicated device.

FIG. 2 is a conceptual diagram illustrating exemplary components of the dedicated device 400. As shown in FIG. 2, the dedicated device 400 may include a communication component 410, a processing unit 420, a content enabling component 430, an output unit 440, a memory unit 460, and an input unit 490. The above-described components of the dedicated device 400 are connected to each other by a common communication medium 470. The communication medium 470 can be a bus within the dedicated device 400, a serial line, or any other suitable path for exchanging data between the components of the dedicated device 400.

The communication component 410 is for communicating with the closed network 200. The communication component 410 is the point of interconnection between the processing unit 420 and the content enabling component 430 of the dedicated device 400 and the closed network 200. As such, the communication component 410 serves as an interface between the dedicated device 400 and the closed network 200. As used herein, the term "interface" means an electronic component or circuit configured to communicate with another component or a plurality of other components. In addition, an "interface" also encompasses an electronic device or circuit which serves as the point of communicative interaction between two or more components. The communication component 410 of the dedicated device 400 may hereinafter be described as a "first communication component."

The processing unit 420 includes a CPU (central processing unit) 422, a ROM (read-only memory) 424, a RAM (random-access memory) 426, and a buffer memory 428. The CPU 422 controls the aggregate functions of each component of the dedicated device 400 as well as the interrelationship and interaction between the other components of the dedicated device 400. The ROM 424 stores executable programs and logic instructions which are implemented by the CPU 422, and the RAM 426 is used a working memory by the CPU 426 when executing the programs and logic instructions stored in the ROM 424. The buffer memory 428 temporarily stores streamed content received from the closed network 200 while it is being processed. The buffer memory 428 has enough memory capacity to hold an entire streamed content, but, as will be further described below, the content enabling component 430 prevents streamed content received from the closed network 200 from being permanently stored.

The size and capacity of the buffer memory 428 may be designed according to the intended uses of the dedicated device 400. For example, if a dedicated device 400 is manufactured for the intended use of watching streamed movies, the buffer memory 428 may be made larger than the buffer memory of a dedicated device 400 that is manufactured for the intended use of reproducing streamed audio files. The size and capacity of the buffer memory 428 may also be uniformly set for each dedicated device 400, provided that the size and capacity of the buffer memory 428 is large enough to process larger sized contents without causing an interruption in the reproduction of larger sized contents.

The content enabling component 430 is an integral and necessary component of the dedicated device 400. Hereinafter, the content enabling component 430 of the dedicated device 400 will be abbreviated as "DCEC," which is an acronym for "device content enabling component." The DCEC 430 is needed to access the closed network 200. That is, the closed network 200 only communicates with authorized dedicated devices 400 having a DCEC 430 installed therein. In addition to serving a communication function, the DCEC 430 also serves an important security function for the dedicated device 400, as will be described below.

According to an exemplary embodiment, the DCEC 430 is a system-on-chip (SoC) which incorporates all computing and communication components on one integrated circuit in the dedicated device 400. The DCEC 430 may be manufactured by licensed manufacturers. As will be further described below, the DCEC 430 of the dedicated device 400 is authenticated by the closed network 200 prior to the distribution of any streamed content to the dedicated device 400. Consequently, if the DCEC 430 is tampered with or made inoperable, the dedicated device 400 will be unable to access the closed network 200. Furthermore, a portion of the logic necessary to perform the functions of the DCEC 430 in the dedicated device 400 is obtained from the closed network 200 during each closed communication session with the closed network 200. Consequently, tampering with the DCEC 430 will not provide any benefit to the tampering user.

Figure 3:
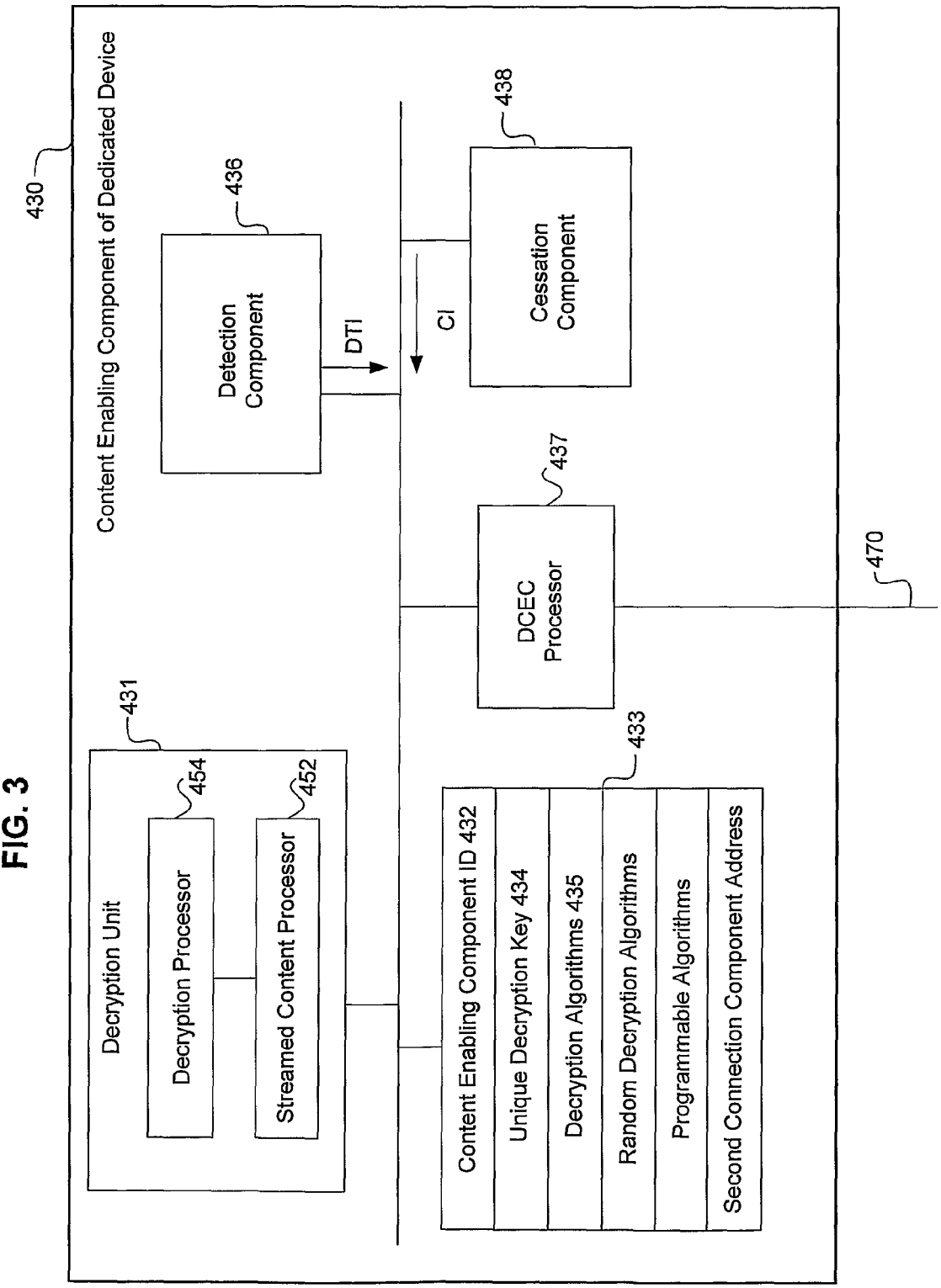
FIG. 3 is a conceptual diagram illustrating the components of a content enabling component of the dedicated device.

FIG. 3 illustrates exemplary components of the DCEC 430. As shown in FIG. 3, the DCEC 430 may include a decryption unit 431, a DCEC memory unit 433, a detection component 436, a DCEC processor 437, and a cessation component 438.

The decryption unit 431 decrypts encrypted streamed content received from the closed network 200. The decryption unit 431 includes a streamed content processor 452 and a decryption processor 454. All streamed content received from the closed network 200 is encrypted according to encryption algorithms that are randomly selected in the closed network 200. The encryption of the streamed content will be further described below.

The processing unit 420 of the dedicated device 400 receives the encrypted streamed content from the closed network 200 via the communication component 410, and the processing unit 420 outputs the encrypted streamed content to the DCEC 430. The DCEC processor 437 detects that encrypted streamed content is received, and outputs the encrypted streamed content to the decryption unit 431.

The streamed content processor 452 processes the inputted encrypted streamed content, and the decryption processor 454 decrypts the encrypted streamed content processed by the streamed content processor 452. To avoid bottlenecking in the decryption unit 431, it is sometimes advantageous or necessary to process the encrypted streamed content in two or more channels before it is decrypted by the decryption processor 454. For example, the streamed content processor 452 may determine if an encryption rate of the encrypted streamed content is greater than or equal to a predetermined rate. If the streamed content processor 452 determines that the encryption rate is greater than or equal to the predetermined rate, the streamed content processor 452 can then automatically spread the inputted encrypted streamed content into a predetermined number of channels. The streamed content processor 452 determines the number of channels based on a variety of factors, such as the number of packets in the encrypted streamed content, the data size of the encrypted streamed content, the decryption rate of each channel, and the algorithms used to encrypt the encrypted streamed content, for example.

The decryption processor 454 then decrypts the encrypted streamed content that is spread into the predetermined number of channels by decrypting some or all of the channels at the same time. Once the streamed content that is spread into the predetermined number of channels is decrypted, the decryption processor 454 then reassembles or rejoins the spread streamed content into one stream in the same sequential order of packets that the encrypted streamed content was received.

Figure 4:
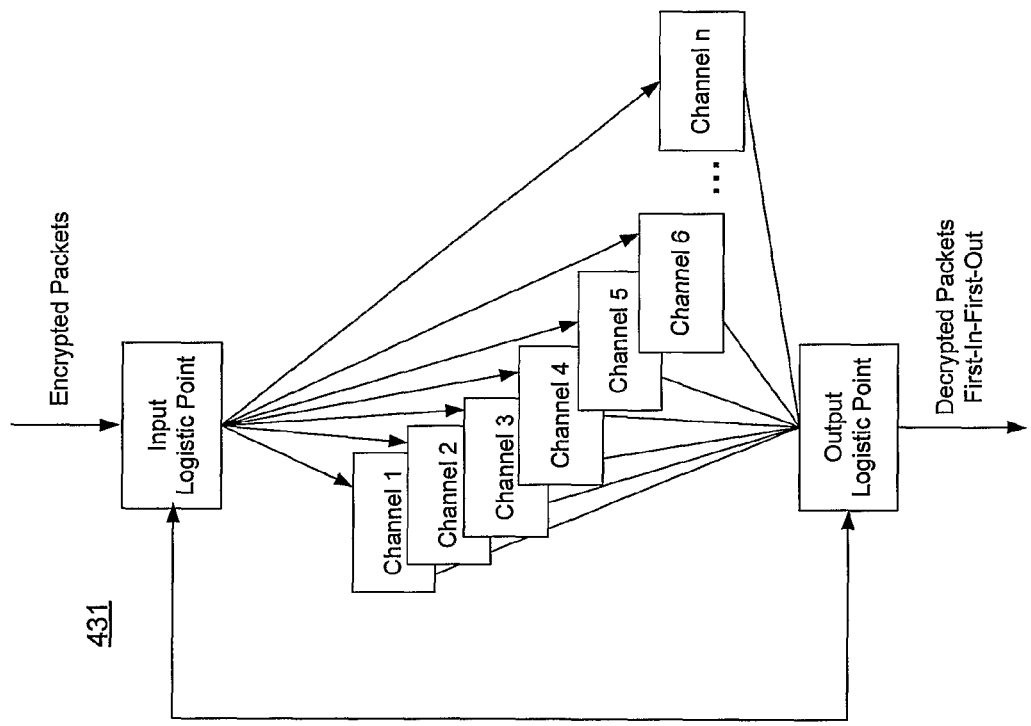
FIG. 4 is a conceptual diagram illustrating processing and decryption operations performed in a decryption unit of the content enabling component of the dedicated device.

FIG. 4 is a conceptual diagram illustrating the processing and decryption of an encrypted streamed content that is spread into a predetermined number of channels. The streamed content processor 452 contains an input logistic point for determining whether it is advantageous or necessary to spread the encrypted streamed content into a predetermined number of channels. If the streamed content processor 452 determines that such spreading is not warranted, the decryption processor 454 decrypts the encrypted streamed content in one channel.

On the other hand, if the streamed content processor 452 determines that it is advantageous or necessary to spread the encrypted streamed content into a predetermined number of channels, the streamed content processor 452 determines the number of channels in which to spread the encrypted streamed content, and notifies the decryption processor 454 of the sequential order of the packets of the encrypted streamed content received from the DCEC processor 437. The notification of the order of packets in which to reassemble or rejoin the decrypted packets is important, because if the order of packets in the decrypted streamed content does not match the order of packets in the encrypted streamed content, the decrypted streamed content will likely not be reproduced as intended by the content owner. In other words, the notification of the order of packets from the streamed content processor 452 ensures that the decryption processor 454 will follow a first-in-first-out principle in reassembling or rejoining the decrypted streamed content. Therefore, the first packet of the encrypted streamed content received by the streamed content processor 452 will be the first packet outputted by the decryption processor 454, the second packet of the encrypted streamed content received by the streamed content processor 452 will be the second packet outputted by the decryption processor 454, and so on.

With reference to FIG. 4, assume, for example, that (i) the characteristic decryption speed of one channel is 3 packets per nanosecond, (ii) the encrypted streamed content is to be decrypted at 10 packets per nanosecond, and (iii) the inputted encrypted streamed content contains 10 packets, which are sequentially ordered as packets 1-10. In this example, the streamed content processor 452 will spread the inputted encrypted streamed content into 4 channels, where packets 1-3 of the streamed content are decrypted on channel 1, packets 4-6 of the streamed content are decrypted on channel 2, packets 7-9 of the streamed content are decrypted on channel 3, and packet 10 is decrypted on channel 4. Alternatively, the streamed content processor 452 may, for example, spread the encrypted streamed content into 5 channels, with 2 packets of the streamed content being sequentially spread into each one of the 5 channels. After decrypting the encrypted streamed content that is spread into a predetermined number of channels, the decryption processor 454 then reassembles or rejoins the spread packets so that the decrypted streamed content is in a sequential order of packets 1-10, i.e., the sequential order of the encrypted streamed content. This spreading and decrypting operation is also advantageous when processing high definition streamed content, to ensure that the encrypted streamed content will be timely decrypted to avoid bottlenecking at the decryption unit 431.

Returning to FIG. 3, the DCEC 430 is assigned a unique content enabling component identifier (ID) 432 (hereinafter, abbreviated as "DCEC ID"), and a unique decryption key 434. The DCEC ID 432 and decryption key 434 of each dedicated device 400 are different from the DCEC ID 432 and decryption key 434 of every other dedicated device 400. Since each dedicated device 400 requires a DCEC 430 to communicate with the closed network 200, the DCEC ID 432 can be considered to be an identifier for the dedicated device 400.

The DCEC ID 432 and decryption key 434 may be assigned when the dedicated device 400 is manufactured. Alternatively, the DCEC ID 432 may be assigned when the dedicated device 400 is purchased or obtained by a content user, and the content user registers the dedicated device 400 or a user account with the closed network 200. If the DCEC ID 432 is assigned when the content user registers the dedicated device 400 or user account with the closed network 200, it will be necessary to assign a default or introductory DCEC ID to the DCEC 430 so that the DCEC 430 can access the closed network 200. The unique DCEC ID 432 and decryption key 434 are stored in the DCEC memory unit 433.

As shown in FIG. 3, the DCEC memory unit 433 may also store decryption algorithms 435 that can be used by the decryption unit 431 of the DCEC 430 to decrypt encrypted streamed content received from the closed network 200, random decryption algorithms that are received from the closed network 200, programmable decryption algorithms, and an address of a connection component of the closed network 200. The algorithms and address of the connection component of the closed network 200 stored in the DCEC memory unit 433 will be further described in detail below.

To prevent infringement of copyrighted content and to prevent the unauthorized distribution of non-copyrighted content, the DCEC 430 prevents streamed content received from the closed network 200 from being permanently stored in a memory of the dedicated device 400. The buffer memory 428 may have a large enough capacity to fully store a streamed content, but the DCEC 430 prevents the buffer memory 428 or the memory unit 460 of the dedicated device 400 from permanently storing streamed content received from the closed network 200. To this end, the detection component 436 of the DCEC 430 monitors the dedicated device 400 to detect whether the dedicated device 400 is modified in an attempt to be able to permanently store the streamed content received from the closed network 200. As shown in FIG. 3, when the detection component 436 detects such a modification, the detection component 436 outputs a detection instruction DTI to the cessation component 438. In response, the cessation component 438 requests confirmation of the detection instruction DTI from the detection component 436 to confirm the modification, according to an exemplary embodiment. If the detection component 436 confirms the modification, the cessation component 438 outputs a cease instruction CI. The cease instruction CI causes the DCEC 430 to stop functioning immediately, thereby rendering the dedicated device 400 incapable of accessing the closed network 200 or continuing a closed network communication session with the closed network 200 if the dedicated device 400 was communicating with the closed network 200 at the time of the modification.

The cessation component 438 requests confirmation from the detection component 436 to avoid the situation where the detection component 436 may have incorrectly interpreted a physical force applied to the dedicated device 400, for example, as a modification to permanently store streamed content received from the closed network 200. Once the cease instruction CI is issued from the cessation component 438, the DCEC 430 stops functioning immediately. The DCEC 430 in the dedicated device 400 cannot be replaced or repaired. In other words, once the DCEC 430 stops functioning, the dedicated device 400 is no longer able to request and receive streamed content from the closed network 200.

The present disclosure is not limited to the cessation component 438 requesting confirmation of the detection instruction DTI from the detection component 436. Alternatively, the cessation component 438 may be configured to automatically output the cease instruction CI to stop the DCEC 430 from functioning upon receipt of the detection instruction DTI, without first requesting confirmation of the detection instruction DTI.

Referring back to FIG. 2, the output unit 440 of the dedicated device 400 outputs (i.e., reproduces) the streamed content that is decrypted by the DCEC 430. In particular, the DCEC 430 outputs the decrypted streamed content to the processing unit 420, and the processing unit 420 outputs the decrypted streamed content to the output unit 440. The output unit 440 includes a processor 442, a display 444 and an audio reproduction unit 446. The processor 442 determines whether the decrypted streamed content contains content to be displayed, such as video data, image data, character data, message data, etc., and/or audio content. The content to be displayed is output to the display 444, and the audio content is output to the audio reproduction unit 446. The processor 442 also ensures that display content and audio content are appropriately synchronized when the decrypted streamed content includes both display content and audio content. As described above, the DCEC 430 prevents streamed content from being permanently stored in the dedicated device 400. To prevent streamed content from being permanently stored in the dedicated device 400, the DCEC 430 may be configured to instruct the processor 442 to automatically delete the decrypted streamed content once it has been reproduced by the display 444 and/or audio reproduction unit 446. Alternatively, when decrypting the encrypted streamed content, the DCEC processor 437 of the DCEC 430 may impose temporal limitations on the decrypted streamed content according to the processing speeds of the processing unit 420 and the processor 442. If the DCEC processor 437 imposes such temporal limitations, the processing unit 420 and the processor 442 may be configured to automatically delete the decrypted streamed content according to the imposed temporal limitations. Alternatively, the processor 442 may be configured to automatically delete the decrypted streamed content when it is reproduced by the display 444 and/or audio reproduction unit 446.

The memory unit 460 of the dedicated device 400 stores information assigned to the dedicated device 400, and a limited amount of information created by a user of the dedicated device 400. Of the assigned information, the memory unit 460 stores the unique user ID 402 assigned to a user of the dedicated device 400, and a device password PW to be entered by the user of the dedicated device 400. According to an exemplary embodiment, the user ID 402 is obtained from a user name and the password PW. As will be further explained below, user data is stored in the closed network 200 according to each respectively unique user ID 402. Consequently, if a user wishes to operate more than one dedicated device 400, the user ID 402 assigned to the user may be common for all dedicated devices 400 operated by that user. According to an exemplary embodiment, the user ID 402 will be assigned when the user registers the dedicated device(s) 400 with the closed network 200, and any dedicated device 400 added subsequent to the original registration will be assigned the same user ID 402 for the newly registered dedicated device(s) 400. It is to be noted, however, that the present disclosure is not limited to assigning the same user ID 402 to each dedicated device 400 registered by a user, if the user elects not to have such a common assignment.

Furthermore, one or a plurality of users may use one dedicated device 400. If a plurality of users use one dedicated device 400, each of the plurality of users will be assigned a respectively unique user ID 402 for that dedicated device 400. When a user obtains a dedicated device 400 with a content enabling component 430 installed therein and registers with the closed network 200 for the first time, the registering user may be treated as a parent user (e.g., billing user). Subsequently, if the parent user wishes to allow other individuals to use his or her dedicated device 400 to access content available in the closed network 200, the other individuals may be registered as child users of the parent user in the closed network 200. In particular, once the parent user has obtained a unique user ID 402 by registering his or her dedicated device 400 with the closed network 200, the parent user may use his or her unique user ID 402 to access the closed network 200 and then register child users having user IDs 402 that are different from the user ID 402 of the parent user. As will be further described below, the parent user may limit the child users' access to certain types and/or genres of content when registering one or more child users with the closed network 200.

The device password PW may be unique for each user of a dedicated device 400. Alternatively, all users of a dedicated device may share a common alphanumeric password PW. The device password PW may be alphanumeric character data, biometrics data and/or DNA data.

As described above, the memory unit 460 also stores a limited amount of information created by a user of the dedicated device 400. This limited information may be user favorites, menu items and payment information, as shown in FIG. 2. A user of the dedicated device 400 may store favorites such as favorite contents, favorite genres, favorite artists, etc.

The user favorites stored in the memory unit 460 may also include a menu of contents that were recently distributed to the dedicated device 400 from the closed network 200. The menu of recently distributed contents is based on the contents that were received by the dedicated device 400 within a predetermined period of time, such as one week or one month from the present date, for example. The predetermined period of time may be defined when the dedicated device 400 is manufactured, or the user of the dedicated device 400 may define the predetermined period of time for which the menu of recently distributed contents is associated. When operating the dedicated device 400, the user can retrieve the menu of recently distributed contents from the memory unit 460 and then select one or more of the contents listed in the menu to be redistributed to the dedicated device 400 from the closed network 200. In this manner, the user of the dedicated device 400 can select a content listed in the menu of recently distributed contents and request that the selected content be redistributed to the dedicated device 400, as opposed to searching for the content again among all the content available in the closed network 200.

The menu of recently distributed contents may be categorized in any conceivable way. For example, the menu of recently distributed contents can be categorized according to the type of each content, such as music, movies, documents, application software, game software, navigational directions, etc. The menu of recently distributed contents can also be categorized according to the name of the owner, artist, author or producer of each content recently distributed to the dedicated device 400. The menu of recently distributed contents can also be categorized according to the number of times that each content was distributed within the predetermined period of time for which the menu is associated, the total number of times each content listed in the menu was distributed, the time of day that each content was distributed to the dedicated device 400, a user rating assigned by the user to each content distributed to the dedicated device 400, a user-defined characterization or grouping of each distributed content (e.g., playlists and software used at work, home or school), etc. The entire menu of recently distributed contents can be cleared by the user, or the user can select and clear one or more of the contents listed in the menu of recently distributed contents at his or her discretion.

In addition, the user of the dedicated device 400 can designate or build a user profile depending on requested subscription services, or the user of the dedicated device 400 can designate predefined categories such as favorite sports, favorite sports teams, favorite types of movies, favorite types of music, favorite authors or artists, favorite news sources, favorite applications or game software, etc. The user of the dedicated device 400 can build a user profile based on any type of categorization. For example, the user can build his or her user profile for business, personal, entertainment, education and other types of uses. Furthermore, the user of the dedicated device 400 can request the closed network 200 to distribute content and/or a list of contents available in the closed network 200 that may be of interest to the user based on his or her profile. The profile of a user is also stored in the closed network 200 to provide the user with information on joining a community with other users that share the same interests, or the user can request the closed network 200 to find other users with similar interests on demand.

As described above, a parent user who wishes to register child users with the closed network 200 can limit the access of the child users to certain types of content. The parent user can accomplish this by designating a user profile for each child user. In particular, the parent user could designate the child user's age and prevent the child user from obtaining content from the closed network 200 that is deemed to be age-inappropriate for the child user. The user profile of each user is associated with the unique user ID 402 of the user in the dedicate device 400 and in the closed network 200. Therefore, when the child user requests content from the closed network 200 by using his or her unique user ID 402, the user profile defined by the parent user can prevent the child user from obtaining content that the parent user deems to be inappropriate for the child user. Similarly, in an employer-employee relationship where the employer registers with the closed network 200 as a parent user and subsequently registers the employee as a child user, the employer could limit the employee's access to certain types of content by designating a user profile for the employee that limits the employee's access to particular content.

The user favorites stored in the memory unit 460 are thus associated with the unique user ID 402 of the user. Therefore, if more than one user uses a dedicated device 400, the user favorites are associated with the unique user ID 402 of each user in the memory unit 460 and in the closed network 200.

The menu items stored in the memory unit 460 relate to general user interface commands such as a customizable interface, as well as to pre-stored or customizable toolbars, search commands, and character and voice entry input functions, for example.

The user of the dedicated device 400 may also store his or her payment information in the memory unit 460. For instance, a user may register a credit card, bank account or other payment source with the dedicated device 400. Since the closed network 200 is a global, secure network, the user can be confident that his or her payment information is always protected and not subject to interception. As will be further described below, the closed network 200 manages all billing and payment functions so that the user does not have to pay a content owner in order to receive and reproduce the content owner's content. For example, the payment information stored in the memory unit 460 enables a user to subscribe to content or request pay-per-view content without having to pay the owner or distributor of the content prior to reproducing the content. In addition, the user may also be paid for reproducing advertisements, infomercials or other information presentations that the user may request on demand. When the user reproduces advertisements, infomercials or other information presentations, a payment credit is applied to the user's payment information stored in the closed network 200. If the user reproduces a predetermined amount of advertisements, infomercials and/or information presentations, the user may fully satisfy his or her periodic subscription fees for accessing content in the closed network 200 or be compensated in excess of the amount of his or her periodic subscription fees.

The input unit 490 of the dedicated device 400 accepts user inputs to the dedicated device 400. For instance, the user of the dedicated device 400 may use the input unit 490 to input the password PW of the dedicated device 400 and submit search requests SR for particular content. In addition, as will be further described below, a user of the dedicated device 400 may receive application or game software, for example, from the closed network 200, in which case the user can operate the input unit 490 to enter commands as well as character and voice data to be transmitted to the closed network 200. As mentioned above, the password PW of the dedicated device 400 may be biometrics and/or DNA data. The input unit 490 may thus contain the necessary recognition components to obtain and recognize a user's biometrics and/or DNA data to be transmitted to the closed network 200. Therefore, the input unit 490 may be equipped with commercially available devices configured to detect biometrics and/or DNA data of the user, such as a fingerprint reader, retina scanner, and a DNA scanner, for example.

Figure 5:
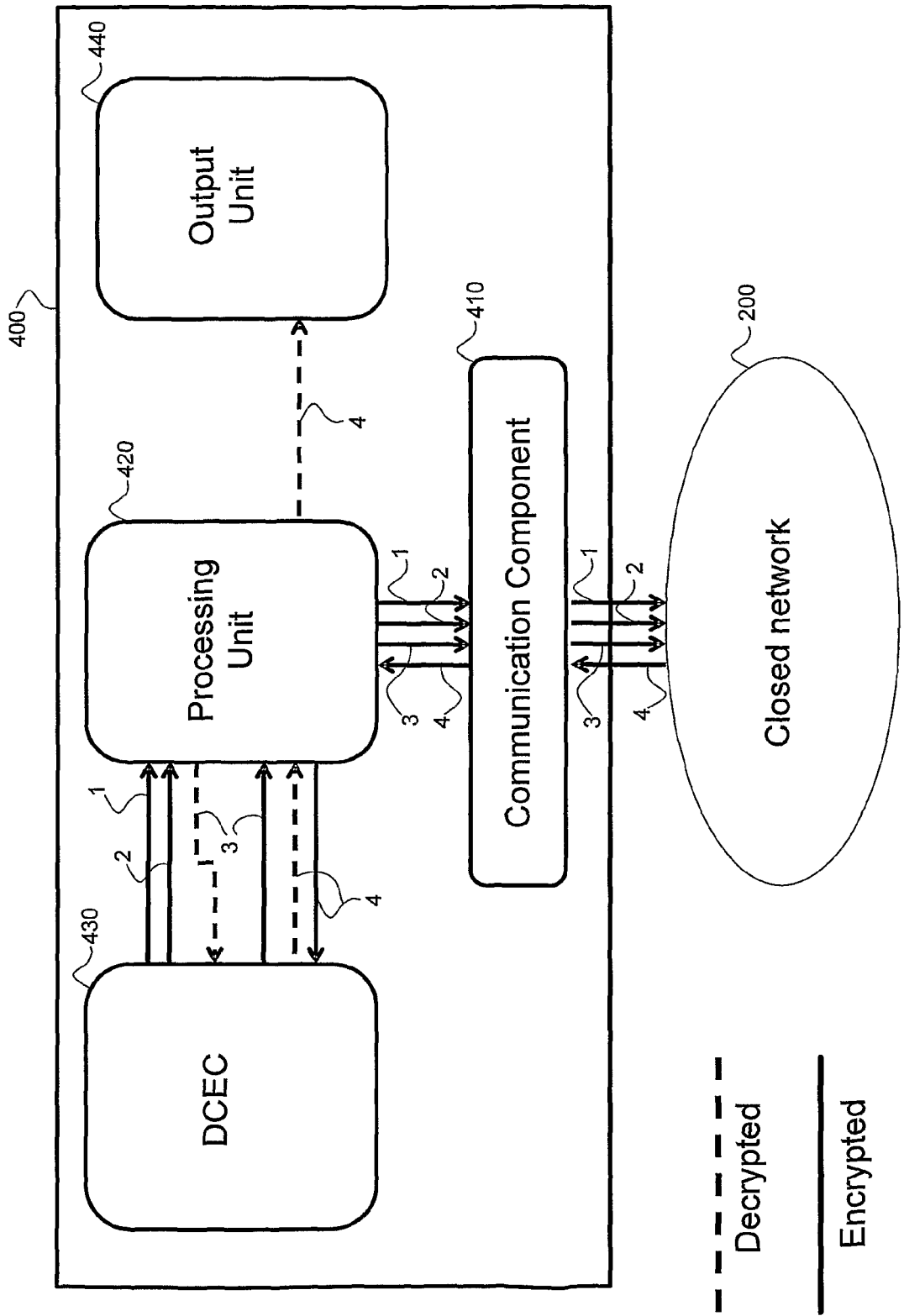
FIG. 5 is a conceptual diagram illustrating encryption and decryption processing performed in the dedicated device.

FIG. 5 is a conceptual diagram providing a general overview of encryption, decryption and communication processing performed in the dedicated device 400. The arrow denoted with number 1 illustrates that the DCEC 430 initiates a request for a secured, closed communication with the closed network 200 via the processing unit 420 and the first communication component 410 of the dedicated device 400. The establishment of a closed communication between the dedicated device 400 and the closed network 200 will be further described below in connection with the components of the closed network 200.

The arrow denoted with number 2 illustrates that an encrypted authentication message is sent from the DCEC 430 via the processing unit 420 and the first communication component 410 to the closed network 200. The encrypted authentication message actually consists of several messages sent between the DCEC 430 and the closed network 200 that may include the DCEC ID 432, the user ID 402, a content request CR and a content request ID (CR ID) 298, as will be further described below in connection with the components of the closed network 200.

The arrows denoted with number 3 illustrate that decrypted data sent from the processing unit 420 is encrypted by the DCEC 430 and then outputted to the closed network 200 via the processing unit 420 and the first communication component 410.

The arrows denoted with number 4 illustrate that encrypted streamed content is received from the closed network 200 by the DCEC 430 via the first communication component 410 and the processing unit 420. The DCEC 430 decrypts the encrypted streamed content and passes the decrypted streamed content to the output unit 440 via the processing unit 420. The output unit 440 outputs the decrypted streamed content as described above.

Collection Database

Figure 6:
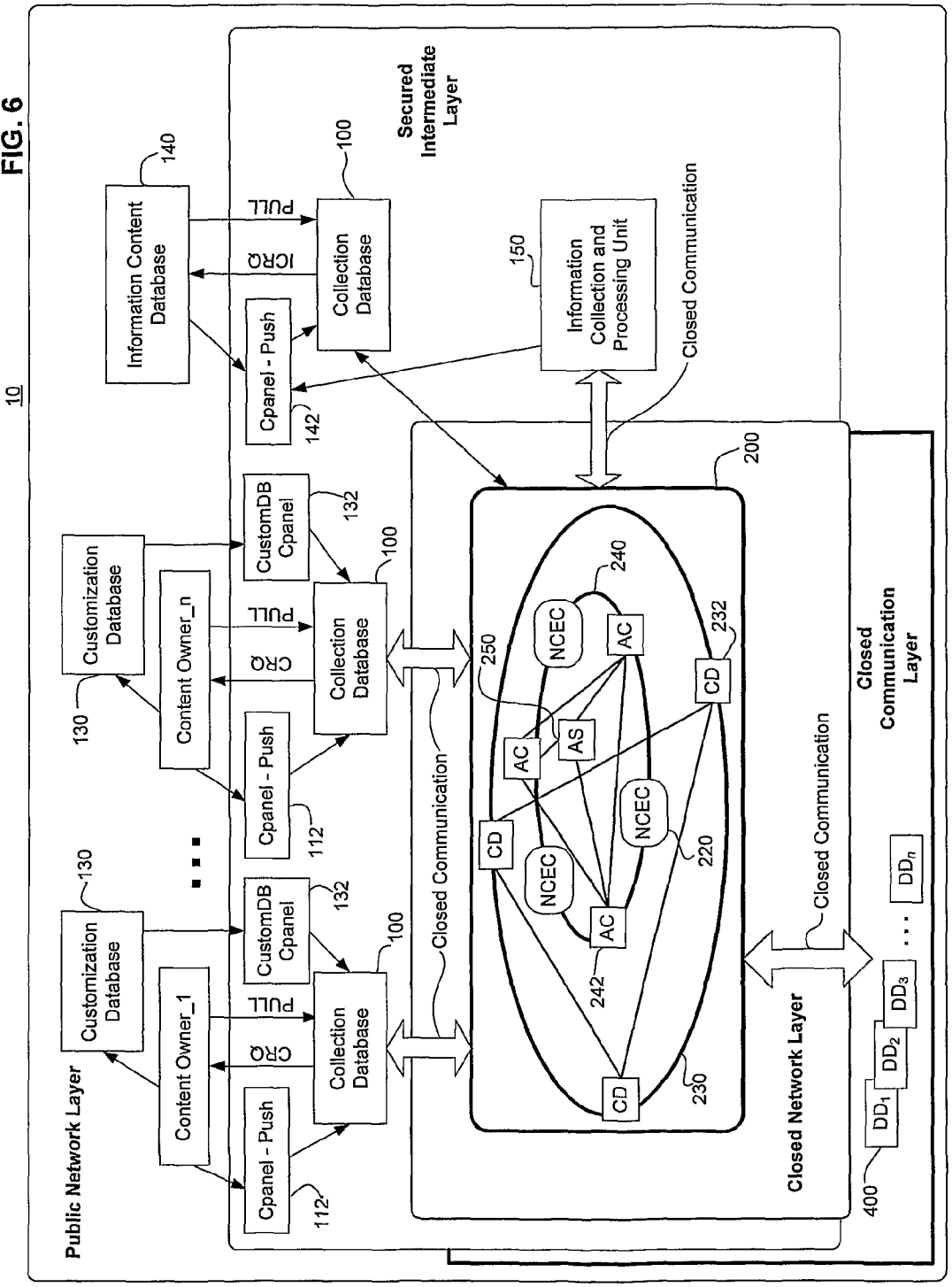
FIG. 6 is another conceptual diagram of the system according to an exemplary embodiment.

As shown in FIG. 1, the collection databases 100 are connected to the closed network 200, and receive content from content owners. The collection databases 100 temporarily collect contents that are authorized to be streamed to users of the dedicated devices 400 by the owner of the content. FIG. 6 illustrates another conceptual diagram of the system 10 according to an exemplary embodiment of the present disclosure, showing the functions of the collection databases 100 in more detail.

As shown in FIG. 6, the collection databases 100 are provided in a secured intermediate layer, separate from the public network 300 layer. The collection databases 100 are described as being in a secured intermediate layer, because the collection databases 100 are authorized to communicate with the closed network 200 and are authenticated by the closed network 200, as will be described below. On the other hand, the content owners are present within the public network 300 layer, because they are not authenticated by the closed network 200.

As shown in FIG. 6, a content owner can push his or her content to a collection database 100 via a control panel 112 of the content owner. The control panel 112 allows the content owner to push content to the collection database 100, compile content distribution, licensing fee information and payment information from the closed network 200, and control administration of the content. The content owner may be authenticated by the collection database 100 by using a digital certificate of the content owner embedded in control panel 112, for example. In particular, a digital certificate may be assigned to the content owner by a collection database 100, and the digital certificate may be embedded or stored in the control panel 112. When the content owner seeks to add or push content to the collection database 100, the collection database 100 may authenticate the digital certificate of the content owner by communicating with the control panel 112 of the content owner. Accordingly, the control panel 112 may reside in the secured intermediate layer as long as the content owner's digital certificate is authenticated by the collection database 100. The collection database 100 may also be configured to automatically extract or pull content from a database of the content owner whenever new or updated content is added to the database of the content owner.

Each content database 100 is assigned a respectively unique content database identifier 110, so that each content database ID 110 is different from all other content database IDs 110. In addition, each content owner is assigned a unique content owner identifier 110a, so that each content owner ID 101a is different from all other content owner IDs 110a. According to an exemplary embodiment, the unique collection DB ID 110 of each collection database 100 can represent an identifier 110a of the content owner.

The content collected in the collection databases 100 is stored only temporarily, because the collected content is distributed to the closed network 200 to be streamed to users of the dedicated devices 400. The collection databases 100 operate as a quarantine for the closed network 200 to ensure that only authorized content is distributed to the closed network 200. For example, to prevent viruses or other malicious content as well as spam and other unsolicited content from being transmitted to the closed network 200 and the dedicated devices 400, the collection databases 100 isolate each content and prevent such malicious and unsolicited content from being distributed to the closed network 200.

As shown in FIG. 6, the collection databases 100 communicate with the closed network 200 via a secured, closed communication that is established between and accessible to only the collection databases 100 and the closed network 200. The establishment of the closed communication between the collection databases 100 and the closed network 200 will be further described below.

A content owner may issue a content release request CRQ to the collection database 100 to request that content previously collected by the content database 100 and distributed to the closed network 200 be removed from the closed network 200. When a content release request CRQ is transmitted from a content owner, the collection database 100 transmits the content release request CRQ to the closed network 200 to cause the content identified in the content release request CRQ to be removed from the closed network 200.

Customization Database

As shown in FIG. 6, each content owner may be equipped with a customization database 130 for assigning customized settings to content collected in the collection database 100. The customization database 130 includes a control panel 132. Similar to the control panel 112 of the content owner, the customization database control panel 132 may reside within the secured intermediate layer when a digital certificate of the customization database 130 is authorized by the collection database 100. The content owners may also push content into the customization database 130, which then pushes content into the collection database 100, via the control panel 132 of the customization database 130.

The customized settings assigned by the customization database 130 may relate to language settings for a geographic region in which a user of the dedicated device 400 is located. In general, the customization database 130 may adopt or customize content to local needs. The customized settings are not limited to geography, however. A content owner may apply any customized setting to a particular content and then push the customized setting into the collection database 100. For example, a content owner may designate that content intended to be viewed by children may be customized to include graphics. Similarly, the font of text data included in a content intended to be viewed by senior citizens may be enlarged. Accordingly, in addition to geographic settings, the customized settings may be for any purpose the content owner desires.

The customized settings may be set to be activated for only certain user identifiers 402 of dedicated device 400, based on the respective user profiles of the users. In particular, when a user of the dedicated device 400 requests a particular content from the closed network 200, the user's user ID 402 is transmitted to the closed network 200. As described above, a user profile of each user is respectively associated with each user ID 402 registered in the closed network 200. Therefore, if customized settings are assigned to a particular content in the closed network 200 for certain user profiles, the user of the dedicated device 400 may receive content with customized settings from the closed network 200 based on his or her user profile.

The customized settings assigned to content in the collection database 100 are activated in the processing unit 420 of the dedicated device 400 when the encrypted streamed content is decrypted by the DCEC 430 and the decrypted streamed content is received by the processing unit 420.

Information Content Database

As shown in FIG. 6, the exemplary system 10 of the present disclosure also includes an information content database 140, which is connected to the collection database 100. The information database 140 may push information content through its control panel 142 that resides in the secured intermediate layer. Accordingly, similar to the control panels 112, 132, the collection database 100 can authenticate a digital certificate, for example, of the information database 140 embedded in the control panel 142 of the information content database 140.

The information database 140 may be the database of a marketing agency, advertising agency, or any other information provider. The information content may be a global advertisement, a local advertisement identifying goods or services within a predetermined geographic region, an information presentation or infomercial on requested goods or services, or a preview of content, for example. If the information database 140 is a marketing database, users of the dedicated device 400 may obtain financial payments for reproducing a predetermined number of advertisements during the user's subscription cycle.

A content database in the closed network 200 compiles usage statistics and payment information for each user, so that the marketing agency is able to aggregate remarkably accurate statistics for users who reproduce its advertisements, or for the particular types of content that each user requests and reproduces on his or her dedicated device 400. For example, if a monthly subscription fee for the closed network is considered to be $10, the user may be given 25 cents ($0.25) credit for each advertisement that he or she reproduces to completion. In this example, if the user reproduces forty advertisements to completion in one month, the user will not have to pay a subscription fee for that month. Furthermore, a user may even be compensated for reproducing advertisements distributed from the closed network 200, or a credit may be applied against the user's subscription fee.

An advantageous feature of the present disclosure is that content owners will likely be enthusiastic about permitting their content to be distributed in a secure, global environment, since their content will be protected against piracy. As a result, a significant amount of content is expected to be available to the users of the dedicated devices 400. The users of the dedicated devices 400 would then constitute a truly representative sample of the population, because the users would be attracted by the high volume of content available in the closed network 200. As a result, the information content database 140 can obtain accurate content distribution statistics for which users are reproducing its advertisements, infomercials and other presentations.

Similarly, the information content database 140 may be a database of a ratings organization or other information collection organization. Since usage statistics and payment information are recorded for each content distributed to each user of a dedicated device 400, the usage statistics and payment information are remarkably accurate with respect to each user and each user profile. As a result, remarkably accurate content usage and payment information can be aggregated and provided to ratings organization which are interested in the usage patterns of particular content. The information content database 140 may also be used by news services to determine the frequency of reproduction of particular news content by users of the dedicated devices 40. Usage statistics and payment information for each content streamed to a dedicated device can be compiled in the closed network 200 and provided to the information database 140.

As shown in FIG. 6, the exemplary system 10 of the present disclosure may include an information collection and processing unit 150 within the secured intermediate layer. Content usage and payment information recorded in the closed network 200 is distributed to the information collection and processing unit 150 from the closed network 200 through a closed communication established between the information collection and processing unit 150 and the closed network 200. The information collection and processing unit 150 can then transmit the distributed content usage and payment information to the information content database 140 via the authenticated control panel 142 of the information content database 140.

Closed Network

Referring to FIG. 1, the closed network 200 may include a first network 230, a second network 240, a plurality of closed network content enabling components 220, and an authentication server 250.

The first network 230 in the closed network 200 includes a plurality of content databases (CD) 232. The content databases 232 are mirrored and thus store identical content as each other. The content databases 232 are configured to automatically replicate the data and information stored in each of the content databases 232 whenever the data or information stored in one of the content databases 232 is updated or modified, such as when a content database 232 receives content from a collection database 100, for example. The first network 232 may include only one content database 232. However, it is advantageous to include a plurality of mirrored content databases 232. As described above, the closed network 200 is a global, secured network. Therefore, while the plurality of mirrored content databases 232 will have the same content stored therein, the physical location of one of the plurality of content databases 232 may be closer to a dedicated device 400 than another content database 232 in the first network 230, which may reduce the communication time it takes to distribute streamed content to the dedicated device 400. In addition, having mirrored content databases 232 provides a backup mechanism if one of the content databases 232 is disabled for maintenance, for example.

The content databases 232 store the content to be distributed to the dedicated devices 400, and distribute requested content to the dedicated devices 400 as streaming data. The content databases 232 also store user-related data that will be further described below. The plurality of content databases 232 may be collectively described hereinafter, unless otherwise noted.

The second network 240 includes a plurality of mirrored authentication centers (AC) 242. Similar to the plurality of content databases 232, the plurality of authentication centers 242 store identical content as a result of mirroring each other. The plurality of authentication centers 242 may be collectively described hereinafter, unless otherwise noted.

The authentication center 242 authenticates a dedicated device 400 by determining whether the user ID 402 received from the dedicated device 400 matches a user ID 402 stored in the authentication server 250. Upon authenticating the dedicated device 400, the authentication center 242 establishes a closed network session with the dedicated device 400 to enable the dedicated device 400 to transmit, to one of the content databases 232, a content request CR for streamed content stored in the content database 232.

The plurality of closed network content enabling components 220 in the closed network 200 are the counterparts of the DCEC 230 in the dedicated device 400. The closed network content enabling components 220 will hereinafter be abbreviated with "NCEC," which is an acronym for "network content enabling component." The plurality of NCECs 220 reside in the second network 240. The plurality of NCECs 220 may be described collectively hereinafter, unless otherwise noted. The NCEC 220 may encrypt streamed content requested by a user of the dedicated device 400, and the encrypted streamed content may then be distributed to the dedicated device 400 by the content database 232.

The authentication server (AS) 250 is in a different network layer than the plurality of content databases 232 (first network 230), the plurality of authentication centers 242 (second network 240) and the plurality of NCECs 220 (second network 240). The authentication server 250 can be considered to be the center point of the closed network 200. The authentication server 250 stores all information necessary for authenticating components in the system 10 external to the closed network 200, including the collection databases 100, the information collection and processing unit 150, and the dedicated devices 400, for example. The authentication server 250 also stores all information of the components of the closed network 200, such as the NCECs 220, content databases 232, and authentication centers 242, so as to control, modify and update the information stored in the components of the closed network 200, and control the functions of the components of the closed network 200. The closed network 200 is a decentralized network due to the aforementioned components being comprised in the first network 230 and the second network 240. However, since the authentication server 250 stores all information of the components of the closed network 200 and controls the functions of the components of the closed network 200, the closed network 200 can be considered to be a centralized network due to the control of the authentication server 250.

Figure 7:
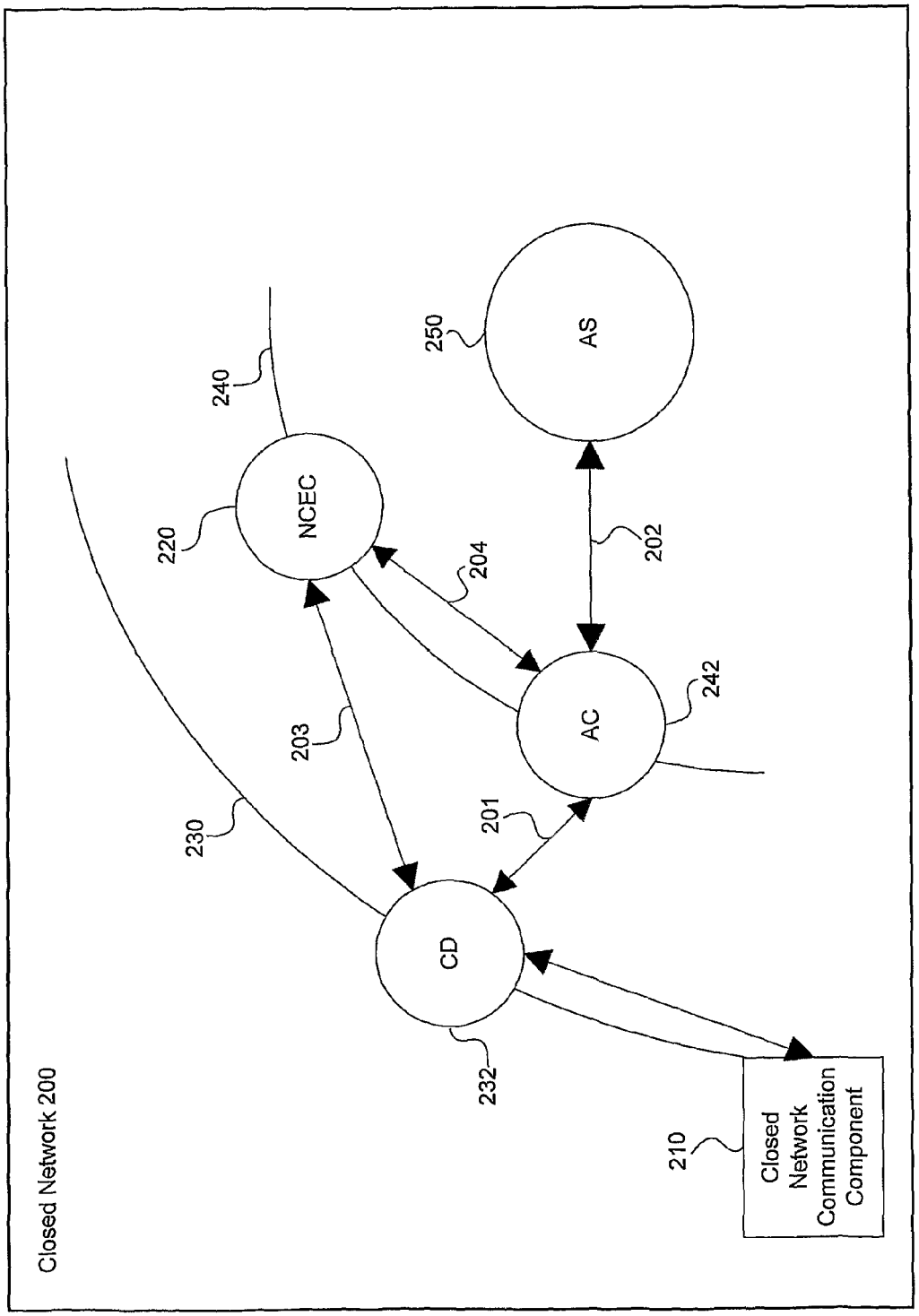
FIG. 7 is a conceptual diagram of the components of the closed network.

The network architecture and the secured, closed communication connections established between the aforementioned components of the closed network 200 are illustrated in FIG. 7, which is a conceptual diagram of the closed network 200. As illustrated in FIG. 7, the closed network 200 also includes a communication component 210, which may hereinafter be referred to as a "second communication component." The second communication component 210 is an interface of the closed network 200, and communicates with the first communication component 410 of the dedicated device 400, the collection databases 100, the information collection and processing unit 150 illustrated in FIG. 6, and any other component of the exemplary system 10 that is authorized to communicate with the closed network 200. The second communication component 210 of the closed network 200 establishes a closed communication connection between the first communication component 410 of the dedicated device 400 and the closed network 200, as will be further described below. The second communication component 210 also establishes a closed communication connection between the closed network 200 and the collection database 100 and between the closed network 200 and the information collection and processing unit 150, as will be further described below. The second communication component 210 resides on the first network 230, which is the outermost layer in the architecture of the closed network 200.

All communications transmitted to the closed network 200 from the dedicated devices 400, the collection databases 100, the information collection and processing unit 150, and any other component of the exemplary system 10 that is authorized to communicate with the closed network 200 must first pass through the second communication component 210, which then routes the received communications to one or more of the plurality of content databases 232. All communications intended for components of the exemplary system 10 external to the closed network 200 and authorized to communicate with the closed network 200 are distributed to one or more of the content databases 232 and then to the second communication component 210, when then transmits the communications to the intended component external to the closed network 200.

The NCEC 220 is illustrated in FIGS. 1 and 7 as being separate from the authentication center 242. The NCEC 220 may, however, be comprised in the authentication center 242. For ease of illustration, the drawings illustrate the NCEC 220 as being separate from the authentication center 242, but it is to be understood that the NCEC 220 may be comprised in the authentication center 242. Since the closed network 200 includes a plurality of authentication centers 242 and a plurality of NCECs 220, each one of the plurality of authentication centers 242 would include a corresponding NCEC 220, if the NCECs 220 are to be comprised in the authentication centers 242.

The closed network 200 includes a plurality of independent and secured, closed communications between the components of the closed network 200. As used herein, a "closed communication" is a secured, private communication between two components that is inaccessible to access from another individual or component. A closed communication is therefore a secured, private communication between two components in which only the two components are aware of the communication, and data transmitted during the closed communication is available to only the two components. The closed communications may be so-called tunnels in which data transmitted between the components is encapsulated to provide a secure communication between the components. The tunneling in the closed network 200 involves encapsulating data transmitted between the components with protocol information of each component and/or with session identifiers and session keys assigned during a session of communication between the components of the closed network 200. The technique for forming the closed communications between the components of the closed network 200 and the components of the exemplary system 10 that are authorized to communicate with the closed network 200 will be described below.

For ease of illustration, FIG. 7 illustrates only one NCEC 220, one content database 232, and one authentication center 242. It is to be understood, however, that each one of the plurality of content databases 232 may establish a closed communication with each one of the plurality of NCECs 200 and each one of the plurality of authentication centers 242, for example. The singular representation of each one of the content databases 232, the authentication centers 242, and the NCECs 220 in FIG. 7 represents the network security layers of each of these components of the closed network 200.

FIG. 7 illustrates that a first closed communication 201 is established between the content database 232 and the authentication center 242. FIG. 7 also illustrates that a second closed communication 202 is established between the authentication center 242 and the authentication server 250. A third closed communication 203 is established between the content database 232 and the NCEC 220. Furthermore, a fourth closed communication 204 is established between the NCEC 220 and the authentication center 242. It is to be noted that if the NCEC 220 is to be comprised in the authentication center 242, the third closed communication 203 established between the content database 232 and the NCEC 220 is unnecessary, because the first closed communication 201 would be effective for a closed communication between the content database 232 and the NCEC 220 when the NCEC 220 and authentication center 242 are unified within one component comprised in the second network 240. Similarly, if the NCEC 220 is to be comprised in the authentication center 242, the fourth closed communication 204 established between the NCEC 220 and the authentication center 242 is unnecessary, because the authentication center 242 and the NCEC 220 are unified within one component comprised in the second network 240. Each of the closed communications 201-204 is independent from each other, and requires separate access. Accordingly, although several drawings generically illustrate a closed communication within the closed network 200, it is to be understood that the closed network 200 includes the separate closed communications 201-204, or the separate closed communications 201-202 if the NCEC 220 and the authentication center 242 are to be unified within one component in the second network 240.

Figure 8:
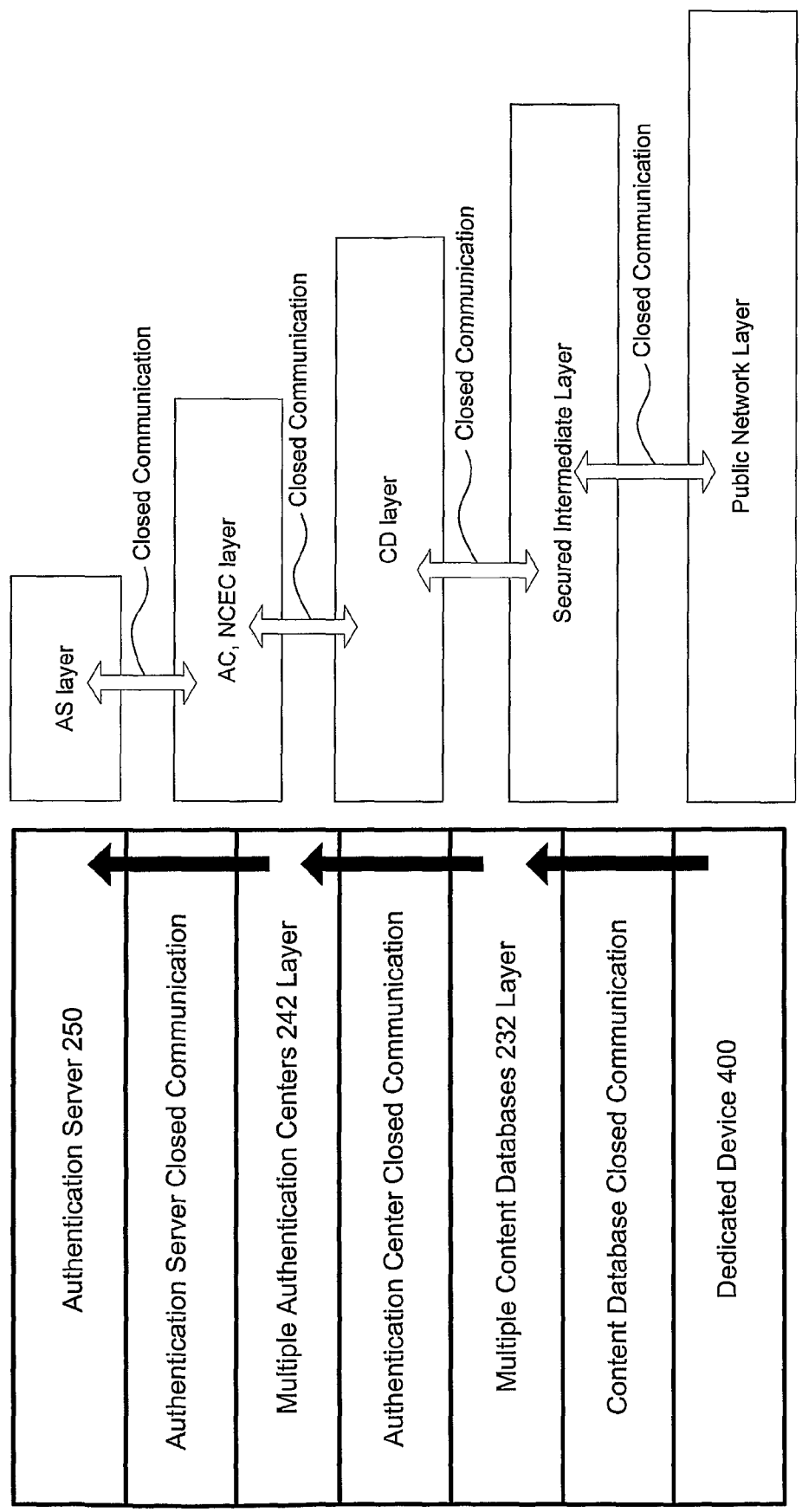
FIG. 8 illustrates a secured authentication topology implemented in the closed network.

The left-hand side of FIG. 8 illustrates a secured authentication topology implemented in the closed network 200. As will be further described below, a closed communication is established between the dedicated device 400 and one of the content databases 232 upon authentication of the DCEC ID 432 of the DCEC 430. The closed communication established between the dedicated device 400 and the content database 232 of the closed network 200 is illustrated as the lowest closed communication in the topology illustrated in the left-hand side of FIG. 8. The closed communication established with the dedicated device 400 is the lowest closed communication in the topology, because the content databases 232 are comprised in the first network 230, which is the outermost network layer in the architecture of the closed network 200. The next closed communication in the topology is between the content databases 232 and the authentication centers 242. The last closed communication in the topology is between the authentication centers 242 and the authentication server 250. As shown in FIG. 7, a closed communication also exists between the NCEC 220 and the authentication centers 242, and between the NCEC 220 and the authentication server 250, if the NCEC 220 is not comprised in the authentication center 242.

The right-hand side of FIG. 8 is another view of the secured authentication topology implemented in the exemplary system 10, with reference to the secured authentication topology illustrated in the left-hand side of FIG. 8. The right-hand side of FIG. 8 illustrates that the NCEC 220 and the authentication center 242 are within the same network layer, indicating that the NCEC 220 and authentication center 242 are comprised in the same component of the second network 240. The right-hand side of FIG. 8 also illustrates that components of the exemplary system 10 residing in the public network 300 layer, as shown in FIG. 6, must establish a closed communication in order to access the secured intermediate layer. For example, as described above, a collection database 100 authenticates the content owner, customization database 130 and information content database 140 residing in the public network 300 layer by using a respectively unique digital certificate that is assigned to the content owner, customization database 130 or information content database 140 and embedded in the control panel 112, 132, 142, respectively. Then, the collection database 100, information collection and processing unit 150 and any other component authorized to communicate with the closed network 100 must establish a separate closed communication in order to access the content database 232 layer of the closed network 100.

Figure 9:
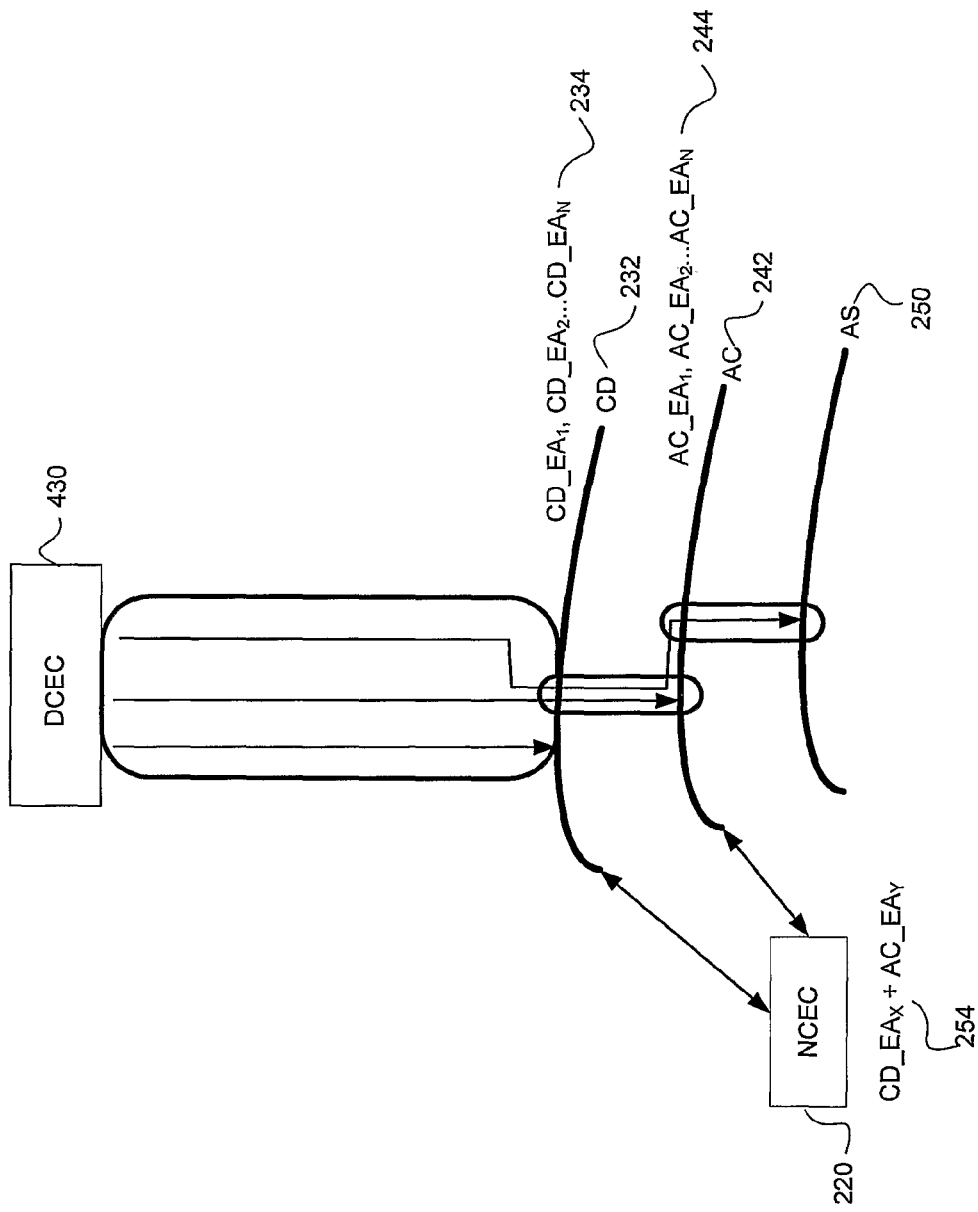
FIG. 9 is a conceptual diagram illustrating closed communication levels and mutated encryption algorithm selection.

FIG. 9 also illustrates the independent closed communications established between the DCEC 430 of the dedicated device 400 and the content database 232 layer, between the content database 232 layer and the authentication center 242 layer, and between the authentication center 242 layer and the authentication server 250. Each closed communication layer is separate from the other closed communication layers. Therefore, as shown in FIG. 9, a first closed communication is established between only the DCEC 430 of the dedicated device 400 and the content database 232, a second closed communication is established between only the content database 232 and the authentication center 242, and a third closed communication is established between only the authentication center 242 and the authentication server 250. If the NCEC 220 is not comprised in the authentication center 242, a fourth closed communication is established between the content database 232 and the NCEC 220, and a fifth closed communication is established between the authentication center 242 and the NCEC 220, as shown in FIGS. 7 and 9.

In view of the topology of the closed communications as described above, the DCEC 430 of the dedicated device 400 can communicate with only the content database 232 via the processing unit 412 and first communication component 410 of the dedicated device, as well as the second communication component 210 of the closed network 200, as shown in FIGS. 7 and 9. In other words, the DCEC 430 does not communicate directly with the authentication center 242, the NCEC 220 or the authentication server 250. As shown in FIGS. 7 and 9, only the authentication center 242 communicates with the authentication server 250 through a closed connection established between the authentication center 242 and the authentication server 250.

Therefore, information transmitted from the DCEC 430 is first transmitted to the content database 232 via the first communication component 410 of the dedicated device 400 and the second communication component 210 of the closed network 200, and the content database 232 then transmits the information to the authentication center 242. The information received by the authentication center 242 is then transmitted from the authentication center 242 to the authentication server 250. In addition, information transmitted from the authentication server 250 is transmitted to only the authentication center 242, and the authentication center 242 then transmits the information to the content database 232, which then transmits the information to the DCEC 430 via the second communication component 210 of the closed network 200. The content database 232 and authentication center 242 also communicate with the NCEC 220 between separate closed communications established between the content database 232 and the NCEC 220, and between the authentication center 242 and the NCEC 220 (if the NCEC 220 is not comprised in the authentication center 242).

Each of the aforementioned closed communications is independent and distinct from each other. Therefore, although several drawings generically illustrate one closed connection within the closed network 200, it is to be understood that the architecture of the closed network 200 includes the closed connections as illustrated in FIGS. 7-9. The present disclosure implements computer network authentication protocols such as Kerberos 5, Radius and AAA (Authentication, Authorization and Accounting protocol) for mutually authenticating each component in the closed connections established within the closed network 200, for example. Such closed connections typically involve three or more communications between two different layers. For example, the content database 232 will first send an authentication request to the authentication center 242. The authentication request may include an identifier of the content database 232. The authentication center 242 then may reply with an authentication response message that is encrypted with either a session key or the identifier of the content database 232. If the authentication response is encrypted with a session key, the encrypted authentication response will include data to be used by the content database 232 for responding to the authentication response from the authentication center 242. The content database 232 then authenticates the authentication center with a response to the authentication response. These encrypted communications secure the closed connections existing between the components of the closed network 200 as illustrated in FIGS. 7 and 9.

The components of the closed network 200 will now be described.

Content Database

The content databases 232 store the content to be distributed to the dedicated devices 400, and distribute requested content to the dedicated devices 400 as streaming data. As described above, the content databases 232 are the only components of the closed network 200 which communicate directly with the dedicated devices 400 through a closed communication, via the second connection component 210, according to an exemplary embodiment.

Figure 10A:
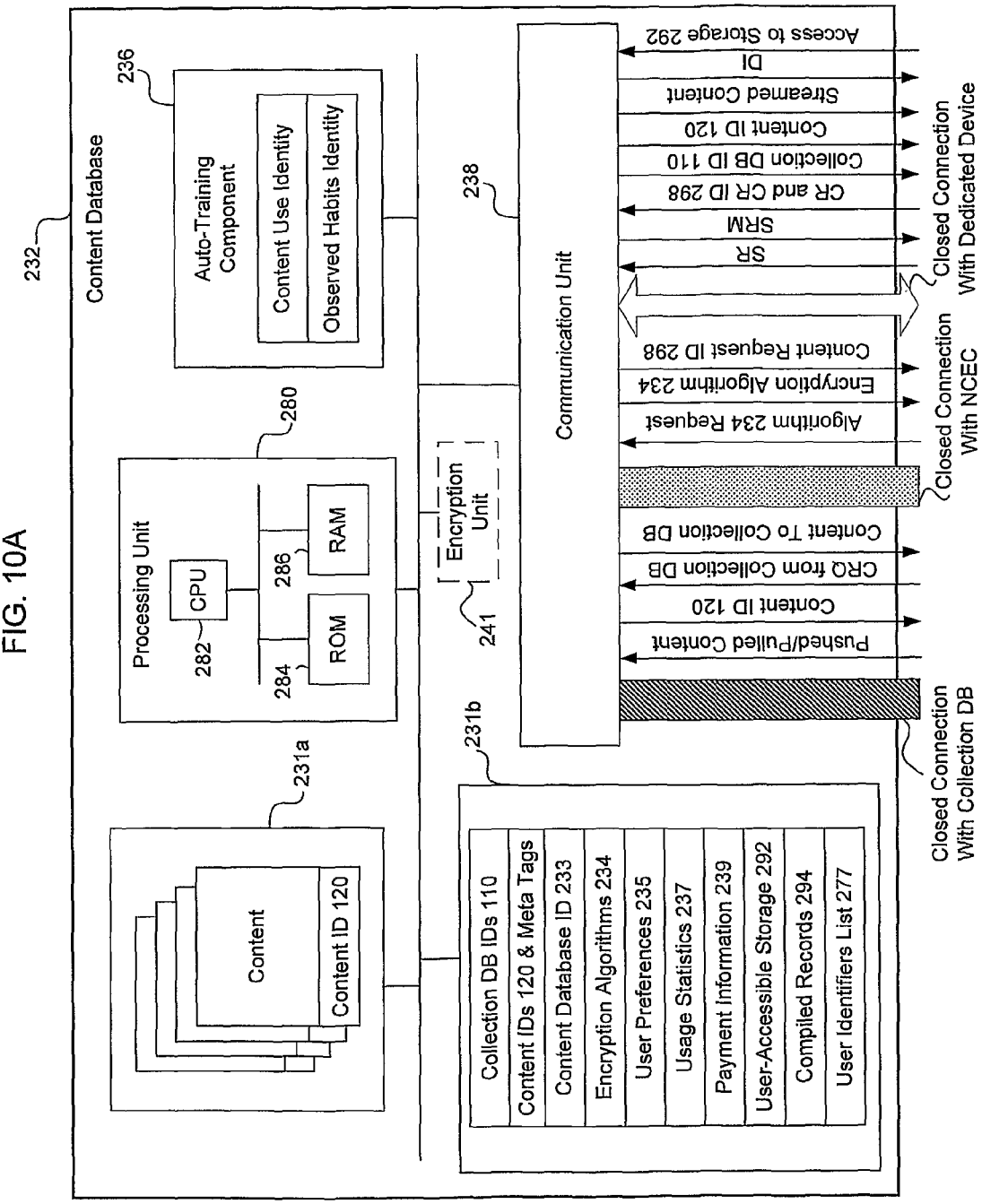
FIGS. 10A and 10B are conceptual diagrams illustrating exemplary components of a content database.
Figure 10B:
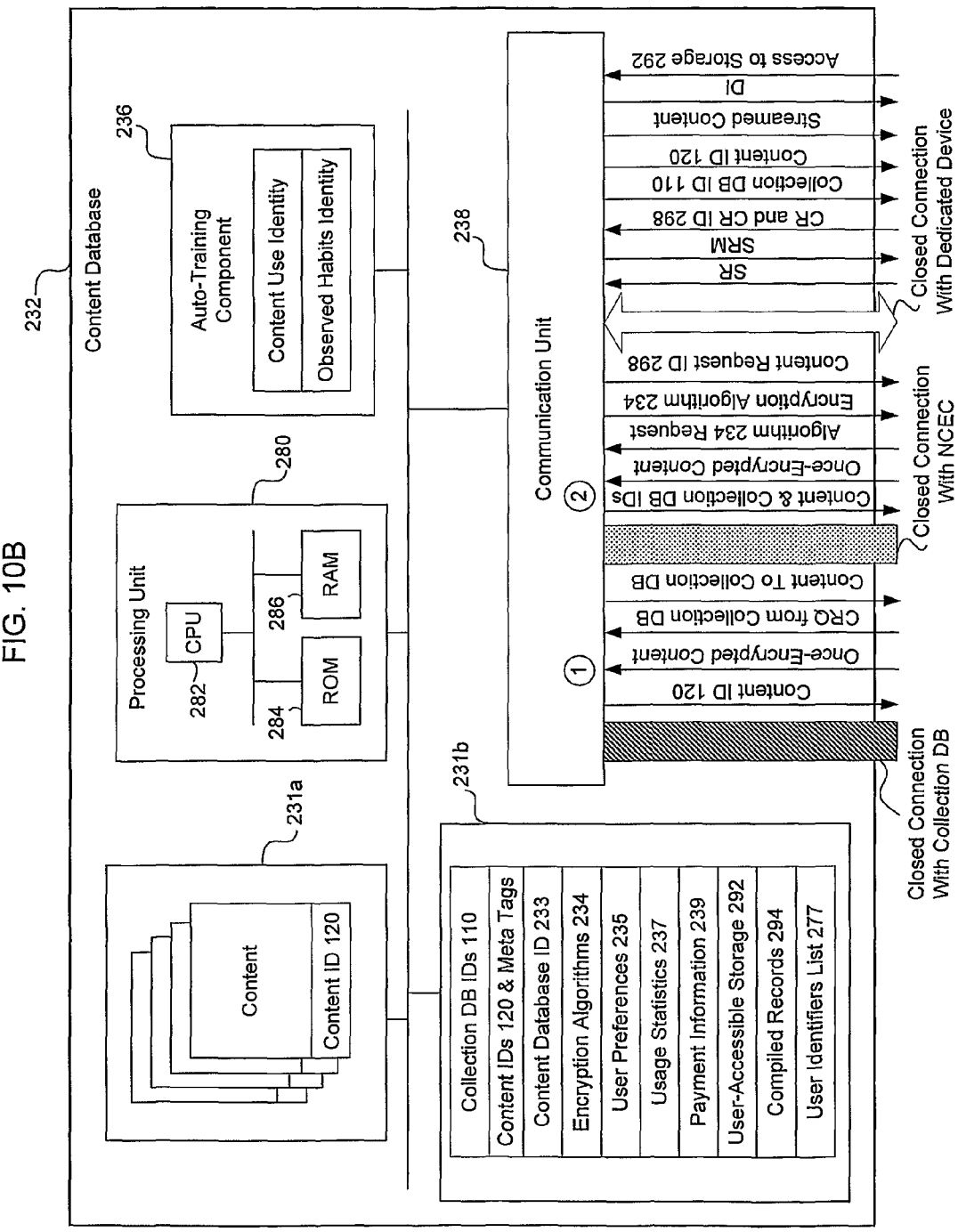

FIGS. 10A and 10B are block diagrams illustrating the components of the content database 232 according to exemplary embodiments of the present disclosure. FIGS. 10A and 10B differ with respect to whether the content received by the content database 232 is encrypted, and if so, the manner in which it is encrypted. The common features of the content database 232, as illustrated in FIGS. 10A and 10B, will be described first.

Initially, the content collected in the collection database 100 is transmitted from the collection database 100 to the content database 232, by either the push or pull methods described above, through a closed communication established between the collection database 100 and the content database 232. The content collected in the collection database 100 may be transmitted to only one of the content databases 232, or to multiple content databases 232. If the content is transmitted from the collection database 100 to only one of the content databases 232, the content database 232 receiving the content notifies the other content databases 232 in the first network 230 and transmits the received content to the other content databases 232 so that each content database 232 within the first network stores the same content. The transmission and communication protocol between the collection database 100 and the content database 232 will be described in more detail below. In addition, the content databases 232 are the components of the closed network 200 that distribute the streamed content to the dedicated devices 400.

As shown in FIGS. 10A and 10B, each content database 232 includes a memory 231*a*, a memory 231*b*, an auto-training component 236, a communication unit 238, and a processing unit 280. For ease of illustration, memories 231*a* and 231*b* are illustrated separately in FIGS. 10A and 10B. However, memories 231*a* and 231*b* may be unified as one memory in the content database 232.

The memory 231*a* stores content that has been pushed into the closed network 200 by the collection database 100, or that has been pulled into the closed network 200 by the content database 232. Each content stored in the memory 231*a* is assigned a respectively unique content ID 120, so that the content ID 120 of one content is different from the content ID 120 of another content. The content ID 120 of each content may be embedded in a portion of the content, such as in header portion of the content, as shown in the memory 231*a*. Alternatively or in addition thereto, the content ID 120 of each content may be stored in the memory 231*b* with a reference pointer or the like to the content assigned the particular content ID 120.

Each content stored in the content database 232 is indexed to be searchable by the dedicated device 400. For example, each content stored in the content database 232 may be indexed according to a meta tag of the content. The meta tag of each content may be stored in the memory 231*b* in association with the unique content ID 120 of the content, as shown in FIGS. 10A and 10B. The meta tag of each content may include at least one of an author of the content, a title of the content, a rating of the content, a release (production) date of the content, a genre of the content, a length of the content, a size of the content, a provider of the content, and a keyword associated with the content, for example.

As described above, each collection database 100 is assigned a respectively unique collection database identifier 110 (collection DB ID). The respectively unique collection DB IDs 110 of each collection database 100 are stored in the memory 231*b*.

Each content database 232 is also assigned a respectively unique content database identifier 233 which is different from the content database identifier 233 assigned to another content database 232 in the first network 230 of the closed network 200. The respectively unique content database IDs 233 of each content database 232 are stored in the memory 231*b*.

The memory 231b of the content database 232 also stores a plurality of encryption algorithms 234 that may be used to encrypt streamed content that is to be distributed to the dedicated device 400 by the content database 232. The NCEC 220 of the closed network 200 performs the encryption of the streamed content stored in the content database 232 before the streamed content is distributed to the dedicated device 400 by the content database 232. The NCEC 220 may obtain one or more of the plurality of encryption algorithms 234 by randomly selecting one of the plurality of encryption algorithms 234 to be used to encrypt the streamed content requested by the dedicated device 400, as will be further described below. The encryption algorithms 234 stored in the memory unit 231b may be updated by the authentication server 250, as will be further described below.

The memory 231b also stores user preferences 235, usage statistics 237 and payment information 239 for each user of a dedicated device 400 according to each user's respectively unique user ID 402. The user preferences 235 stored in the memory 231b correspond to the user preferences and favorites information stored in the dedicated device 400, and are respectively stored in association with each user ID 402 registered in the closed network 200. Since the user preferences 235 of a user are stored in association with the user's unique user ID 402, the content database 232 can assign the stored user preferences 235 to another dedicated device 400 operated by a user having the same user ID 402 for which the user preferences 235 are stored. Therefore, if a user acquires a new dedicated device 400 in addition to the dedicated device 400 for which the user preferences 235 were stored in the memory 231b of the content database 232, the user preferences 235 can be transferred to the new dedicated device 400.

The user preferences 235 additionally include a privacy policy defined by each user of a dedicated device 400. When a user (parent user or child user) of a dedicated device 400 registers with the closed network 200, the user defines his or her own privacy policy. The privacy policy may, for example, govern the amount of personal information of the user that may be collected in the closed network 200, and whether the closed network 200 is permitted to disseminate any collected personal information of the user to a third party, such as a marketing agency, ratings organization or other information collection organization. Since the user of a dedicated device 400 defines his or her own privacy policy when registering the dedicated device 400 with the closed network 200, as well as his user profile with the closed network 200, and since communications between the dedicated device 400 and the closed network 200 are through a closed communication inaccessible to unauthorized access, the user's private information will not be subject to interception when requesting or receiving streamed content from the closed network 200. In contrast to the present disclosure, when a user accesses a web site on the public network 300, for example, his or her private information is open to interception and collection by the owner or operator of each web site that the user visits, and to interception by third-party hackers.

Each streamed content requested and distributed to each dedicated device 400 is recorded as a usage statistic 237 in the memory 231b of the content database 232. The usage statistic 237 for each streamed content distributed to a dedicated device 400 is recorded in association with at least the user ID 402 of the user of the dedicated device 400 that requested the streamed content. For example, seasonal habit information can be recorded, such as the certain times of the year that a user requests particular content. The usage statistic 237 may also be recorded in association with other information, such as one or more of the DCEC ID 432 of the dedicated device 400 to which the content is distributed, the time and date that the streamed content was distributed to the dedicated device 400, a description or meta tag of the streamed content, the unique content ID 120 of the streamed content, the collection DB ID 110 of the collection database 100 from which the streamed content was received by the content database 232, the content owner ID 110a of the content, the user profile of the user of the dedicated device 400 to which the streamed content was distributed, the content database ID 233 of the content database 232 that streamed the content to the dedicated device 400, and a unique identifier 208 of the closed network 200, for example.

By recording and storing a usage statistic 237 for each streamed content requested and distributed to a dedicated device 400, the content database 232 is able to compile remarkably accurate statistics of content usage for each user and each user profile. Therefore, since only authorized dedicated devices 400 can obtain content from the content database 232 of the closed network 200, the content database 232 is able to compile and record remarkably accurate and comprehensive content usage statistics 237 for all content distributed to each dedicated device 400. Furthermore, by associating each usage statistic 237 with the above-described information, the usage statistics 237 permit the compilation and recordation of various types of content usage information that is of interest to content owners and many third parties, such as marketing agencies and content rights agencies. For example, a content owner will be able to learn precisely how many users requested and received his or her content, the frequency with which his or her content was requested, distributed and reproduced, and the ratings assigned to his or her content by users that received and reproduced the content, etc. Similarly, marketing agencies will be able to learn precisely how many users received a particular content, when the particular content was received, and the frequency of reproduction of the particular content.

The content database 232 may distribute the recorded usage statistics 237 to the information collection and processing unit 150, the collection database 100 contracted by information collection agencies, or to the control panel 142 of the information content database 140 periodically or on demand.

As described above, each user of a dedicated device 400 is able to define a privacy policy for the collection and dissemination of his or her personal information. If a user's privacy policy specifies that his or her personal information may not be collected and/or disseminated, the usage statistics 237 recorded in the content database 232 may be limited to the user's profile for aggregating the user's usage statistics 237 with other users having a similar user profile or other common attributes.

The memory 231b also stores payment information 239 for each user of a dedicated device 400, in association with the user's unique user ID 402. To obtain content from the closed network 200, a user of a dedicated device 400 may be charged a periodic subscription fee, a subscription fee that is based on the number of streamed contents distributed to the user's dedicated device 400, or a subscription fee allotting in advance the number of streamed contents that may be distributed to the user's dedicated device 400 during a predetermined distribution period, for example.

As described above, a user of a dedicated device 400 may store payment information in the memory unit 460 of the dedicated device 400. Since the dedicated device 400 and the content database 232 communicate through a secured, closed communication, the user of the dedicated device 400 can securely transmit his or her payment information in satisfaction of the user's subscription fee for accessing streamed content from the closed network 200.

The payment information 239, including electronic payments, recorded for each user is securely maintained in the memory 231b of the content database 232, and is distributed to only authorized collection entities and/or content providers. Accordingly, by obtaining payment information for each user of dedicated devices 400 registered in the closed network 200, the exemplary system 10 of the present disclosure obviates the need for content owners or providers to collect payments from a user of a dedicated device 400 before the user may obtain the content.

It is, of course, envisioned that a user of a dedicated device 400 may not be charged for accessing content available in the closed network 200 for a predetermined period of time. Even if a user is not charged for accessing content, the content database 232 may still retain payment information 239 for such users, since users may be compensated for reproducing advertising, infomercial and other information presentation content, as described above.

The memory 231b also includes a user-accessible storage 292. The user-accessible storage 292 is for storing content that is created by a user of a dedicated device 400 authorized to communicate with the closed network 200. The user-accessible storage 292 is respectively associated with each user ID 402 such that each user of a dedicated device 400 has his or her own storage area within the content database 232. In other words, the user-accessible storage 292 contains a unique storage area for each user registered in the closed network 200.

When communicating with the content database 232 through a closed communication, the DCEC 430 transmits the user ID 402 of the user operating the dedicated device 400. Therefore, the user-accessible storage 292 is only accessible to the user having the user ID 402 for which the user-accessible storage 292 was created. The content database 232 may configure the user-accessible storage 292 assigned to a particular user to permit access to the user's storage area in the content database 232 by another user that is authorized to access the user's storage area. That is, a user may designate one or more users that are authorized to access all of or only a portion of the user's user-accessible storage 292.

The user-created content may be content created in the dedicated device 400 by using streamed content received from the closed network 200. For example, if a user requests that a word processing software application be streamed to the user's dedicated device 400, the closed network 200 will distribute the graphical user interface (GUI) of the word processing software application to the dedicated device 400. If the user creates content, such as a letter or memorandum, for example, by using the distributed GUI of the word processing application, the user-created content will be streamed from the user's dedicated device 400 to the content database 232 that distributed the GUI of the application, and the user-created content streamed to the content database 232 will be stored in the user-accessible storage 292 of the content database 232 associated with the user's user ID 402.

The user-created content may also be content that is created independent of content distributed from the closed network 200. As described above, a dedicated device 400 may be any consumer or professional appliance as long as such appliance has a DCEC 430 installed therein that can be authenticated by the closed network 200. Consequently, a dedicated device 400 may be equipped with other content producing components such as a camera, audio and/or video recorder, optical scanner, and document or application production component, for example. Content created in the dedicated device 400 can be transmitted to the content database 232 to be stored in the user-accessible storage 292 for the user to be able to access the content on demand, to share the content with other authorized users or to simply store the content in a secure content database 232 that is immune from hacking, piracy or theft.

Furthermore, a user may authorize content stored in his or her user-accessible storage 292 to be distributed to another user's dedicated device 400. For example, if the user's dedicated device 400 is equipped with a camera, the user may store photographs taken with the camera in his or her user-accessible storage 292 of the content database 232, and authorize the stored photographs to be distributed to another user's dedicated device 400 that can develop and print the photographs. Similarly, if the user of a dedicated device 400 creates content by using streamed content distributed from the closed network 200, such as the GUI of a software application, for example, the user can store the user-created content in the user's user-accessible storage 292 of the content database 232, and authorize the user-created content to be distributed to another user's dedicated device 400. In addition, the dedicated device 400 of a user may be a health monitoring device equipped with a DCEC 430 that is registered with the closed network 200, and the health monitoring device may record biomedical statistics such as the user's blood pressure, blood sugar and heart rate, for example. In this case, the user of the health monitoring device, as a dedicated device 400, can securely transmit the recorded biomedical statistics to the closed network 200 through a closed communication established between the dedicated device 400 and the closed network 200 in order to store the biomedical statistics in the user-accessible storage 292 of the content database 232, and authorize the biomedical statistics stored in the user-accessible storage 292 to be distributed to a dedicated device 400 of a medical facility or medical healthcare professional.

Accordingly, the user of a dedicated device 400, which can be any consumer or professional appliance having a DCEC 430 installed therein, may transmit any content created in the dedicated device 400 to the user-accessible storage 292 of the content database 232 associated with the user's user ID 402, and authorize the content stored in his or her user-accessible storage 292 to be distributed to another user's dedicated device 400. Users that are authorized to obtain user-created content stored in another user's user-accessible storage 292 may be notified when content is newly stored to the other user's user-accessible storage 292 when accessing the closed network 200. Alternatively, the authorized users may periodically send a content request CR for user-created content stored in the other user's user-accessible storage 292.

The user-accessible storage areas 292 of the content database 232 therefore enable peer-to-peer (P2P) access to another user's created content from the closed network 200. To ensure that pirated content is not stored in a user's user-accessible storage area 292 and made accessible to another user of a dedicated device 400, the content database 232 may filter each content stored in a user-accessible storage 292 to determine whether the content was actually created by the user streaming the content to the closed network 200. For example, when a content is uploaded to a user-accessible storage 292 by a user of a dedicated device 400, the content database 232 indexes the content and assigns meta tags to the content according to discernible attributes of the content. If the meta tags of the content are similar or identical to the meta tags of another content received from the collection database 100 and stored in the memory unit 231b, the content database 232 may remove the content from the user-accessible storage 292 and thereby prevent other users from requesting that the uploaded content be distributed to their dedicated devices

400. In addition, the content database 232 may also determine whether the content uploaded to the closed network 200 contains proprietary or digital rights information, such as a watermark, for example, inserted into the content by another network or device. If such proprietary or digital rights information is contained in the content uploaded to the closed network 200, the content database 232 may remove the uploaded content from the user-accessible storage 292 to prevent other users from requesting that the uploaded content be distributed to their dedicated devices 400.

The memory 231*b* also stores records 294 that are respectively compiled for each user of a dedicated device 400 by the auto-training component 236 of the content database 232. The auto-training component 236 compiles a record 294 for each content requested and distributed to each user of a dedicated device 400, and associates each content requested and received by the dedicated device 400 with the user identifier 402 of the user operating the dedicated device 400. Based on the compiled record 294, the auto-training component 236 formulates and stores a content use identify CUI and an observed habits identity OHI for each user. The CUI and OHI formulated by the auto-training component 236 may be used to guard against theft or unauthorized use of a dedicated device 400, for example.

The CUI for each user identifies usage patterns and/or preferences for types of content based on the compiled record 294 for each content requested by and distributed to the user's dedicated device 400. For example, if a user of a dedicated device 400 regularly requests music of a particular genre, the auto-training component 236 formulates a CUI identifying a usage pattern and user preference for music of that genre, associates the formulated CUI with the user ID 402 of the user, and stores the user-associated CUI as a compiled record 294 in the memory 231*b* of the content database 232. The auto-training component 236 may formulate a CUI for a user based on the time of day that the user regularly requests content from the closed network 200, the type of content that the user regularly requests and whether the requested content is similar to content requested by other users with a similar user profile, and the geographic location from which the user regularly requests content. The examples of information described herein for forming a CUI are not intended to be exhaustive. It is to be understood that the auto-training component 236 can formulate a CUI based on any discernible information identifying a user's usage patterns and/or preferences.

The OHI formulated by the auto-training component 236 is similar to the CUI in that the auto-training component 236 observes discernible patterns of a user and records the observed habits as a compiled record 294 in the memory 231*b* of the content database 232. However, the OHI concerns observed operational habits of a user with respect to a user's operation of his or her dedicated device 400. Many users of consumer and professional appliances exhibit discernible habits in how they operate such appliances, although they may not be cognizant of such habits. For example, a user may regularly type the word "the" as t-e-h, the user may regularly highlight a portion of text with a mouse or other pointing tool when reading the portion of text, the user may regularly use lowercase letters for words whose first letter should be capitalized, or the user may regularly delete an entire misspelled word instead of correcting only the erroneous letter(s). The examples of habits described herein for forming an OHI are not intended to be exhaustive. It is to be understood that the auto-training component 236 can formulate an OHI for each user based on any discernible idiosyncrasies identifying a user's operation habits of his or her dedicated device 400.

The auto-training component 236 is thus a self-training component of the content database 232 that observes discernible usage patterns and/or preferences of a user as well as operation habits of a user, and formulates a CUI and OHI for each user based on the observed usage patterns and/or preferences as well as the observed operation habits of the user. Increased usage of a dedicated device 400 by a user will increase the knowledge base of the auto-training component 236.

After compiling a user record 294 identifying a CUI and OHI for the user and storing the compiled record 294 in association with the unique user ID 402 of the user in the memory 231*b*, the auto-training component 236 is able to monitor usage patterns, preferences and operation habits of a user of the dedicated device 400. If the auto-training component discerns that the usage patterns, preferences and/or operation habits are dissimilar to the CUI and/or OHI stored in the compiled record 294 for the user, the content database 232 is configured to transmit a disable instruction DI to the dedicated device 400 to disable the DCEC 430 of the dedicated device. If a disable instruction DI is transmitted from the content database 232 to a dedicated device 400, the DCEC 430 will immediately cease to function, thereby rendering the dedicated device 400 incapable of accessing the closed network 200 or continuing a closed network communication session with the closed network 200 if the dedicated device 400 was communicating with the closed network 200 at the time that the disable instruction DI was transmitted.

As described above, the DCEC 430 of a dedicated device 400 may not be repaired or replaced according to an exemplary embodiment. So as to prevent the content database 232 from transmitting a disable instruction DI prematurely, the auto-training component 236 may be configured to disregard dissimilar usage patterns, preferences and/or operation habits until such observed patterns, preferences and/or habits are repeated a predetermined number of times. In other words, the auto-training component 236 may be configured to not transmit the disable instruction DI until the number of detected dissimilar usage patterns, preferences and/or operation habits reaches a threshold level. The threshold level may be defined by the user upon registering his or her dedicated device 400 with the closed network 200, the threshold level may be uniformly defined for each type of dedicated device 400 when they are manufactured, or the threshold level may be defined on the basis of a user's profile, subscription arrangement or a geographic address of the user, for example.

The CUI and/or OHI stored in the compiled record 294 for each user can be effective in preventing the unauthorized use of a user's dedicated device 400, such as in the event of theft or loss of the dedicated device 400, for example. If the user's dedicated device 400 is lost, stolen or otherwise misappropriated and used by another individual, the other individual's usage patterns, preferences and/or operation habits will likely differ from the usage patterns, preferences and/or operation habits identified in the CUI and OHI stored in the compiled record 294 for the authorized user of the dedicated device 400, which would thereby cause the content database 232 to transmit a disable instruction DI to disable the user's misappropriated dedicated device 400. The dedicated device 400 password PW, which can include biometrics and/or DNA data as described above, provides another preventative measure against misappropriation of a user's dedicated device 400.

The content database 232 may also store a user identifiers list 277 in the memory 231*b*. In short, the user identifiers list 277 is a list of at least user IDs 402 of users that have violated the content-use policies of streamed content distributed from the closed network 200. The user identifiers list 277 will be described in greater detail below.

The processing unit 280 of the content database 232 includes a CPU 282, a ROM 284, and a RAM 286. The CPU 282 controls the aggregate functions of each component of the content database 232 as well as the interrelationship and interaction between the components of the content database 232. The ROM 284 stores executable programs and logic instructions which are implemented by the CPU 282, and the RAM 286 is used a working memory by the CPU 282 when executing the programs and logic instructions stored in the ROM 284.

The communication unit 238 of the content database 232 is the component for communicating with the NCEC 220 and the authentication centers 242 comprised in the closed network 200, and with, via the second communication component 210, the collection databases 100, the information collection and processing unit 150, and the dedicated devices 400, as well as any other component of the exemplary system 10 that is authorized to communicate with the closed network 200.

As described above, FIGS. 10A and 10B illustrate different exemplary embodiments of the present disclosure with respect to whether the content received by the content database 232 is encrypted, and if so, how it is encrypted.

According to one exemplary embodiment, the content to be distributed to the dedicated devices 400 is received by the content database 232 from the collection database 100 without the content being encrypted. This exemplary embodiment is illustrated in FIG. 10A. In this exemplary embodiment, the content database 232 may encrypt each content using the unique content ID 120 of the content and the collection database ID 110 of the collection database 100 from which the content was received. Alternatively, the content database 232 may encrypt each content using the unique content ID 120 of the content and the content owner ID 110a of the owner of the content.

The content database 232 may therefore optionally include an encryption unit 241 as shown in FIG. 10A. The content database 232 assigns a unique content ID 120 for each content that is received by the content database 232 from a collection database 100 according to either of the above-described push or pull methods. As described above, the content database 232 stores a respectively unique collection DB ID 110 for each collection database 100 that is authorized to communicate with the closed network 200.

Figure 11:
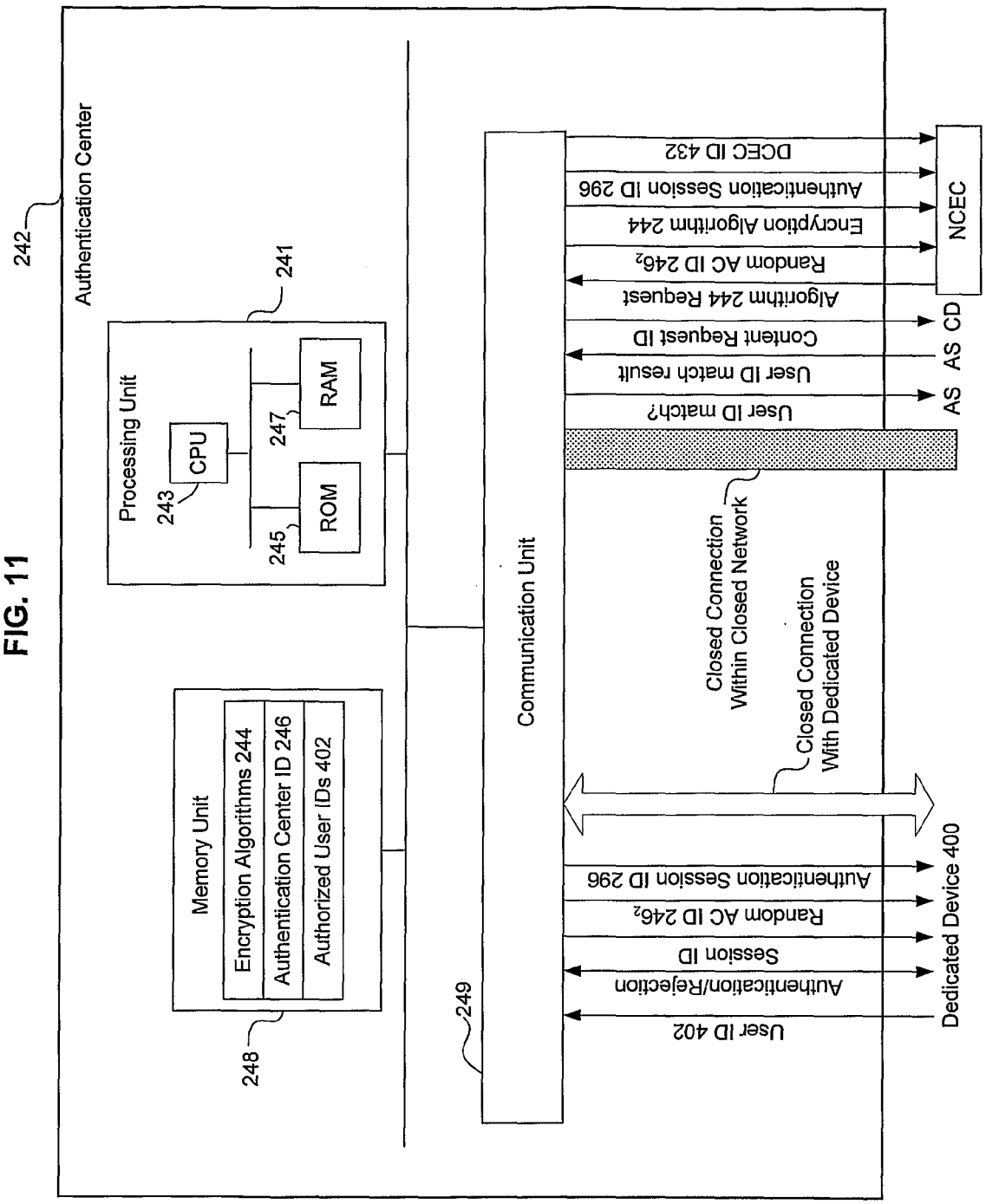
FIG. 11 is a conceptual diagram illustrating secure communications for uploading content to a content database.

FIG. 11 is a conceptual diagram illustrating a sequence of process for a secure exchange of information between components of the exemplary system 10 for acquiring content in the content database 232. FIG. 11 illustrates an example where a content owner pushes content into a collection database 100, and the collection database 100 pushes content into the content database 232. As described above with reference to FIG. 6, the content owner is located in the public network layer, while the control panel 112 of the content owner is located in the secured intermediate layer. The collection database 100 authenticates the control owner by authenticating a digital certificate stored in the control panel 112 of the content owner. In operation, the content owner, via his or her control panel, transmits a secured intermediate layer (SIL) connection request to the collection database 100. The content owner can transmit his or her unique content owner ID 101a with the SIL connection request so as to be identified to the collection database 100.

The collection database 100 then seeks authentication from the content database 232 to establish a closed communication with the content database 232. As described above, the closed communications established in the present disclosure may be tunnel communications, which involves the transmission of data through a network in such a way that routing nodes in the network are unaware that the transmission is part of a private network. According to an exemplary embodiment, tunneling is performed by encapsulating private and/or proprietary data information within network protocol data so that the tunnel data is not available to anyone or any device examining the transmitted data. In the context of communications between the collection database 100 and the content database 232, establishing closed communications by means of tunneling allows the use of the public network 300, such as the Internet, to carry data on behalf of the collection database 100 and content database 232 as though the collection database 100 and content database 232 had access to a private network therebetween.

As illustrated in FIG. 11, the collection database 100 and the content database 232 mutually authenticate each other. This mutual authentication establishes a closed communication between the collection database 100 and the content database 232, as illustrated in FIG. 6. For ease of illustration, the following describes communications between the collection database 100 and the content database 232. However, as described above, the collection database 100 and the content database 232 communicate with each other through the second communication component 210 of the closed network 200, because the second communication component 210 is the only component of the closed network 200 that has a publicly accessible address (e.g., IP address). For ease of illustration, the secure communications between the collection database 100 and the content database 232 will be described as though the collection database 100 and content database 232 communicate directly. However, it is to be understood that the collection database 100 and content database 232 communicate with each other via the second communication component 210 of the closed network 200.

According to an exemplary embodiment, the initiating device creates and transmits a session identifier (SID) to the recipient device when establishing a closed communication. The session identifier SID can be randomly generated by the initiating device, and serves as a generally unique identifier (GUID).

In the case of establishing a closed communication between the collection database 100 and the content database 232, the collection database 100 transmits a session identifier SID together with its collection DB ID 110. Upon receiving this communication from the collection database 100, the content database 232 compares the collection DB ID 110 received from the collection database 100 with the collection DB IDs 110 stored in the memory 213b of the content database 232. If the received collection DB ID 110 matches a collection DB ID 110 stored in the memory 213b, the content database 232 seeks further authentication from the authentication server 250 via the authentication center 242. As will be further described below, the authentication server 250 also stores, in a memory thereof, the respectively unique collection DB IDs 110 of all collection databases 100 that are authorized to communicate with the closed network 200. The authentication server 250 also confirms whether the collection DB ID 110 received by the content database 232 matches one of the collection DB IDs 110 stored in its memory. In operation, the content database 232 establishes a closed communication with the authentication center 242, and then the authentication center 242 establishes a separate closed communication with the authentication server 250. If the authentication server 250 authenticates the collection database 100 by confirming that the collection DB ID 110 received from the content database 232 matches one of the collection DB IDs 110 stored in its memory, the authentication server 250 transmits an authentication session ID (ASID) (i.e., authentication confirmation) to the authentication center 242 via the closed communication established between the authentication center 242 and the authentication server 250. The authentication center 242 then transmits another authentication session ID to the content database 232 via the closed communication established between the content database 232 and the authentication center 242, and the content database 232, in turn, transmits another authentication session ID to the collection database 100. The establishment of the closed communications and the separate authentications performed between (i) the content database 232 and the authentication center 242, and (ii) the authentication center 242 and the authentication server 250 will be described in further detail below.

Accordingly, when the collection database 100 transmits its collection DB ID 110 with the session ID to request authorization to push content into the content database 232, two separate authentications are performed for the collection database 100. If either of these authentications is negative, i.e., the collection database 100 is not determined to be a device authorized to communicate with the closed network 200, an authentication rejection message is transmitted from the content database 232 to the collection database 100.

On the other hand, if both authentications of the collection database 100 are successful, the content database 232 transmits an authentication session ID (authentication confirmation) to the collection database 100, by encapsulating the authentication session ID with the session ID previously received from the collection database 100. By encapsulating (i.e., encrypting) the authentication session ID with the session ID received from the collection database 100, only the collection database 100 that transmitted the session ID is able to decrypt the message transmitted from the content database 232. Accordingly, a closed communication is thereby established between the collection database 100 and the content database 232.

The collection database 100 may authenticate the content owner upon receiving the authentication confirmation from the content database 232 and establishing a closed communication with the content database 232, or the collection database 100 may proceed to authenticate the content owner independent of the authentication confirmation from the content database 232. As described above, the collection database 100 can authenticate the content owner by means of a digital certificate embedded in the control panel 112 of the content owner (see FIG. 6). The authentication of the content owner by the collection database 100 is illustrated as "SIL connection" in FIG. 11. Upon being authenticated by the collection database 100, the content owner may then transmit a content upload request, including the content data that is to be uploaded (pushed), to the collection database 100.

Upon receiving the content upload request, including the content data to be uploaded into the content database 232, the collection database 100 encapsulates the content upload request with the authentication session ID transmitted from the content database 232, and transmits the encapsulated content upload request to the content database 232.

Encapsulating the content upload request with the authentication session ID serves to further enhance the closed communication established between the collection database 100 and the content database 232, because only the content database 232 is aware of the authentication session ID. The content database 232 then decrypts the encapsulated content upload request with the authentication session ID that it generated and transmitted to the collection database 100. The content database 232 then generates a content upload acknowledgement message, encapsulates the content upload acknowledgement message with the content upload request transmitted from the collection database 100, and transmits the encapsulated content upload acknowledgement message to the collection database 100. The content upload acknowledgement message can include a temporary content ID to be assigned to the content that is requested to be pushed into the content database 232. The temporary content ID can be randomly generated by the content database 232. Alternatively, the content database 232 can generate a temporary content ID corresponding to the content owner ID 110a, or a derivative thereof.

The collection database 100 decrypts the encapsulated content upload acknowledgement message received from the content database 232, by using the content upload request previously transmitted to the content database 232, and transmits the decrypted content upload acknowledgement message to the content owner. The content owner, in turn, can upload content to the collection database 100 via his or her control panel 112. Upon receiving the uploaded content, the collection database 100 can push the content to the content database 232, by encapsulating the content with the content upload acknowledgement message previously transmitted from the content database 232. Alternatively, the collection database 100 could encapsulate the content with the temporary content ID generated by the content database 232. The content database 232 then decrypts content to be stored in the memory 231a by using either the content upload acknowledgement message or the temporary content ID, depending on which information the content was encapsulated with by the collection database 100. The content database 232 then assigns a unique content ID 120 for each content that is received from the collection database 100. The content database 120 can then inform the collection database 100 of the unique content ID 120 for each content received from the collection database 100, so that the owner of the content can be aware of the content ID 120. Alternatively, the collection database 100 can assign the unique content ID 120 for each content originating from the collection database 100, in which case the content ID 120 is retained by the content database 232.

The above discussion focused on an example where content is pushed from the collection database 100. Similar operations are performed for authenticating the collection database 100 by the content database 232 and establishing a closed communication therebetween. In addition, the content database 232 can be configured to pull content uploaded to the collection database 100 when notified by the collection database 100 that content was uploaded thereto via the control panel 112. The above discussion is also applicable to obtaining content from the information content database 140 illustrated in FIG. 6.

In the exemplary embodiment described above, the collection databases 100 are known to the content database 232 and the authentication server 250. Additional collection databases 100 can be added to the exemplary system 10 or removed from the exemplary system 10 as desired. To add or remove a content database 100 from the system 10, an administrator of the authentication server 250 can update the content DB IDs 110 stored in the memory of the authentication server 250, and the authentication server 250 will accordingly update the content DB IDs 110 stored in the memory 231b of the content database 232. Any change which happens or which is necessary in the closed network 200 is immediately implemented in the closed network 200 via the authentication server 250. The closed network 200 is decentralized but the components of the closed network 200 are updated according to commands issued by the authentications server 250.

The foregoing description of the secure communications illustrated in FIG. 11 are illustrated in FIGS. 10A and 10B with respect to the communication unit 238, to the right of the illustrated closed communication established between the content database 232 and the collection database 100. As described above, the collection database 100 may also receive a content release request CRQ by the owner of the content, and transmit the content release request CRQ to the content database 232 through the closed communication established between the collection database 100 and the content database 232. Upon receiving the content release request CRQ, the content database 232 will cause the content identified in the content release request CRQ to be removed from the memory 231 and returned to the collection database 100, which will then return the removed content to the content owner. The remaining communication functions of the communication unit 238 will be further described below.

As described above, FIG. 10A illustrates an exemplary embodiment in which the content is received by the content database 232 without the content being encrypted. In this exemplary embodiment, the encryption unit 241 of the content database 232 may encrypt each content using the unique content ID 120 of the content and the collection database ID 110 of the collection database 100 from which the content was received. Alternatively, the content database 232 may encrypt each content using the unique content ID 120 of the content and the content owner ID 110a of the owner of the content. The content database 232 may encrypt the content before it is streamed to a dedicated device 400, or the content database 232 can encrypt the content upon being uploaded to the content database 232 and store the content in an encrypted form.

According to an alternative embodiment, the content database 232 may be configured to not encrypt the content and store the content in an unencrypted form.

FIG. 10B illustrates another exemplary embodiment of the content database 232, in which the content is encrypted by either the collection database 100 (①in FIG. 10B). According to this exemplary embodiment, each content received by the content database 232 from the collection database 100 is encrypted in the collection database 100 by using the unique content ID 120 of the content and the unique collection database identifier 110 of the collection database 100 from which the content is received. Alternatively, each content received from the collection database 100 may be encrypted in the collection database 100 by using the unique content ID 120 of each content and the unique content owner identifier 110a of the owner of the content. Still alternatively, the content may be encrypted in a database of the content owner and transmitted to the collection database 100 and then to the content database 232 as encrypted content. In these exemplary embodiments, the content database 232 receives the content to be distributed to the dedicated devices 400 from the collection database 100 as encrypted content.

FIG. 10B illustrates another exemplary embodiment of the content database 232, in which the content is encrypted by the NCEC 220 (②in FIG. 10B). In this exemplary embodiment, each content is encrypted by the NCEC 230 of the closed network 200 as the content is transmitted from the collection database 100 to the content database 232. In particular, when the content database 232 establishes a closed communication with the collection database 100 to obtain content to be streamed to the dedicated devices 400, the content database 232 notifies the NCEC 230 that it is receiving content from the collection database 100. This notification from the content database 232 may include the collection database identifier 110 and the unique content ID 120, which is assigned by the content database 232 but may alternatively be assigned by the collection database 100. The NCEC 230 then encrypts each content received by the collection database 232 by using the unique content ID 120 of each content and the collection database ID 110 of the collection database 100 from which the content database 232 has received the content. Alternatively, the NCEC 230 may encrypt each content by using the unique content ID 120 of each content and the content owner ID 110a of the content.

The content that is encrypted and stored in the content database 232 as encrypted content according to any one of the above-described exemplary embodiments is referred to herein as once-encrypted content.

Accordingly, the content to be streamed to the dedicated device 400 may be once-encrypted and stored in the content database 232. When streamed content is requested by a user of a dedicated device 400, the once-encrypted content may be encrypted again according to a randomly selected encryption algorithm and/or the combination of randomly selected encryption algorithms, for example, and twice-encrypted streamed content is then streamed to the dedicated device 400.

Alternatively, the content to be streamed to the dedicated device 400 may not be encrypted when it is stored in the content database 232, as shown in FIG. 10A. According to this exemplary embodiment, the content may be once-encrypted before it is streamed to a dedicated device 400 whose user requested the content.

The various communications performed by the communication unit 238 of the content database 232 according to the above-described exemplary embodiments and the various encryption techniques employed in the present disclosure will be explained in greater detail below.

Authentication Center

The plurality of authentication centers 242 reside in the second network 240 of the closed network 200, and are an intermediary component between the authentication server 250 and the content databases 232 residing in the first network 230 of the closed network 200, as shown in FIGS. 6 and 7, for example. As described above, the NCECs 220 residing in the second network 240 may be comprised in a corresponding one of the plurality of authentication centers 242. For clarity of explanation, the NCECs 220 will be described below as being a separate component from the plurality of authentication centers 242. However, it is to be understood that the NCECs 220 may be comprised in a corresponding one of the plurality of authentication centers 242. When the NCECs 220 are not comprised in a corresponding one of the plurality of authentication centers 242, the plurality of authentication centers 242 also serve as an intermediary component between the authentication server 250 and the NCECs 220.

Similar to the content databases 232, the authentication centers 242 are mirrored so that they store identical content as each other.

The plurality of authentication centers 242 are the only components of the closed network 200 which communicate with the authentication server 250. For the sake of simplicity, the plurality of authentication centers 242 may hereinafter be collectively described, unless otherwise noted.

Figure 12:
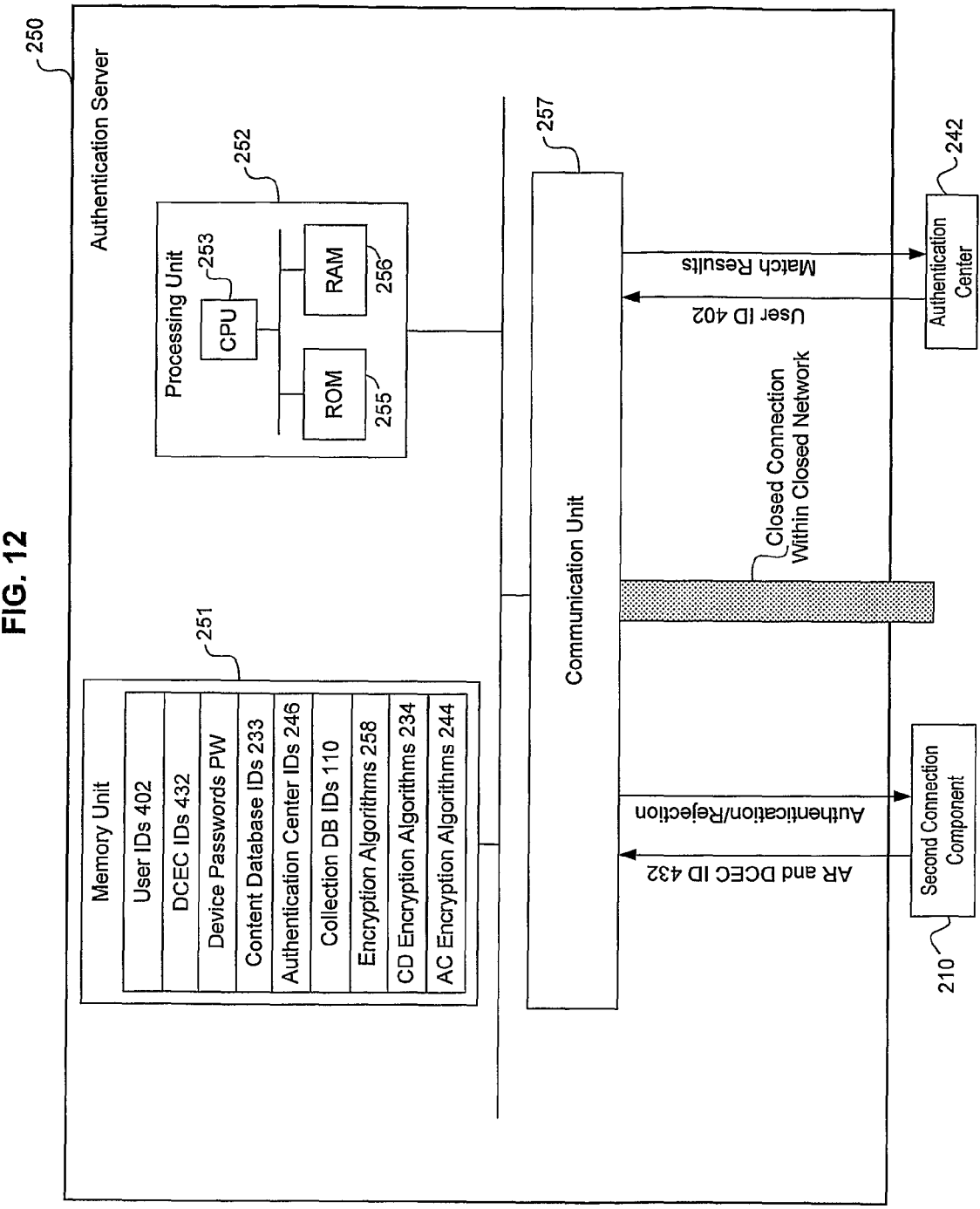
FIG. 12 is a block diagram illustrating exemplary components of an authentication center.

FIG. 12 is a block diagram illustrating the components of the authentication center 242 according to an exemplary embodiment of the present disclosure. As shown in FIG. 12, the authentication center 242 includes a processing unit 241, a memory unit 248, and a communication unit 249.

The processing unit 241 of the authentication center 242 includes a CPU 243, a ROM 245, and a RAM 247. The CPU 243 controls the aggregate functions of each component of the authentication center 242 as well as the interrelationship and interaction between the components of the authentication center 242. The ROM 245 stores executable programs and logic instructions which are implemented by the CPU 243, and the RAM 247 is used a working memory by the CPU 243 when executing the programs and logic instructions stored in the ROM 245.

The memory unit 248 stores a plurality of encryption algorithms 244 that may be used to encrypt streamed content to be distributed to the dedicated device 400 by the content database 232. The NCEC 220 of the closed network 200 performs the encryption of the streamed content stored in the content database 232 before the streamed content is distributed to the dedicated device 400 by the content database 232. The NCEC 220 may obtain one of the plurality of encryption algorithms 244 by randomly selecting one of the plurality of encryption algorithms 244 to be used to encrypt the streamed content requested by the dedicated device 400, as will be further described below. The encryption algorithms 244 stored in the memory unit 248 may also be updated by the authentication server 250, as will be further described below.

Each authentication center 242 is assigned a respectively unique authentication center identifier 246 that is distinct from an authentication center identifier 246 assigned to another authentication center 242 comprised in the closed network 200. The respectively unique authentication center identifier 246 of each one of the plurality of authentication centers 242 is stored in the memory unit 248.

When a user of a dedicated device 400 initiates communication with the closed network 200, one of the authentication centers 242 determines whether to authenticate the DCEC 430 of the dedicated device 400 by determining whether the DCEC ID 432 of the DCEC 430 matches a DCEC ID 432 stored in the authentication server 250. In particular, when a user controls his or her dedicated device 400 to access the closed network 200, the DCEC 430 of the dedicated device 400, via the first communication component 410, transmits an authentication request AR to the second communication component 210, which in turn routes the authentication request AR to one of the content databases 232. Since all the content databases 232 are mirrored and store identical content as each other, the second communication component 210 can randomly select one of the content databases 232 or select a predetermined one of the content databases 232, and then route the received authentication request AR to the selected content database 232. The selected content database 232 then transmits the received authentication request AR to one of the authentication centers 242 through the closed communication 203 illustrated in FIG. 7. Since all the authentication centers 242 are mirrored and store identical content as each other, the selected content database 232 can randomly select one of the authentication centers 242 or select a predetermined one of the authentication centers 242 that is to receive the authentication request AR.

Figure 13:
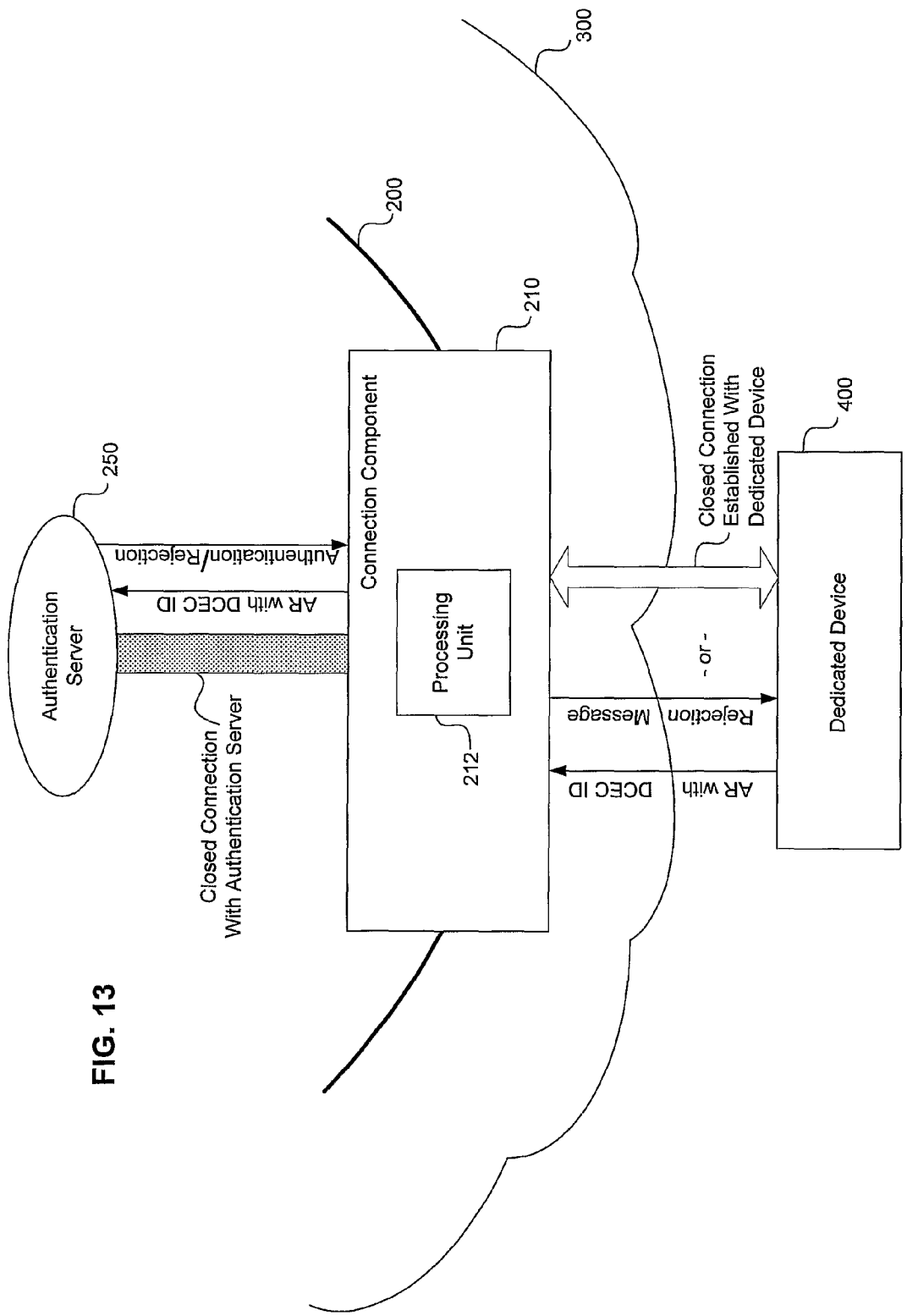
FIG. 13 is a conceptual diagram illustrating authentication of a dedicated device.
Figure 16:
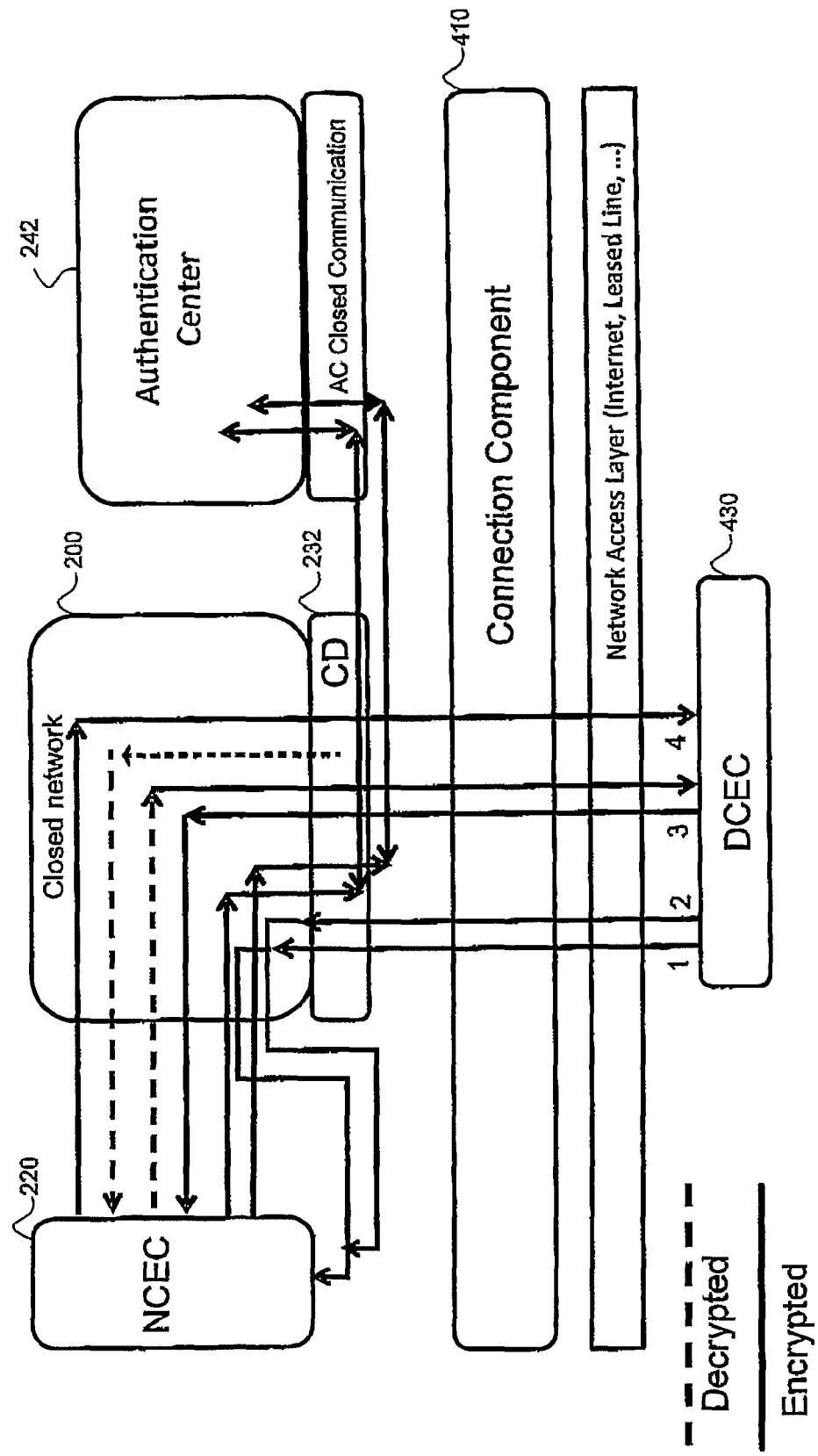
FIG. 16 is a conceptual diagram of a system for securely communicating content.

The authentication request AR transmitted from the DCEC 430 includes its unique DCEC ID 432. The authentication center 242 receiving the authentication request AR from the selected content database 232 then transmits the authentication request AR to the authentication server 250, which stores all authorized DCEC IDs 432 in a memory unit 251 thereof that will be further described below with reference to FIG. 16. If the DCEC ID 432 of the DCEC 432 that transmitted the authentication request AR is registered in the authentication server 250, the authentication server 250 transmits an authentication message to the authentication center 242 that received the authentication request AR. On the other hand, if the DCEC ID 432 included in the authentication request AR is not registered in the authentication server 250, the authentication server 250 transmits a rejection message to the authentication center 242 that received the authentication request AR. FIG. 13 is a conceptual diagram illustrating the above-described technique of authenticating or rejecting the dedicated device 400. For ease of illustration, FIG. 13 does not include either the content database 232 or authentication center 242. However, in view of the foregoing discussion, it is to be understood that the dedicated device 400 communicates with only the second connection component 210, the second connection component 210 communicates with only the content database 232, the content database 232 communicates with only the authentication center 242 and the NCEC 220, provided that the NCEC 220 is not comprised in the authentication center 242, and the authentication center 242 communicates with the authentication server 250.

The authentication center 242 authenticates the DCEC 430 if it receives the authentication message from the authentication server 250, or prohibits the DCEC 430 from communicating with the closed network 200 if it receives the rejection message from the authentication server 250. The authentication center 242 then transmits an authentication message or rejection message to the content database 232 that transmitted the authentication request AR to the authentication center 242, and the content database 232 transmits, via the second communication component 210, the authentication or rejection message to the dedicated device 400 having the DCEC 430 whose DCEC ID 432 was transmitted in the authentication request AR.

If the authentication center 242 authenticates the DCEC 430 and transmits the authentication message to the content database 232, the content database 232 then establishes, via the second communication component 210, a closed connection with the DCEC 430, in order to establish a closed connection between the dedicated device 400 and the closed network 200.

After authenticating the DCEC 430 of the dedicated device 400, the authentication center 242 then determines whether to authenticate the dedicated device 400 by determining whether the user ID 402 of the user accessing the closed network 200 through his or her dedicated device 400 matches a user ID 402 stored in the authentication server 250.

The authentication center 242 may store the authorized user ID 402 of the dedicated device 400 in the memory unit 248 for a predetermined period of time after authenticating the dedicated device 400 upon determining that the user ID 402 matches a user ID 402 stored in the authentication server 250. Then, in response to subsequent communications from the dedicated device 400 during the predetermined period of time, the authentication center 242 may authenticate the dedicated device 400 during the predetermined period of time by referring to the authorized user ID 402 stored in the memory unit 438, instead of repeatedly determining whether the user ID 402 of the dedicated device 400 matches a user ID 402 stored in the authentication server 250, since the authentication center 242 has previously determined that the user ID 402 of the dedicated device 400 matches a user ID 402 stored in the authentication server 250. Accordingly, the memory unit 248 is illustrated in FIG. 12 as additionally storing authorized user IDs 402 that have been authenticated during the predetermined period of time.

The duration of the predetermined period of time during which the authentication center 242 stores the authorized user ID 402 of a dedicated device 400 accessing the closed network 200 begins after the dedicated device 400 has been authenticated. According to an exemplary embodiment, the authentication server 250 defines the predetermined period of time during which the authentication center 242 may store authorized user IDs 402 in the memory unit 248. The authentication server 250 may appropriately define the predetermined period of time in view of desired security protections. For increased security, the authentication server 250 may define a smaller duration for the predetermined period of time, such as 15 minutes, 30 minutes or 1 hour, for example. Conversely, in view of the closed communications established between each network layer of the closed network 200 and between the dedicated device 400 and the closed network 200, the authentication server 250 may increase the duration of the predetermined period of time to reduce the processing load on the authentication center 242 from having to repeatedly determine whether the user ID 402 received from a dedicated device 400 matches a user ID 402 stored in the authentication server 250. Alternatively, the processing unit 241 of the authentication center 242 may define the predetermined period of time during which authorized user IDs 402 can be stored in the memory unit 248.

The various communications performed by the communication unit 249 of the authentication center 242 will be further described below.

Authentication Server

The authentication server 250 performs authentication of all components in the exemplary system 10 which are authorized to communicate with the closed network 200. The authentication server 250 communicates with only the plurality of authentication centers 242 via the closed communication 202 as illustrated in FIG. 7.

Figure 14:
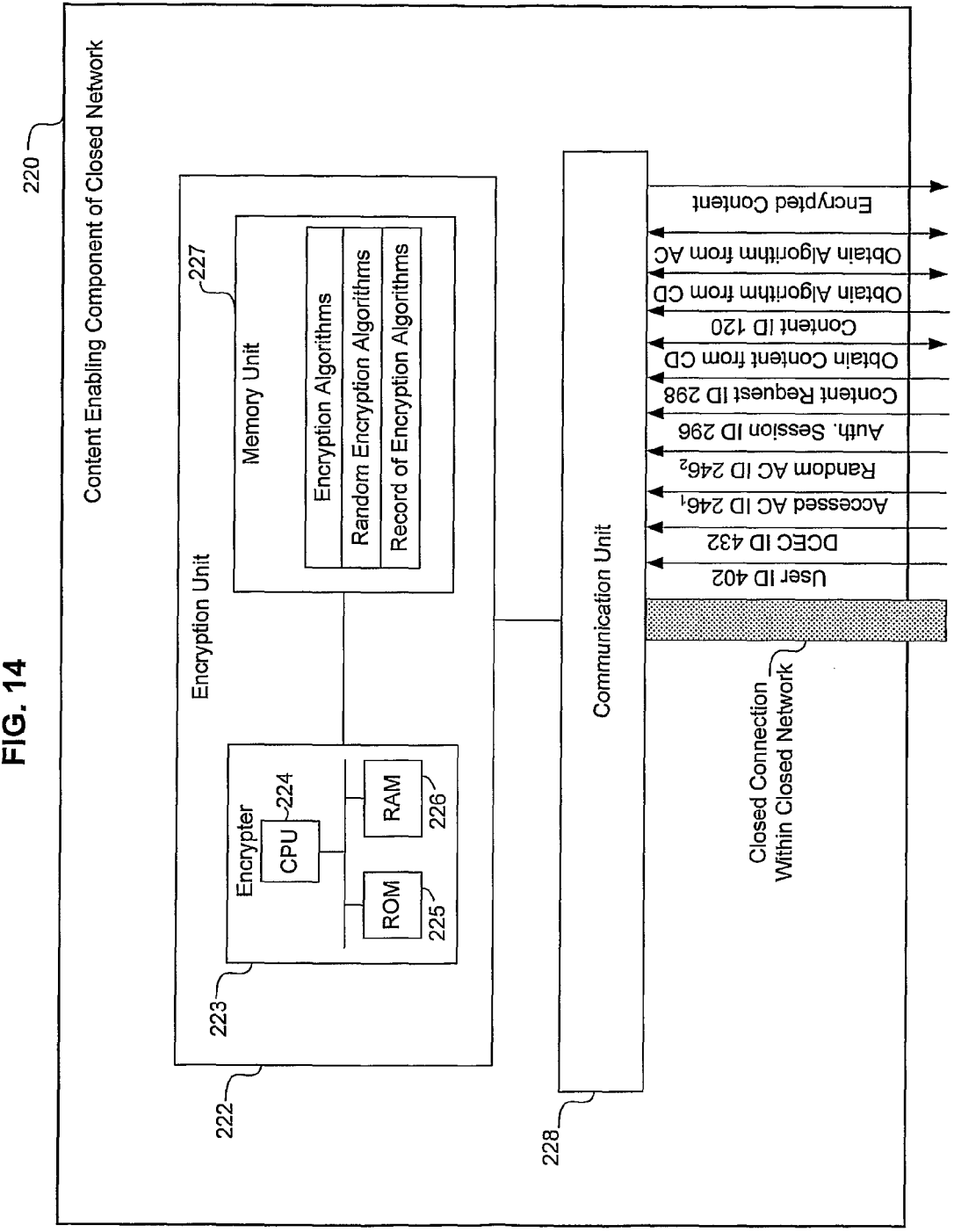
FIG. 14 is a block diagram illustrating exemplary components of an authentication server.

FIG. 14 is a block diagram illustrating the components of the authentication server 250 according to an exemplary embodiment of the present disclosure. As shown in FIG. 14, the authentication server 250 includes a memory unit 251, a processing unit 252, and a communication unit 257.

The processing unit 252 of the authentication server 250 includes a CPU 253, a ROM 255, and a RAM 256. The CPU 253 controls the aggregate functions of each component of the authentication server 250 as well as the interrelationship and interaction between the components of the authentication server 250. The ROM 255 stores executable programs and logic instructions which are implemented by the CPU 253, and the RAM 256 is used a working memory by the CPU 253 when executing the programs and logic instructions stored in the ROM 255.

The memory unit 251 stores the user IDs 402 and DCEC IDs 432 of each dedicated device 400 authorized to communicate with the closed network 200. When a dedicated device 400 initiates communication with the closed network 200, the authentication server 250 authenticates the DCEC ID 432 of the dedicated device 400 by determining whether the DCEC ID 432 of the dedicated device 400 matches a DCEC ID 432 stored in the memory unit 251. Then, after authenticating the DCEC ID 432 of the dedicated device 400, the authentication server 250 authenticates the dedicated device 400 by determining whether the user ID 402 of the dedicated device 400 matches a user ID 402 stored in the memory unit 251.

The authentication of the DCEC ID 432 of a dedicated device 400 will now be described with reference to the communication operations of the communication unit 257 illustrated in FIG. 13 and the explanatory diagram illustrated in FIG. 14. The DCEC 430 of a dedicated device 400 initiates communication with the second connection component 210 by transmitting, via the processing unit 420 and the first communication component 410 of the dedicated device 400, an authentication request AR including the DCEC ID 432 of the DCEC 430 installed in the dedicated device 400 to the second connection component 210 of the closed network 200.

For ease of illustration, FIG. 13 shows that the communication unit 257 of the authentication server 250 receives the authentication request AR and the DCEC ID 432 of the dedicated device 400 seeking to be authenticated from the second connection component 210 through the closed communication established within the closed network 200. Similarly, for ease of illustration, FIG. 14 shows that the authentication server 250 receives the authentication request AR and the DCEC ID 432 from the second connection component 210 through the closed connection with the authentication server 250. As described above, only the plurality of authentication centers 242 residing in the second network 240 communicate with the authentication server 250 via the closed communication 202 established between the authentication centers 242 and the authentication server 250, as shown in FIG. 7. Furthermore, the second communication component 210 communicates with only the content databases 232 residing in the first network 230, and the content database 232 may then communicate with the authentication centers 242 via the closed communication 201 established therebetween (the content database 232 may communicate with the NCEC 220 if the NCEC 220 is not comprised in the authentication center 242. Accordingly, the closed communication between the second connection component 210 and the authentication server 250 as shown in FIGS. 13 and 14 actually represents (i) the closed communication between the second connection component 210 and the content database 232, (ii) the closed communication 201 established between the content database 232 and the authentication center 242, and (iii) the closed communication 202 established between the authentication center 242 and the authentication server 250, as shown in FIG. 7.

The exemplary system 10 may utilize various identifiers (IDs) as keys to encrypt content to be streamed to a dedicated device 400 and to encrypt communications between components of the closed network 200, the dedicated devices 400, the collection databases 232, the information collection and processing unit 150 and other components that are authorized to communicate with the closed network 200. The IDs are either assigned to components of the exemplary system 10, such as the unique DCEC IDs 432, collection DB IDs 110, content database IDs 233 and authentication center IDs 246, for example, or are randomly generated by components in the exemplary system 10 during a communication between two or more components.

An exemplary embodiment provides decentralized storage of encryption keys (e.g., identifiers) and algorithms in the content databases 232 and authentication centers 242. However, all encryption keys and algorithms stored in the content databases 232 and authentication centers 242 are managed and controlled by the authentication server 250. As a result, the encryption keys and algorithms stored in the content databases 232 and authentication centers 242 may be updated, modified or deleted at any time in the authentication server 250 and communicated to the content databases 232 and authentication centers 242, respectively, through the closed communication 202 established between the authentication server 250 and the authentication centers 242, and through the closed communication 201 established between the authentication centers 242 and the content databases 232. In addition, the authentication server 250 can communicate new encryption algorithms 244 to the authentication centers 242 and communicate new encryption algorithms 234 to the content databases 232 via one or more of the authentication centers 242 at any time. The content databases 232 and authentication centers 242 immediately update the encryption algorithms 234, 244 stored in the memory units 231 b, 248 upon receipt of an encryption algorithm communication originating from the authentication server 250.

Content Enabling Component of Closed Network (NCEC)

As described above, the NCEC 220 in the closed network 200 is the counterpart of the DCEC 230 in the dedicated device 400. The plurality of NCECs 220 reside in the second network 240. The NCEC 220 may encrypt streamed content requested by a user of the dedicated device 400, and the encrypted streamed content may then be distributed to the dedicated device 400 by the content database 232.

Figure 15:
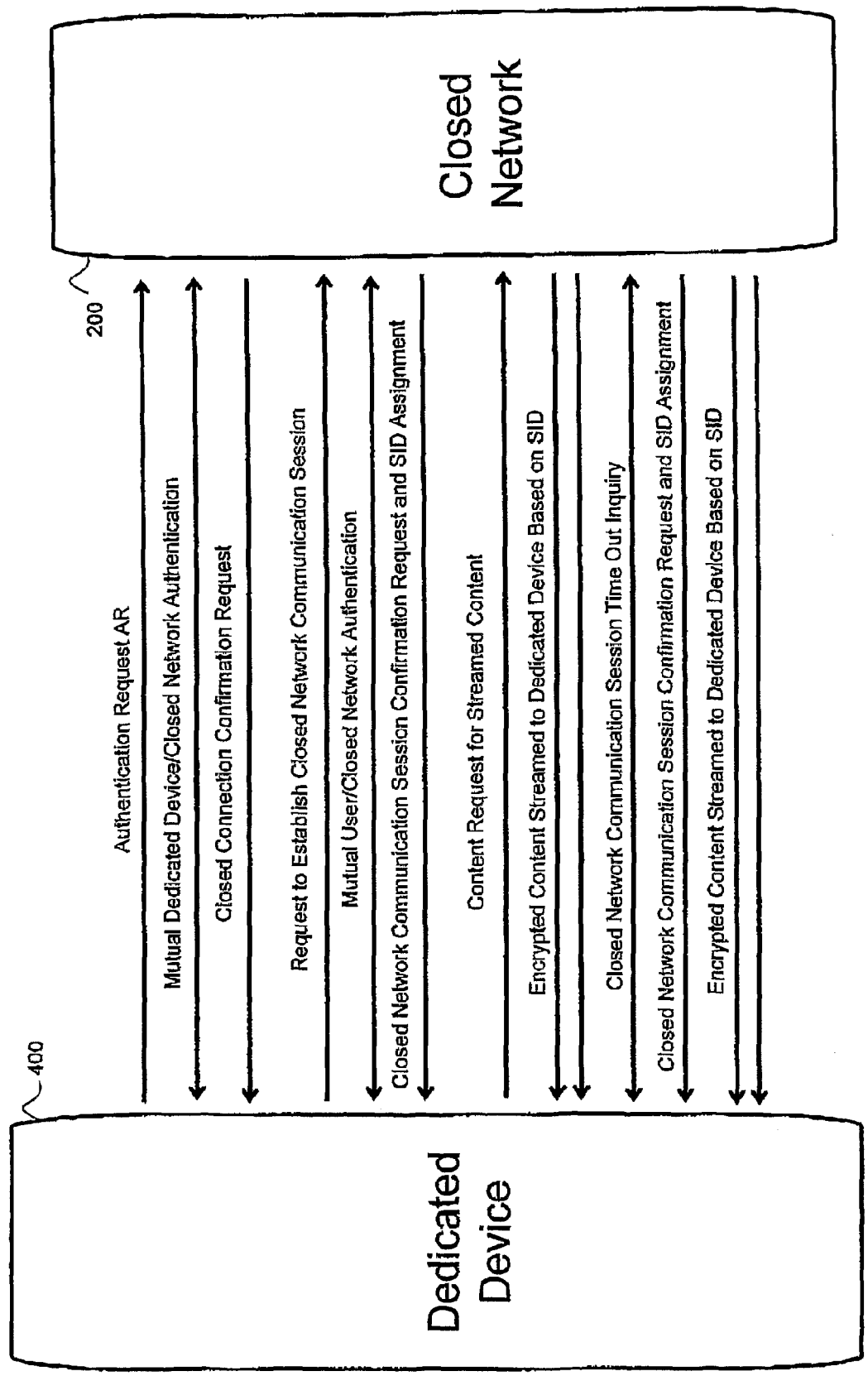
FIG. 15 is block diagram illustrating exemplary components of a content enabling component of the closed network

FIG. 15 is a block diagram illustrating the components of the NCEC 220 according to an exemplary embodiment of the present disclosure. As shown in FIG. 15, the NCEC 220 may include an encryption unit 222 and a communication unit 228. The encryption unit 222 includes an encrypter 223 and a memory unit 227. The encrypter 223 includes a CPU 224, a ROM 225 and a RAM 226. The CPU 224 controls the aggregate functions of each component of the NCEC 220 as well as the interrelationship and interaction between the components of the NCEC 220. The ROM 225 stores executable programs and logic instructions which are implemented by the CPU 224, and the RAM 226 is used a working memory by the CPU 253 when executing the programs and logic instructions stored in the ROM 255.

The memory unit 227 stores a plurality of encryption algorithms that may be used to encrypt content to be streamed to a dedicated device 400, random decryption algorithms that may include a combination of different encryption algorithms that may be used to encrypt content to be streamed to a dedicated device, and a record of encryption algorithms used previously to encrypt content streamed to a dedicated device 400.

According to an exemplary embodiment, the NCEC 220 can implement a technique of mutated, on-the-fly encryption of content to be distributed to a dedicated device. A mutated encryption, as used herein, involves the combination of randomly selected encryption algorithms to encrypt content to be distributed to a dedicated device 400. For example, with reference to FIGS. 10A, 10B and 12, each content database 232 is configured to store a plurality of encryption algorithms 234, and each authentication center 242 is configured to store a plurality of encryption algorithms 244. The NCEC 220 may randomly select any combination of these algorithms 234, 244, for example, to encrypt content that is to be streamed to a dedicated device. In addition, the NCEC 220 may randomly select other encryption keys to be used in encrypting the content that is to be streamed to a dedicated device, as will be further described below.

Exemplary embodiments of the present disclosure utilize various types of encryption algorithms, including both symmetric and asymmetric encryption algorithms, and variable length encryption keys. The encryption keys can be of a variable size and can be represented by a square matrix, N×N. The combination of encryption algorithms involves encrypting a particular content by one encryption algorithm and encrypting the encrypted content by another encryption algorithm, for example. Thus, to combine encryption algorithms involves the combination of two or more encryption keys. The encryption algorithms employed in the closed network 200 are updatable and modifiable. In particular, the encryption algorithms 258, the content database encryption algorithms 234 and the authentication center encryption algorithms 244 are updatable and modifiable by an operator of the authentication server 250. Modifying any of these encryption algorithms in the authentication server 250 causes the encryption algorithms stored in the components of the closed network 200 to be automatically updated.

The present disclosure is not limited to the types of encryption algorithms that may be used. For example, the present disclosure may implement encryption algorithms such as RSA, DES, 3DES, Blowfish, IDEA, SEAL, RC4, as well encryption algorithms whose key is a minimum of 256 bits in length. A discussion of specific encryption algorithms is not presented so as not to obscure the present disclosure. It is to be understood, however, that the combination of randomly selected encryption algorithms, as used herein, involves the combination of different encryption keys, such that a content may be subjected to a first encryption algorithm and then the encrypted content is subjected to a second encryption algorithm.

Examples of mutated and random encryptions performed by the NCEC 220 will be further described below with respect to the communication operations performed by the components of the closed network 200 when the dedicated device 400 initiates contact with the closed network 200 to request distribution of streamed content.

Communication Operations

FIG. 10A illustrates an exemplary embodiment in which the content received from a collection database 100 is not encrypted. In the embodiment of FIG. 10A, the content database 232 may encrypt the content to be streamed to a dedicated device. FIG. 10B illustrates an exemplary embodiment in which the content received from a collection database 100 is encrypted once by either the collection database 100 or the NCEC 220. The communication functions of the content database 232 as illustrated in FIG. 10A will now be explained. As described above, the communication unit 238 is configured to communicate with the collection database(s) 100, the information collection and processing unit 150, the NCEC 230, the authentication centers 242, and the dedicated devices 400.

As described above, a closed communication is established between the communication unit 238 of the content database 232 and the collection database 100. The closed communication established between the content database 232 and the collection database 100 is a secure, private communication in which only the content database 232 and the collection database 100 are aware of the communication.

The closed communications established between the other components of the closed network 200, between the dedicated device 400 and the content database 232, between the authentication center 242 and the content database 232, and between the NCEC 220 and the content database 232 (if the NCEC 220 is not comprised in the authentication center 242) are similarly secure, private communications in which only the devices party to the closed communication are aware of the communication.

As shown in FIG. 13, the DCEC 430 of the dedicated device 400 initiates communication with the closed network 200 by transmitting, via the first connection component 410, an authentication request AR to the second connection component 210. The authentication request AR transmitted by the DCEC 430 includes the unique DCEC ID 432 of the DCEC 430. The second connection component 210 establishes a closed connection between the dedicated device 400 and the closed network 200 upon authentication of the first content enabling component 430. In particular, the second connection component 210 transmits the DCEC ID 432 to one of the content databases 232. The selected content database 232 then establishes a closed communication with one of the authentication centers 242 as follows.

A content database 232 and an authentication center 242 establish a closed communication when communicating therebetween. The content database 232 initiates communication by transmitting a session ID together with its content DB ID 223. The authentication center 242 then initiates communication with the authentication server 250 to determine whether the content database 232 is to be authenticated. In particular, the authentication center 242 transmits a session ID to the authentication server 250 together with its authentication center ID 246. The authentication server 250 determines whether the authentication center ID 246 matches an authentication center ID 246 stored in the memory 251 of the authentication server 250. If the authentication center ID 246 transmitted from the authentication center 242 matches an authentication center ID 246 stored in the memory 251, the authentication server 250 creates an authentication session ID, encapsulates the authentication session ID with the session ID transmitted from the authentication center 242, and transmits the encapsulated authentication session ID to the authentication center 242. A closed communication is thus established between the authentication center 242 and the authentication server 250, because only the authentication center 242 is aware of the session ID that it created. If the authentication center ID 246 transmitted from the authentication center 242 does not match an authentication center ID 246 stored in the memory 246, the authentication server 250 transmits a rejection message.

Upon receiving the encapsulated authentication session ID, the authentication center decrypts the encapsulated authentication session ID by using the session ID that it created, and transmits an authentication confirmation message that includes the content DB ID 233 transmitted from the content database 232 that initiated communication with the authentication center 242. The authentication center 242 encapsulates the authentication confirmation message with the authentication session ID, and transmits the encapsulated authentication confirmation message to the authentication server 250. The authentication server 250 decrypts the encapsulated authentication confirmation message by using the authentication session ID that it created, and determines whether the content DB ID 233 matches a content DB ID 233 stored in the memory 251. If the authentication server 250 determines that the content database 232 is authenticated, the authentication server 250 creates an authentication message and encapsulates it with the authentication confirmation message transmitted from the authentication center 242, and transmits the encapsulated authentication message to the authentication center 242. A rejection message is transmitted if the content database 232 is not authenticated.

The authentication center 242 decrypts the encapsulated authentication message by using the authentication confirmation message that it created, and then determines that the content database 232 is authenticated.

Once the content database 232 is authenticated, the content database 232 and the authentication center 242 can communicate securely through the closed communication established therebetween.

The authentication center 242 may establish a closed communication with the NCEC 220 in a similar manner, assuming that the NCEC 220 and authentication center 242 are not comprised in a single device. In the event that the NCEC 220 and authentication center 242 are not comprised in a single device, the memory unit 251 of the authentication server 250 would also include a unique identifier for each NCEC 220 so that the authentication center 242 could be able to determine whether the NCEC 220 is authenticated.

The establishment of a closed communication between the dedicated device 400 and the closed network 200 will now be described. According to an exemplary embodiment, the DCEC 430 of the dedicated device 400 initiates communication with the closed network 200 by transmitting, via the processing unit 420 and first communication component 410 of the dedicated device 400, an authentication request AR including the unique DCEC ID 432 of the DCEC 430 to the second connection component 210 of the closed network. The DCEC 430 may be preprogrammed with a network address of the second connection component 210. The second communication component 210 is configured to establish a closed communication with the DCEC 430 upon the authentication of the DCEC 430 by the authentication server 250.

The second communication component 210 selects one of the content databases 232, and transmits the authentication request AR and DCEC ID 432 to the selected content database 232, which in turn transmits the authentication request AR and DCEC ID 432 to one of the authentication centers 242, once a closed communication has been established between the content database 232 and the selected authentication center 242. The content database 232 and selected authentication center 242 establish a closed communication in the manner as described above. The authentication center 242 then establishes a closed communication with the authentication server 250 to determine whether the DCEC 430 is to be authenticated, based on whether the DCEC ID 432 matches a DCEC ID 432 stored in the memory 251 of the authentication server 250. If the DCEC 430 is authenticated, the authentication server 250 informs the authentication center 242, which in turn informs the content database 232, and a closed connection is established between the dedicated device 400 and the second connection component 210 of the closed network 200.

Upon establishment of the closed communication between the dedicated device 400 and the closed network 200, the DCEC 430 is configured to transmit, via the first connection component 410, the user ID 402 of the dedicated device 400 to the second connection component 210, which transmits the user ID 402 to one of the content databases 232, which in turn transmits the user ID 402 to one of the authentication centers 242. The selected content database 232 and authentication center 242 may be the same content database 232 and authentication center 242 which previously received the authentication request AR and DCEC 432. The selected authentication center 242 will hereinafter be denoted with reference numeral $242_1$. The selected authentication center $242_1$ establishes a closed communication with the authentication server 250, if a closed communication therebetween has not been maintained, and authenticates the dedicated device 400 by determining whether the user ID 402 received from the dedicated device 400 matches a user identifier 402 stored in the authentication server 250. The selected authentication center $242_1$ then establishes a closed network communication session with the dedicated device 400, upon authenticating the dedicated device 400, to enable the dedicated device 400 to transmit, to the one content database 232 through the established closed connection, a content request CR for streamed content stored in the content database 232. The accessed authentication center $242_1$ then randomly selects the authentication center identifier $246_2$ of another one of the plurality of authentication centers $242_2$ upon establishing the closed network communication session, and notifies the DCEC 430 and the NCEC 220 of the authentication center identifier $246_2$ of the randomly chosen authentication center $242_2$.

The content database 232, upon receiving the content request CR, notifies the NCEC 220 of the requested streamed content identified in the content request CR. Then, the NCEC 220, upon being notified of the requested streamed content, randomly selects one of a plurality of first encryption algorithms 234 stored in the content database, and randomly selects one of a plurality of second encryption algorithms 244 stored in the accessed authentication centers $242_1$. The NCEC 220 then combines the randomly selected encryption algorithms 234, 244 to form, during the established closed network communication session, a present encryption algorithm 254 for twice-encrypting the streamed content requested by the dedicated device 400. In particular, the NCEC 220 twice-encrypts the requested once-encrypted streamed content stored in the content database 232 with the content enabling component identifier 432 of the DCEC 430, the user identifier 402 of the dedicated device 400, the authentication center identifier $246_1$ of the accessed authentication center $242_1$, and the authentication center identifier $246_2$ of the randomly chosen authentication center $242_2$. The content database 232 streams the twice-encrypted streamed content to the dedicated device 400 via the second communication component 210 through the established closed connection. The first content enabling component 430 decrypts the twice-encrypted streamed content by using the decryption key 434 of the first content enabling component 430 and the notified authentication center identifier $246_2$ of the randomly chosen authentication center $242_2$, transmit the decrypted streamed content to the processing unit 420 to be output by the processing unit 420, and control the dedicated device 400 so as not to permanently store the streamed content.

According to another exemplary embodiment, the selected authentication center $242_1$ is operable to, upon authenticating the dedicated device 400, randomly select the authentication center identifier $246_2$ of another one of the plurality of authentication centers 242 upon establishing the closed network communication session, notify the first content enabling component 430 of the authentication center identifier $246_2$ of the randomly chosen authentication center $242_2$ through the established closed connection, and notify the second content enabling component 220 of the authentication center identifier $246_2$ of the randomly chosen authentication center $242_2$. The at least one content database 232, upon receiving the content request CR, is operable to notify the second content enabling component of the content identified in the content request.

The second content enabling component 220, upon being notified of the requested streamed content, is operable to: randomly select one of the plurality of first encryption algorithms 234 stored in the at least one content database 232, randomly select one of the plurality of second encryption algorithms 244 stored in stored in the one of the plurality of authentication centers $242_1$, combine the randomly selected one of the first and second encryption algorithms 234, 244 to form, during the established closed network communication session, a present encryption algorithm 254 for encrypting the streamed content requested by the dedicated device 400; and encrypt, according to the formed present encryption algorithm, the streamed content identified in the content request with the content enabling component identifier 432 of the first content enabling component 430, the user identifier 402 of the dedicated device 400, the authentication center identifier $246_1$ of the one of said plurality of authentication centers $242_1$, and the authentication center identifier $246_2$ of the randomly chosen authentication center 242. The at least one content database 232 is operable to stream the encrypted streamed content and notify the first content enabling component 430 of a present decryption algorithm corresponding to the present encryption algorithm 254 through the established tunnel connection. The first content enabling component 430 is operable to decrypt the encrypted streamed content by using the present decryption algorithm corresponding to the formed present encryption algorithm 254, and control the dedicated device 400 so as not to permanently store the streamed content.

Another exemplary embodiment of the system 10 securely communicates encrypted content with combined random encryption algorithms from the closed network 200 to a dedicated device 400.

According to this embodiment, the NCEC 220 encrypts streamed content according to an encryption algorithm formed from combining two randomly chosen encryption algorithms, and one of the content databases 232 transmits the encrypted streamed content to the dedicated device 400 during a closed network communication session established between the closed network 200 and the authenticated device and through a closed connection established between the closed network 200 and the dedicated device 400.

The DCEC 430 initiates communication with the closed network 200 by transmitting, via the first connection component 410, an authentication request AR including the content enabling component identifier 432 of the DCEC 430 to the second connection component 210 of the closed network 200, and the second connection component 210 establishes a closed connection between the dedicated device 400 and the closed network 200 upon authentication of the DCEC 430. Similar to the above-described embodiments, individual closed communications are established according to the topology of secured communications as illustrated in FIGS. 8 and 9, for example.

The DCEC 430 transmits, via the first connection component 410, the user identifier 402 of the dedicated device 400 to one of the plurality of authentication centers $242_1$ through the established closed connection, and the one of the plurality of authentication centers $242_1$ (i) authenticates the dedicated device 400 by determining whether the user identifier 402 received from the dedicated device 400 matches a user identifier 402 stored in the authentication server 250, (ii) upon authenticating the dedicated device 400, establishes a closed network communication session with the dedicated device 400 to enable the dedicated device 400 to transmit, to the content database 232 through the established closed connection during the established closed network communication session, a content request CR for streamed content stored in the at least one content database 232, (iii) randomly selects the authentication center identifier $246_2$ of another one of the plurality of authentication centers $242_2$ upon establishing the closed network communication session, (iv) notifies the first content enabling component 430 of the authentication center identifier $246_2$ of the randomly chosen authentication center $242_2$ through the established closed connection, and (v) notifies the second content enabling component 220 of the authentication center identifier $246_2$ of the randomly chosen authentication center $242_2$. The content database 232, upon receiving the content request CR, notifies the NCEC 220 of the content identified in the content request CR. In addition, the NCEC 220, upon being notified of the requested streamed content, (i) randomly selects one of the plurality of encryption algorithms 234 stored in the content database 232, (ii) randomly selects one of the plurality of encryption algorithms 244 stored in the plurality of authentication centers $242_1$, (iii) combines the randomly selected encryption algorithms 234, 244 to form, during the established closed network communication session, a present encryption algorithm 254 for encrypting the streamed content requested by the dedicated device 400, and (iv) encrypts, according to the formed present encryption algorithm 254, the streamed content identified in the content request with the content enabling component identifier 432 of the first content enabling component 430, the user identifier 402 of the dedicated device 400, the authentication center identifier $246_1$ of the one of the plurality of authentication centers $242_1$, and the authentication center identifier $246_2$ of the randomly chosen authentication center $242_2$. The content database 232 streams the encrypted streamed content and notifies the DCEC 430 of a present decryption algorithm corresponding to the present encryption algorithm 254 through the established closed communication.

In addition the DCEC 430 decrypts the encrypted streamed content by using the present decryption algorithm corresponding to the formed present encryption algorithm 254, and controls the dedicated device 400 so as not to permanently store the streamed content.

Figure 22:
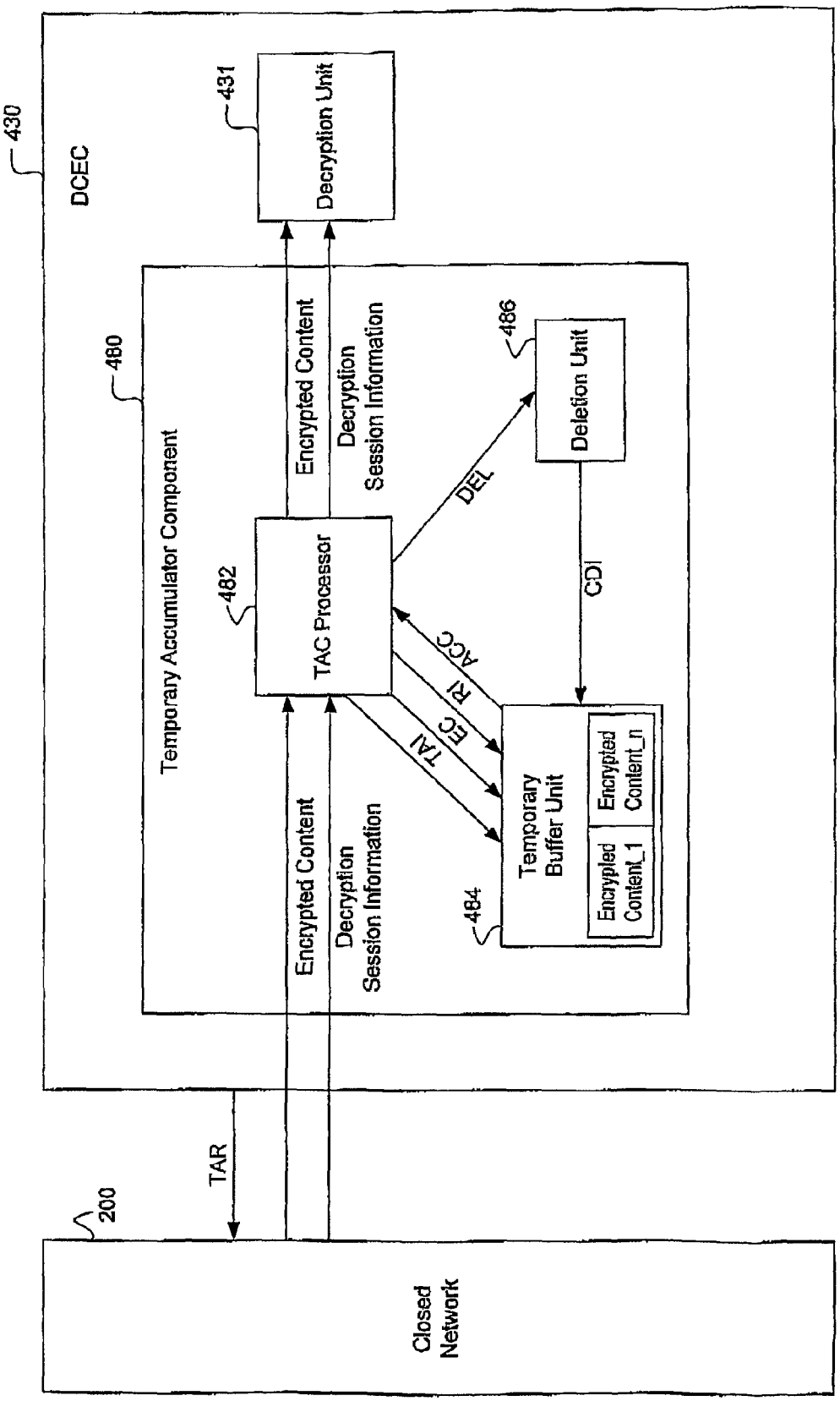
FIG. 22 is a conceptual diagram of a closed network and a content enabling component.
Figure 23:
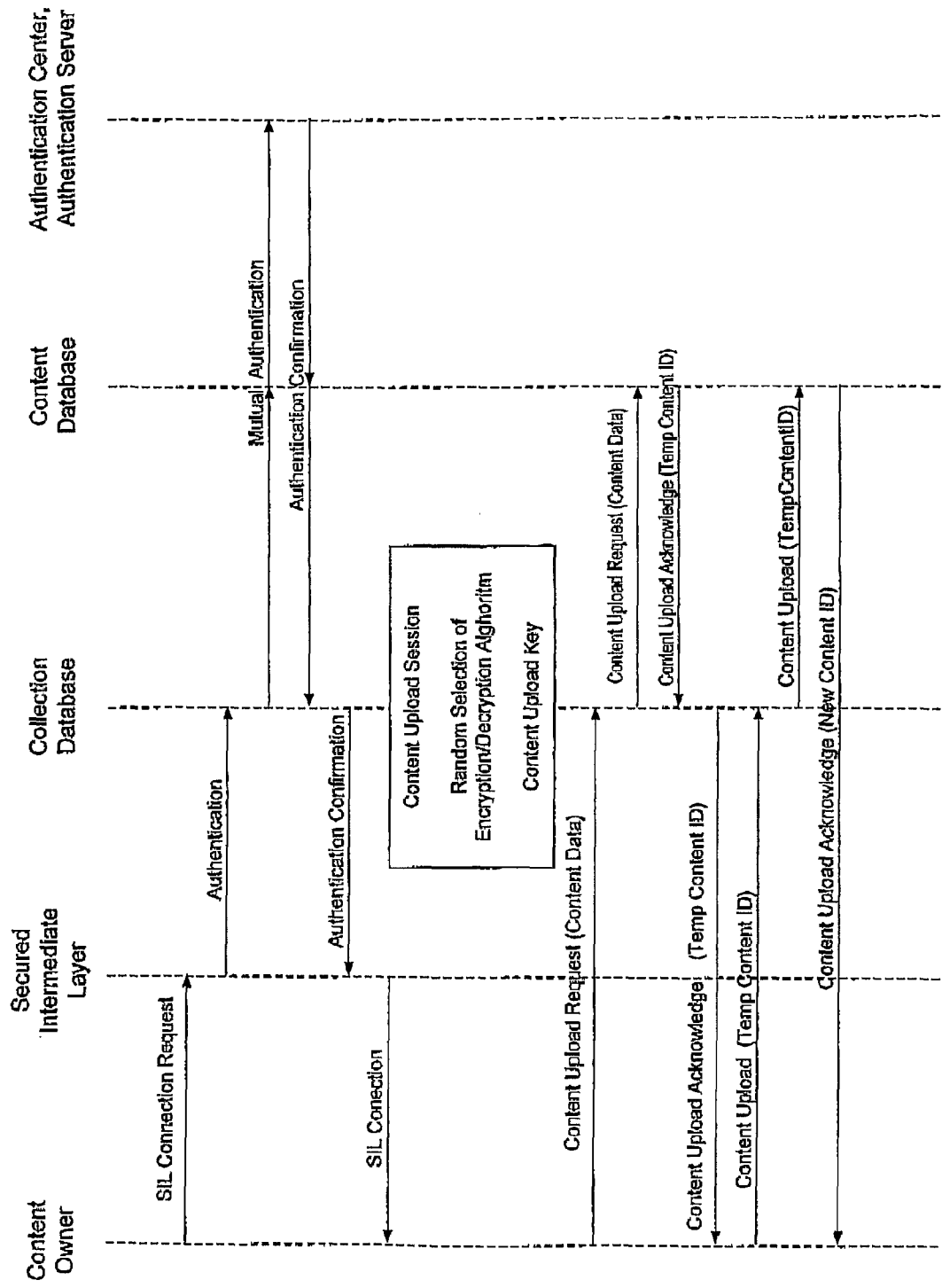
FIG. 23 is an example method of the present disclosure.

FIGS. 22 and 23 illustrate examples of keys with which streamed content can be encrypted by the NCEC 220. FIG. 22 pertains to the embodiment in which the content is not encrypted in the content database 232, and FIG. 23 pertains to the embodiment in which the content is twice-encrypted, i.e., the content is first encrypted by using the collection DB ID 110 and content ID 120. A content request ID 298, as illustrated in FIGS. 22 and 23, is an ID transmitted from the dedicated device 400. The authentication session ID 296 is created by the authentication server 250 when authenticating the dedicated device 400.

The DCEC 430 and NCEC 220 were described above as hardware components within the dedicated device 400 and closed network 200, respectively. The DCEC 430 and NCEC 220 may alternatively be implemented as software recorded on a computer-readable medium within the dedicated device 400 and closed network 200, respectively, to perform the above-described functions and operations of the DCEC 430 and NCEC 220.

The dedicated device 400 was primarily described above as decrypting and processing encrypted streamed content received from the closed network 200. The dedicated device 400 may also perform functions in addition to obtaining streamed content from the closed network 200. For example, the dedicated device 400 may also reproduce content received from another device or a network external to the closed network 200. It is to be noted, however, that the DCEC 430 of the dedicated device 400 prevents streamed content received from the closed network 200 from being permanently stored. Therefore, the DCEC 430 prohibits the user of the dedicated device 400 from saving and distributing the streamed content received from the closed network 200 to another network or device.

As described above, the detection component 436 of the DCEC 430 detects when the dedicated device 400 is tampered with, and the cessation component 438 automatically transmits the cease instruction CI to cease operations of the DCEC 430. If the dedicated device 400 is tampered with while it is receiving streamed content from the closed network 200, it is theoretically possible that the user may be able to capture the content being processed in the dedicated device 400 and distribute the captured content to a network or device external to the closed network 200 and the dedicated device 400. In view of this possibility, the present disclosure provides a technique for infringement detection, as described below.

Another exemplary embodiment of the present disclosure provides secure communication without encrypting the content with the above-described encryption keys. The secure, closed communications, achieved by multi-point tunneling, can provide sufficient security without requiring additional encryption of the content. This embodiment provides a multilayered architecture of the closed network 200 between the content database 232, authentication center 242, NCEC 220 (if the NCEC 220 is not comprised in the same device as the authentication center 242), and the authentication center 250. This embodiment, similar to the above-described embodiments, provides independent tunnel communications between each layer of the closed network 200, establishment of a closed communication between CD 232 and the dedicated device 400, and distribution of content to the dedicated device 400 through the secure, closed communications.

According to another exemplary embodiment, components of the closed network 200 can be combined within single devices. For example, according to one configuration, a content database 232, authentication center 242 and NCEC 220 can be combined into a one component residing in the first network 230, and the combined component communicates with the authentication server 250 through a closed communication. According to an alternative configuration, the authentication center 242, NCEC 220 and authentication server 250 can be combined into component residing in the second network 240, and the content database can securely communicate with the combined component residing in the second network 240.

Infringement Detection

As described above, the DCEC 430 prevents streamed content received from the closed network 200 from being permanently stored in the dedicated device 400, by causing the received content to be automatically deleted after it is decrypted and reproduced. If streamed content distributed from the closed network 200 is somehow extracted from the dedicated device 400, the present disclosure provides a mechanism for identifying the infringing user when the content is distributed to a network external to the closed network 200 and the dedicated device 400.

Figure 19:
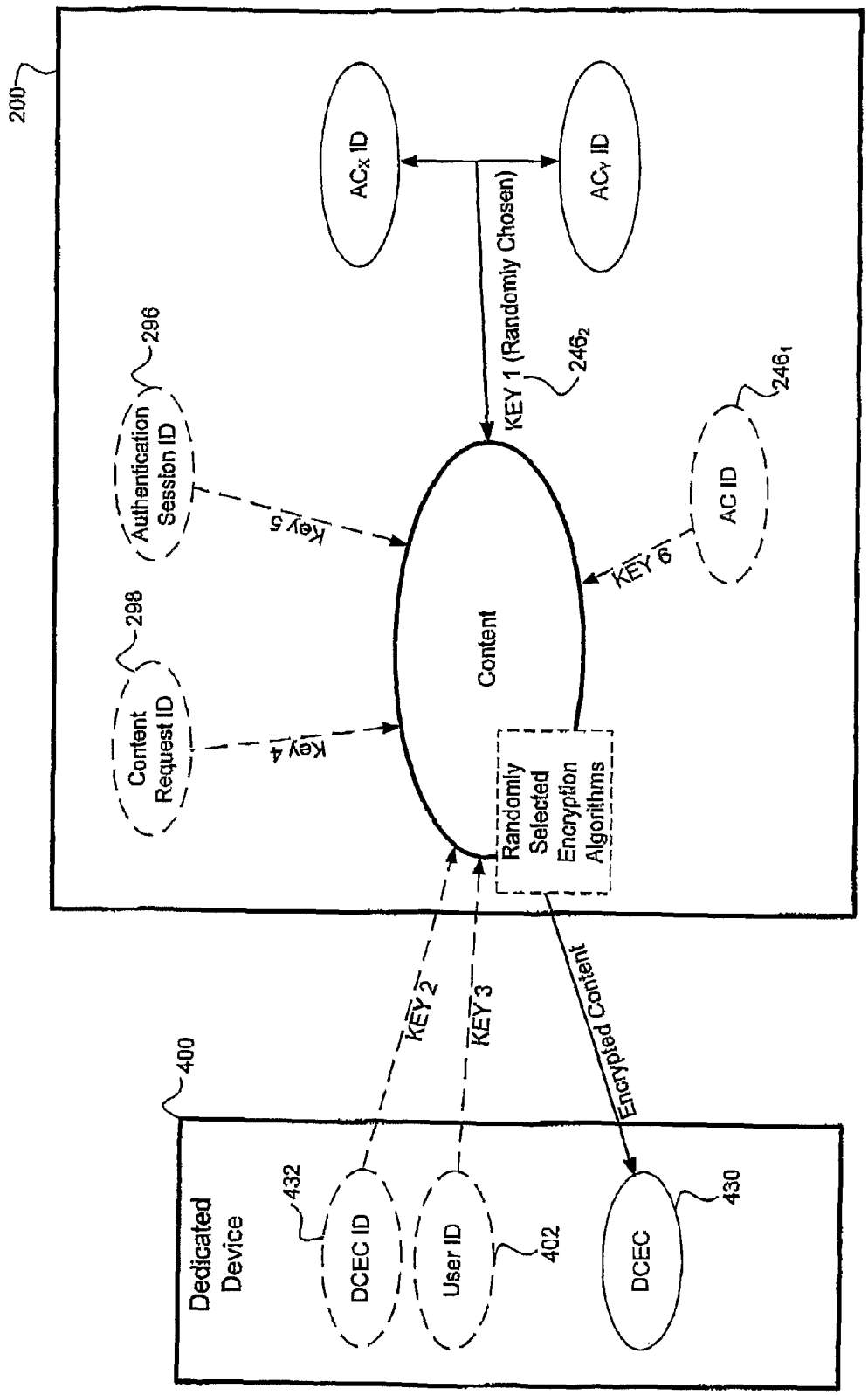
FIG. 19 is a conceptual diagram of a dedicated device and a closed network.

FIG. 19 illustrates a hidden data insertion unit 260 comprised in the closed network 200. According to an exemplary embodiment, the hidden data insertion unit 260 may be comprised in each of the NCECs 220 included in the second network 240 of the closed network 200, or as a separate component within the second network 240 of the closed network. The hidden data insertion unit 260 inserts at least two randomly chosen and respectively distinct packets of hidden data $262_1$, $262_2$ into the streamed content requested by the dedicated device 400 prior to when the NCEC 220 encrypts the streamed content that is requested to be distributed to the dedicated device 400.

According to an exemplary embodiment described above, the NCEC 220 may once-encrypt streamed content to be distributed to the dedicated device 400 when the content is stored in the content database 232 in an unencrypted format. According to another exemplary embodiment described above, the streamed content to be distributed to the dedicated device 400 is once-encrypted and stored in the content database 232, and the NCEC 220 twice-encrypts the requested streamed content to be distributed to the dedicated device 400. Consistent with these exemplary embodiments, the hidden data insertion unit 260 inserts the at least two packets of hidden data $262_1$, $262_2$ into the streamed content to be distributed to the dedicated device 400 before the content is once-encrypted by the NCEC 220 in the case where the content is stored in the content database 232 in an unencrypted format, and before the content is twice-encrypted by the NCEC 220 in the case where the content is once-encrypted and stored in the content database 232.

The hidden data insertion unit 260 randomly chooses different algorithms for creating and inserting each of the at least two packets of hidden data $262_1$, $262_2$ so that the at least two packets of hidden data $262_1$, $262_2$ are distinct from one another. The at least two packets of hidden data $262_1$, $262_2$ are created from different algorithms so as to make the effort of deciphering the packets of hidden data prohibitively expensive. That is, even if the algorithm used to create one of the at least two packets of hidden data $262_1$, $262_2$ is somehow deciphered, the cost and time required to decipher the algorithm used to create another one of the at least two packets of hidden data $262_1$, $262_2$ is so prohibitive as to dissuade the mere attempt at deciphering the algorithms used to create the at least two packets of hidden data $262_1$, $262_2$.

The hidden data insertion unit 260 stores a plurality of algorithms for creating the at least two packets of hidden data $262_1$, $262_2$, and randomly chooses two different algorithms among the stored algorithms to create the at least two packets of hidden data $262_1$, $262_2$ to be inserted in the streamed content that is requested to be distributed to the dedicated device 400. The random selection of algorithms used to create the at least two packets of hidden data $262_1$, $262_2$ serves to practically ensure that the at least two packets of hidden data $262_1$, $262_2$ inserted into a content requested by a dedicated device 400 a first time are different from the at least two packets of hidden data $262_1$, $262_2$ inserted into the same content requested by the same dedicated device 400 a second time subsequent to the first time.

The hidden data insertion unit 260 dynamically inserts the at least two packets of hidden data $262_1$, $262_2$ into a streamed content that is requested to be distributed to the dedicated device 400, according to the order of packets of the streamed content, in real time. That is, the hidden data insertion unit 260 inserts the at least two packets of hidden data $262_1$, $262_2$ "on the fly" in real time as the content database 232 notifies the NCEC 220 of the streamed content that is requested to be distributed to the dedicated device 400.

The hidden data insertion unit 260 also inserts the at least two packets of hidden data $262_1$, $262_2$ at randomly chosen locations in the streamed content to be distributed to the dedicated device 400 and at randomly chosen intervals of the streamed content. FIG. 19 is an exemplary diagram illustrating examples of the insertion of the at least two packets of hidden data $262_1$, $262_2$ by the hidden data insertion unit 260 into a streamed content consisting of ten packets. As shown in the example of FIG. 19(A), the hidden data insertion unit 260 may insert a first packet of hidden data $262_1$ before the first packet of the streamed content to be distributed to the dedicated device 400, and insert a second packet of hidden data $262_2$ between the seventh and eighth packets of the streamed content. As shown in the example of FIG. 19(B), the hidden data insertion unit 260 may insert a first packet of hidden data $262_1$ between the second and third packets of the streamed content to be distributed to the dedicated device 400, and insert a second packet of hidden data $262_2$ between the eighth and ninth packets of the streamed content. As shown in the example of FIG. 19(C), the hidden data insertion unit 260 may insert a first packet of hidden data $262_1$ between the first and second packets of the streamed content to be distributed to the dedicated device 400, insert a second packet of hidden data $262_2$ between the sixth and seventh packets of the streamed content, and insert a third packet of hidden data $262_3$ after the tenth packet of the streamed content.

As shown in the examples illustrated in FIGS. 19(A)-(C), the hidden data insertion unit 260 inserts the at lest two packets of hidden data $262_1$, $262_2$ into the body of a streamed content to be distributed to the dedicated device 400, as opposed to a header portion of the streamed content, for increased security. The present disclosure is not limited to the examples illustrated in FIGS. 19(A)-(C) for inserting the at least two packets of hidden data $262_1$, $262_2$ into a streamed content that is requested to be distributed to the dedicated device 400. The hidden data insertion unit 260 may insert the at least two packets of hidden data $262_1$, $262_2$ at any randomly chosen location in a streamed content to be distributed to the dedicated device 400 and at any randomly chosen interval of the streamed content.

The at least two packets of hidden data $262_1$, $262_2$ are imperceptible to the user of the dedicated device 400 when the decrypted streamed content is reproduced at the output unit 440 of the dedicated device 400. In other words, the at least two packets of hidden data $262_1$, $262_2$ are not visually or audibly perceivable by the user of the dedicated device 400 when the decrypted streamed content is reproduced at the output unit 400.

As shown below the example of FIG. 19(A), each of the at least two packets of hidden data $262_1$, $262_2$ (generically illustrated with reference numeral 262) contain at least the user ID 402 and the DCEC ID 432 of the dedicated device 400 to which the streamed content is to be distributed. The at least two packets of hidden data $262_1$, $262_2$ may also each contain additional information represented by dotted lines below the example of FIG. 19(A). For example, one ore more of the at least two packets of hidden data $262_1$, $262_2$ may further contain at least one of a time stamp 264 identifying a respective time of insertion of the at least two packets of hidden data $262_1$, $262_2$ into the streamed content, the unique content identifier 120 of the streamed content, the collection database identifier 110 of the collection database 100 from which the content database 232 distributing the streamed content to the dedicated device 400 received the streamed content, and a unique closed network identifier 208 of the closed network 200 from which the streamed content is distributed to the dedicated device 400. Heretofore, the system 10 has been described with reference to only one closed network 200. As will be further described below, the system 10 may include a plurality of closed networks $200_1 \ldots 200_n$ (n>1), and each of the plurality of closed networks 200 is assigned a respectively unique closed network identifier 208 that is different from the closed network identifier 208 of another one of the plurality of closed networks $200_1 \ldots 200_n$. As such, the at least two packets of hidden data $262_1$, $262_2$ may identify the closed network identifier 208; of the closed network 200; (n≧i≧1) among the plurality of closed networks $200_1 \ldots 200_n$ from which the streamed content is distributed to the dedicated device 400.

Figure 18:
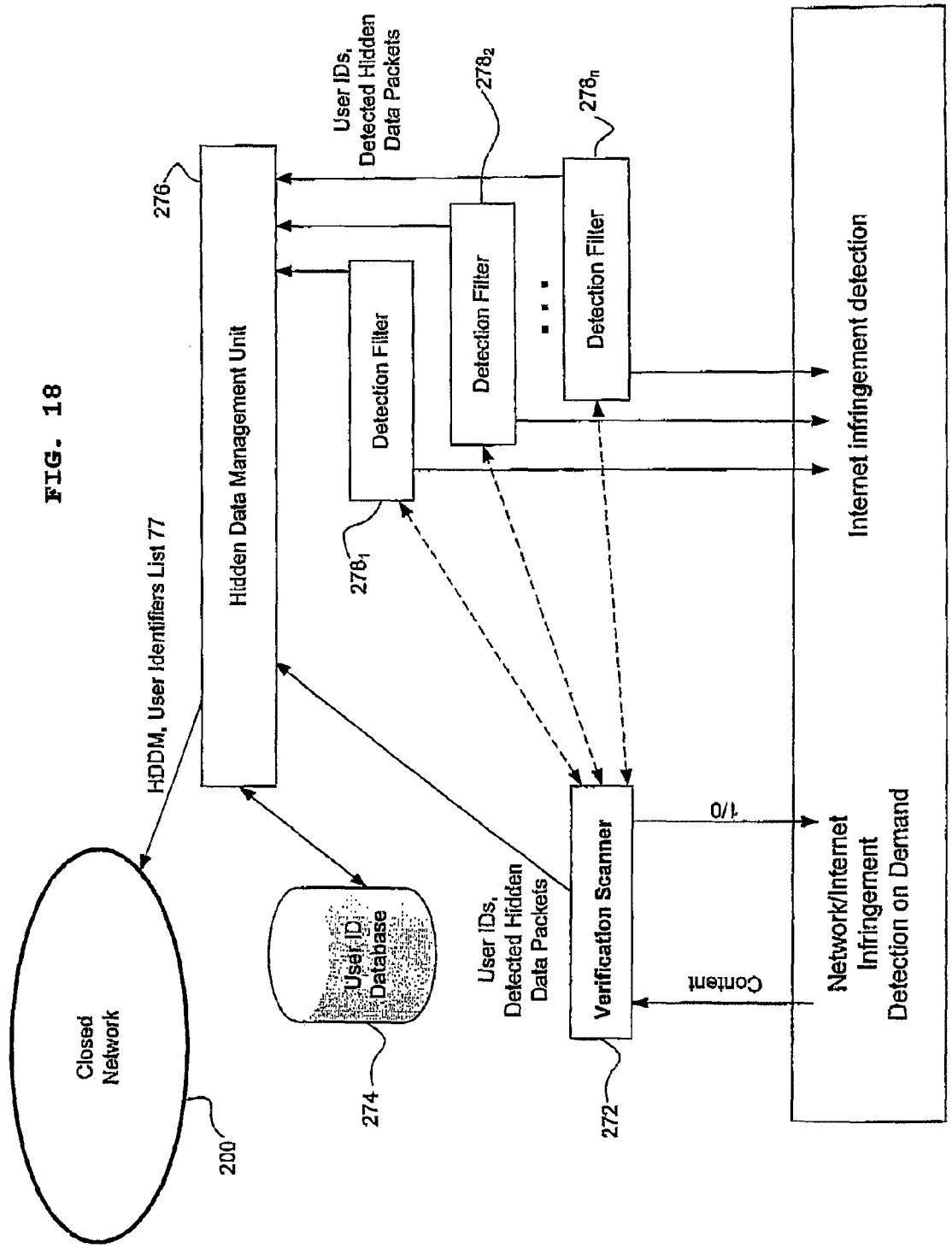
FIG. 18 is a conceptual diagram of a hidden data management unit.

FIG. 18 is another conceptual diagram of the system 10 according to an exemplary embodiment of the present disclosure. The components illustrated in FIG. 18 that have been described previously operate similar to the above-described exemplary embodiments and therefore will not be described again. In the system 10 illustrated in FIG. 18, the closed network 200 may establish a secure, closed communication with a hidden data management unit 276, which resides in the secured intermediate layer (SIL) of the system 10. Similar to the description of the collection database 100 above, the hidden data management unit 276 resides in the secured intermediate layer of the system 10 because the hidden data management unit 276 can be authenticated by the authentication server 250 in order to establish a closed communication between one or more of the content database(s) 232 and the hidden data management unit 276.

The hidden data management unit 276 is provided to manage a user identifier database 274 of users that have impermissibly extracted content from their dedicated devices 400 and distributed content obtained from the closed network 200 to a network external to the closed network 200. The user identifier database 274 stores a list 277 of infringing users, and the hidden data management unit 276 may transmit the list of infringing users to one or more of the content database(s) 232 in the closed network 200.

Figure 20:
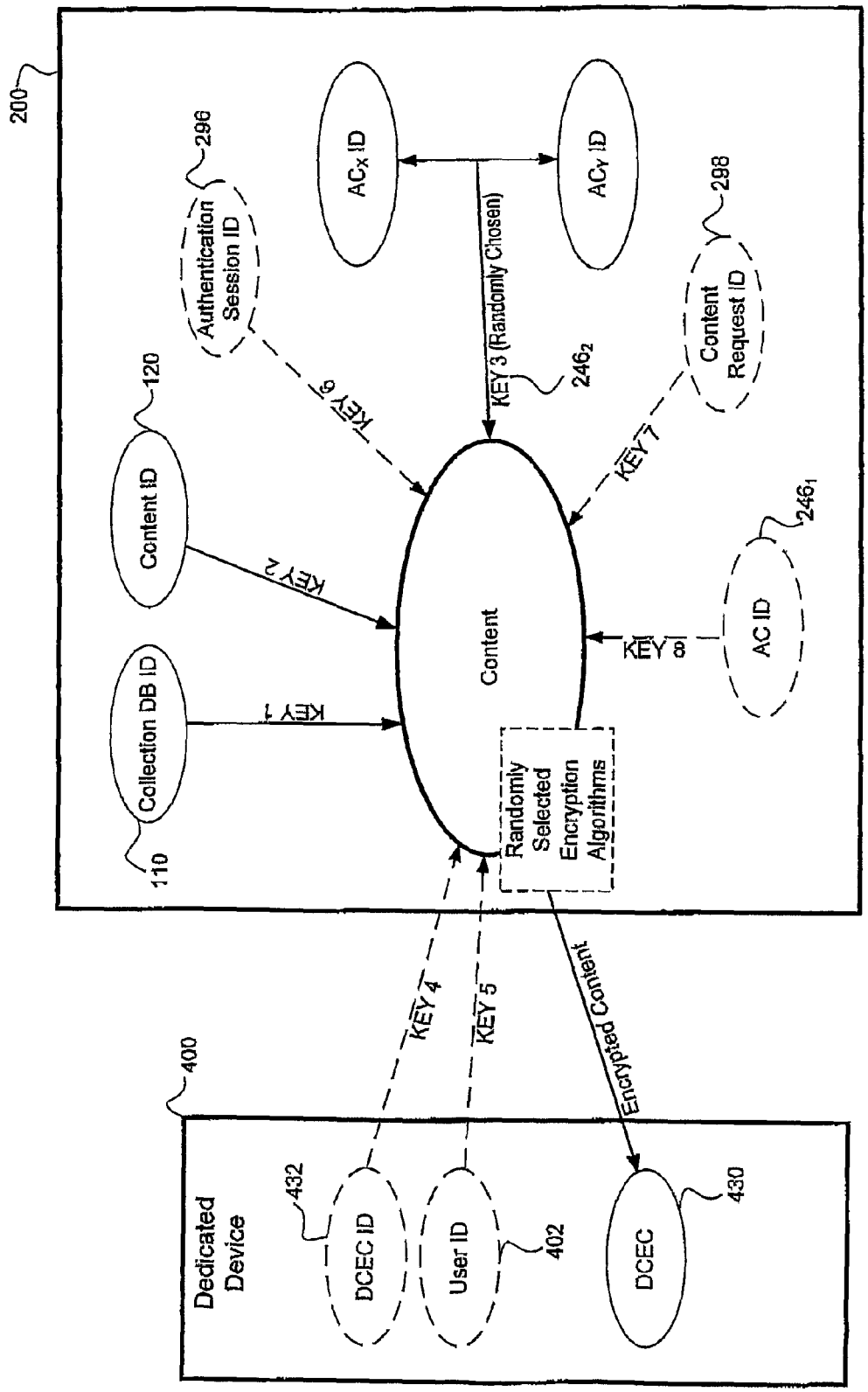
FIG. 20 is another conceptual diagram of a dedicated device and a closed network.
Figure 21:
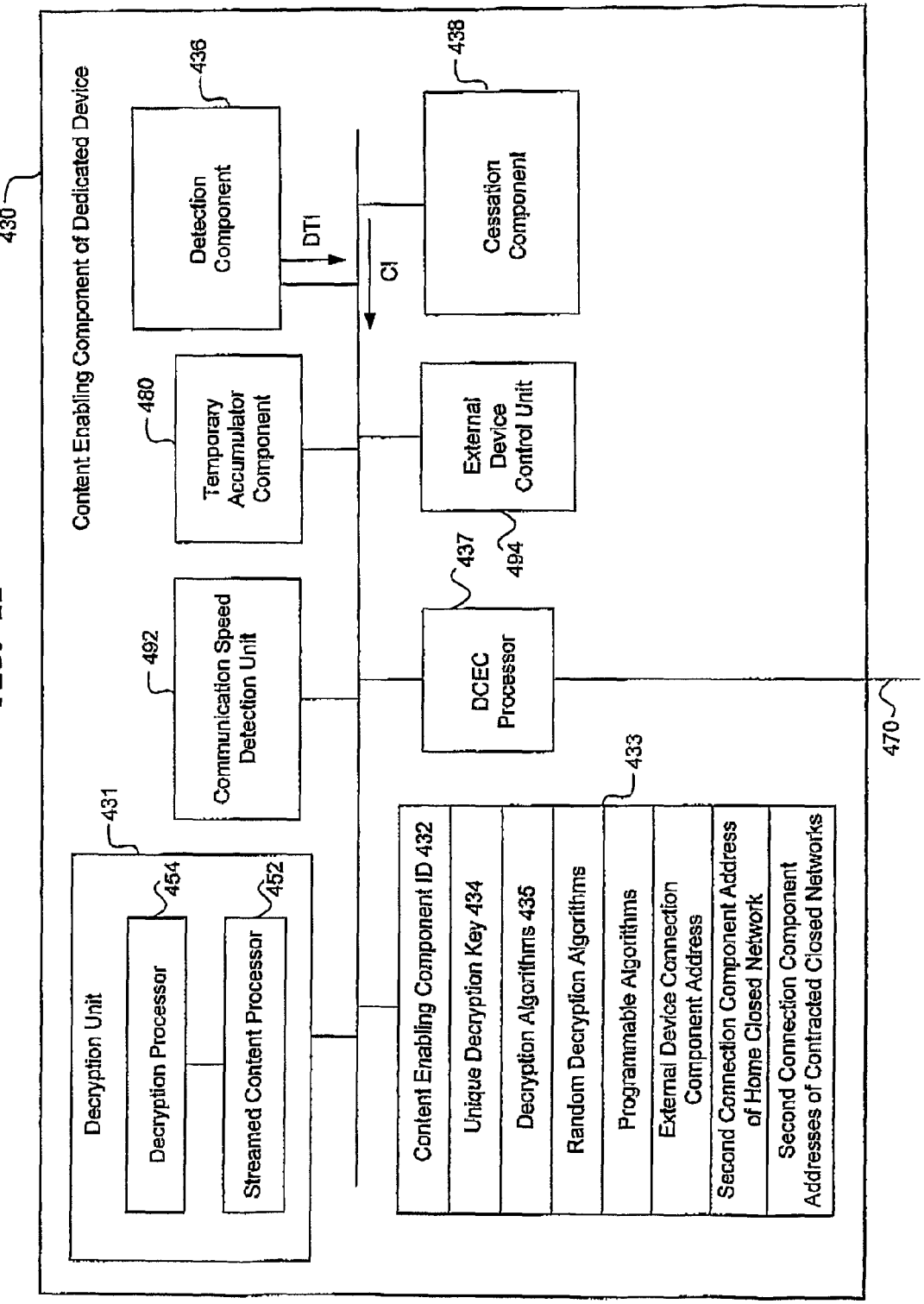
FIG. 21 is a conceptual diagram of the content enabling component of dedicated device.

FIG. 20 illustrates the hidden data management unit 276, the user identifier database 274 and the related components for detecting infringement of content distributed from the closed network 200 to a dedicated device 400. As shown in FIG. 20, the infringement detection mechanism of the present disclosure also includes a verification scanner 272. The verification scanner 272 may scan a content in any network external to the closed network 200 to detect whether at least one of the hidden data packets $262_1$, $262_2$ inserted by the hidden data insertion unit 260 is contained in the content. The list 277 of infringing users stored in the user identifier database 274 includes at least a list of user identifiers 402 detected in a hidden data packet $262_1$, $262_2$ by the verification scanner 272. Accordingly, the user identifier database 274 may store a list 277 of user identifiers 402 detected in a hidden data packet $262_1$, $262_2$ by the verification scanner 272 to identify a user or a plurality of users that has or have distributed content received from the closed network 200 to the network external to the closed network 200. The list 277 stored in the user identifier database 274 may also contain at least one of a DCEC ID 432, a time stamp 264, a content identifier 120, a collection database identifier 110, and a closed network identifier 208 that is detected in a hidden data packet $262_1$, $262_2$ by the verification scanner 272 from a content distributed to the network external to the closed network 200.

The hidden data management unit 276 is configured to manage the user identifier database 274 and transmit the list 277 to one or more of the content databases 232 of the closed network 200. As described above with reference to FIGS. 10A and 10B, the content database 232 stores the list 277 of user identifiers in the memory 231b. The content database 232 may transmit the list 277 to the authentication server 250 via one of the plurality of authentication centers 242, and the authentication server 250 may remove any user identifiers 402 from its memory unit 251 so as to prevent such users from being authenticated in the closed network 200, and thereby prevent such users from being able to obtain content from the closed network 200. If the list 277 is to contain any other information detected in a hidden data packet 262 by the verification scanner 272, such as the DCEC IDs 432 of dedicated devices 400, for example, the content database 232 may also transmit such information to the authentication server 250 to enable the authentication server 250 to remove the information contained in the list 277 from its memory unit 251 so that the information contained in the list 277 is not authenticated by the authentication server 250.

Accordingly, when the verification scanner 272 detects any information related to a user or a dedicated device 400, such as the user IDs 402 and the DCEC IDs 432, in a hidden data packet 272 inserted into a content distributed to the network external to the closed network 200, and the content database 232 receives the list 277 containing such information and transmits the list 277 to the authentication server 250, the authentication server 250 may prevent such users or dedicated devices 400 from obtaining content available in the closed network 200. In other words, an infringing user can be blacklisted permanently or for a predetermined period of time from obtaining streamed content from the closed network 200. Other punitive measures can be taken against infringing users, such as preventing all dedicated devices 400 operated by the infringing user from obtaining streamed content from the closed network 200, and notifying the plurality of closed networks $200_1 \ldots 200_n$ independent from the closed network 200 of the infringing users, for example. Furthermore, the list 277 of user identifiers may be transmitted to the content owners of the contents that were impermissibly distributed outside the closed network 200, and to the appropriate governmental agency responsible for prosecuting violations of copyrighted content.

As described above, the content database 232 receives the DCEC ID 432 and the user ID 402 of a dedicated device 400 when the user of the dedicated device 400 first accesses the closed network 200 and subsequently transmits a content request CR for content available in the closed network 200. Since the content database 232 stores the list 277 of user identifiers and other information detected in a hidden data packet 262 by the verification scanner 272, the content database 232 can similarly prevent infringing users from obtaining content from the closed network 200, by not distributing requested streamed content to users having a user ID 402 contained in the list 277 or to a dedicated device whose DCEC ID 432 is contained in the list 277.

The verification scanner 272 may be run on demand to scan any content uploaded to or transmitted in any private or public network external to the closed network 200, in order to determine whether a streamed content distributed from the closed network 200 has been distributed in the external network. For example, the verification scanner 272 may be employed on demand by an owner of a public network or Internet website that permits contents to be reproduced over the Internet or downloaded to a user's computing device, in order to determine whether a streamed content distributed from the closed network 200 has been uploaded to the public network or Internet website.

As shown in FIGS. 37 and 20, the system 10 may also include a plurality of detection filters $278_1$, $278_2 \ldots 278_n$ for filtering content distributed through the public network 300 to detect whether at least one of the hidden data packets $262_1$, $262_2$ inserted by the hidden data insertion unit 260 is contained in any content distributed through the public network 300. As described above, the public network 300 may be the Internet, for example. The detection filters $278_1$, $278_2 \ldots 278_n$ detect and record any of the above-described information included in a hidden data packet 262, such as a user ID 402 and DCEC ID 432, for example, inserted into a content distributed through the public network 300, and transmit the detected hidden data packet 262 as well as the information included therein to the hidden data management unit 276.

The hidden data management unit 276 manages the user identifier database 274 to include any user ID 402 and DCEC ID 432 detected in a hidden data packet 262 by one or more of the plurality of detection filters $278_1$, $278_2 \ldots 278_n$ in the list 277 of user identifiers to identify a user of a dedicated device 400 that has distributed content received from the closed network 200 through the public network 300 as well as the dedicated device 400 from which content received from the closed network 200 has been extracted and distributed to the public network 300. As described above, the hidden data management unit 276 transmits the list 277 of user identifiers to the content database 232 so that users and/or dedicated devices identified in the list 277 will be prevented from receiving streamed content from the closed network 200, as well as other appropriate punitive measures.

The hidden data management unit 272 may transmit a hidden data detection notification HDDN to the hidden data insertion unit 260 in the closed network 200 identifying a hidden data packet 262 detected by the verification scanner 272 and/or one or more of the plurality of detection filters $278_1$, $278_2 \ldots 278_n$. The hidden data insertion unit 260, upon receiving the hidden data notification HDDN from the hidden data management unit 276, identifies an algorithm used to create the hidden data packet 272 detected by the verification scanner and/or one or more of the plurality of detection filters $278_1, 278_2 \ldots 278_n$, and ceases using the identified algorithm to create hidden data packets 262 to be inserted into the streamed content stored in the content database 232. Accordingly, whenever a hidden data packet 262 is detected in a content distributed in the network external to the closed network 200 and/or the public network 300 by the verification scanner 272 or one or more of the plurality of detection filters $278_1, 278_2 \ldots 278_n$ and the hidden data insertion unit 260 receives the hidden data detection notification HDDN identifying the detected hidden data packet 262, the hidden data insertion unit 260 identifies the algorithm used to create the detected hidden data packet 262 and removes the identified algorithm among the plurality of algorithms stored in the hidden data insertion unit 260 so that the identified algorithm is not used again to create a hidden data packet 262.

As described above, the hidden data packet 262 inserted into a streamed content distributed from the closed network 200 may contain a time stamp 264 identifying a date and time that the hidden data packet 262 was inserted into the streamed content. When the hidden data insertion unit 260 receives the hidden data detection notification HDDN identifying a hidden data packet 262 that includes the time stamp 264, the NCEC 220 or the authentication server 250 may also identify the encryption algorithm used to encrypt the impermissibly distributed streamed content based on the time stamp 264. The at least two packets of hidden data $262_1, 262_2$ are inserted into the streamed content that is to be distributed to the dedicated device 400 just prior to when the NCEC 220 encrypts the streamed content. Therefore, the time stamp 264 in either of the at least two packets of hidden data $262_1, 262_2$ can also be used to identify the date and time that the NCEC 220 encrypted the streamed content before the content database 232 distributed the once- or twice-encrypted streamed content to the dedicated device 400.

Figure 17:
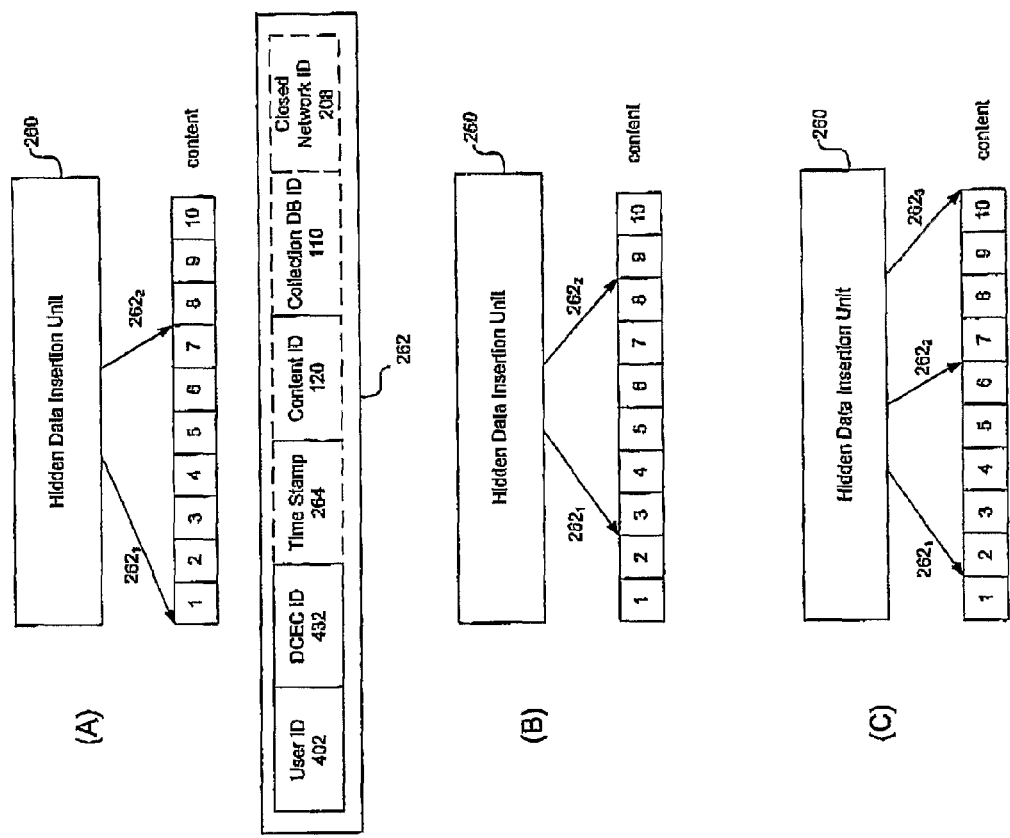
FIG. 17 is a conceptual diagram of a hidden data insertion unit.

As shown in FIG. 17, the NCEC 220 may be configured to store a record of each encryption algorithm or combination of encryption algorithms used to encrypt a streamed content in association with the content ID 120 of the content as well as the date and time at which the streamed content was encrypted in its memory unit 227. Therefore, when the hidden data insertion unit 260 receives a hidden data detection notification HDDN identifying a hidden data packet 262 including a time stamp 264, the NCEC 220 can retrieve the encryption algorithm or combination of encryption algorithms used to encrypt the impermissibly distributed streamed content from the memory unit 227 based on the content ID 120 of the streamed content and the time stamp 264 included in the detected hidden data packet 264 of the streamed content. As described above, the content ID 120 of the impermissibly distributed streamed content may also be contained in one or more of the at least two packets of hidden data $262_1, 262_2$ inserted into the streamed content.

When the NCEC 220 retrieves an encryption algorithm or combination of encryption algorithms used to encrypt the impermissibly distributed streamed content, the NCEC 220 notifies the authentication server 250 of the encryption algorithm(s) used to encrypt the streamed content that was distributed outside the dedicated device 400. The streamed content may have been extracted from the dedicated device 400 by an infringing user that has deciphered the encryption algorithm(s) used to encrypt the streamed content. As described above, the authentication server 250 manages and controls all encryption algorithms used in the closed network 200. Therefore, in response to receiving the notification of the encryption algorithm(s) from the NCEC 220, the authentication server 250 may issue, in real time, a command to the content databases 232 and the authentication centers 242 to cease using and/or delete the encryption algorithm(s) notified to the authentication server 250 by the NCEC 220. The encryption algorithm(s) retrieved by the NCEC 220 from the memory unit 227 based on the time stamp 264 included in the detected hidden data packet 262 may be deleted from the appropriate components of the closed network 200 and not used again to encrypt streamed content to be distributed to a dedicated device 400, under the assumption that the encryption algorithm(s) were deciphered by an infringing user. As a result, the infringing user will no longer be able to extract content from a dedicated device 400 by using the potentially deciphered encryption algorithm(s).

As shown in FIG. 19, the hidden data insertion unit 260 inserts at least two respectively distinct packets of hidden data $262_1, 262_2$ into one streamed content at randomly chosen locations in the streamed content and at randomly chosen intervals of the streamed content. Therefore, deciphering one hidden data packet 262 among the at least two packets of hidden data $262_1, 262_2$ is effective for only one segment of the streamed content.

While the above-described exemplary embodiment provides that at least two respectively distinct packets of hidden data $262_1, 262_2$ are inserted into one streamed content to be distributed to a dedicated device 400, it is envisioned to insert only one packet of hidden data 262 due to the remarkably secure combination of closed communications between the different network layers of the closed network 200 and the dedicated device 400, the random selection of encryption algorithms by the NCEC 220, the combination of a plurality of different encryption algorithms by the NCEC 220, and the decryption and content stream processing functions of the NCEC 430 of the above-described exemplary embodiments, for example. Therefore, the hidden data insertion unit 260 may be configured to insert one packet of hidden data 262 using a randomly chosen algorithm among the plurality of algorithms stored in the hidden data insertion unit 260, and insert the randomly chosen packet of hidden data 262 into the streamed content to be distributed to the dedicated device 400 at a randomly chosen location in the body of the streamed content.

Temporary Accumulation of Content in Dedicated Device

In the above-described exemplary embodiments, the DCEC 430 decrypts once- or twice-encrypted streamed content received from the closed network 200 upon receipt of the streamed content, and outputs the decrypted streamed content to the processing unit 420 of the dedicated device 400 for the decrypted streamed content to be output by the output unit 440. The dedicated device 400 communicates with the closed network 200 by using communication infrastructures of the public network 300 and available communication mediums such as wired and/or wireless connections which provide access to the public network 300.

It is envisioned that the dedicated device 400 may sometimes be unable to use available communication mediums to communicate with the closed network 200. In the case of wireless communication mediums, a user of the dedicated device 400 may transport the dedicated device 400 to an environment where wireless communication mediums are inaccessible, inoperable or poor in quality. For example, the user of the dedicated device 400 may transport the dedicated device 400 to an underground subway station, building or geographic area where wireless communication capabilities are poor in quality or nonexistent. Furthermore, the user of the dedicated device 400 may transport the dedicated device 400 to an environment where wireless communications are prohibited, such as on an airplane or in a hospital emergency room, for example, or in an environment where wireless communications are rendered inoperable, such as in a building where wireless communications are blocked or jammed, for example.

Figure 24:
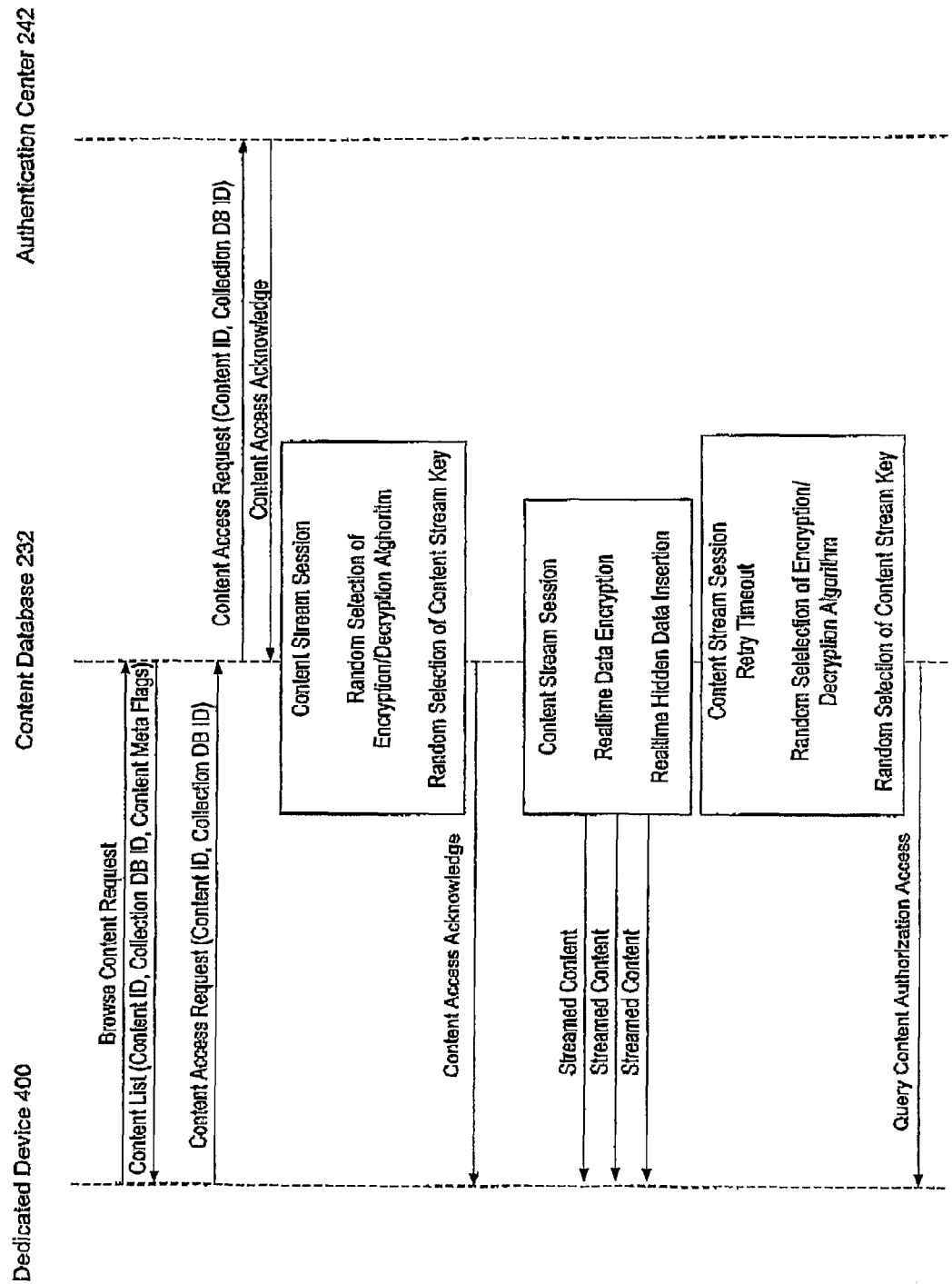
FIG. 24 is an example method of the present disclosure.

In view of the possibility that the user may not be able to connect the dedicated device 400 to an available communication medium for a predetermined period of time to communicate with the closed network 200, the DCEC 430 of the dedicated device 400 may be configured to include a temporary accumulator component 480, as shown in FIG. 24.

The temporary accumulator component 480 is provided to temporarily accumulate once- or twice-encrypted content received from the content database 232 for a predetermined period of time, and output the accumulated encrypted streamed content to the decryption unit 431 of the DCEC 430 within the predetermined period of time for the accumulated encrypted streamed content to be decrypted by the decryption unit 431.

Figure 25:
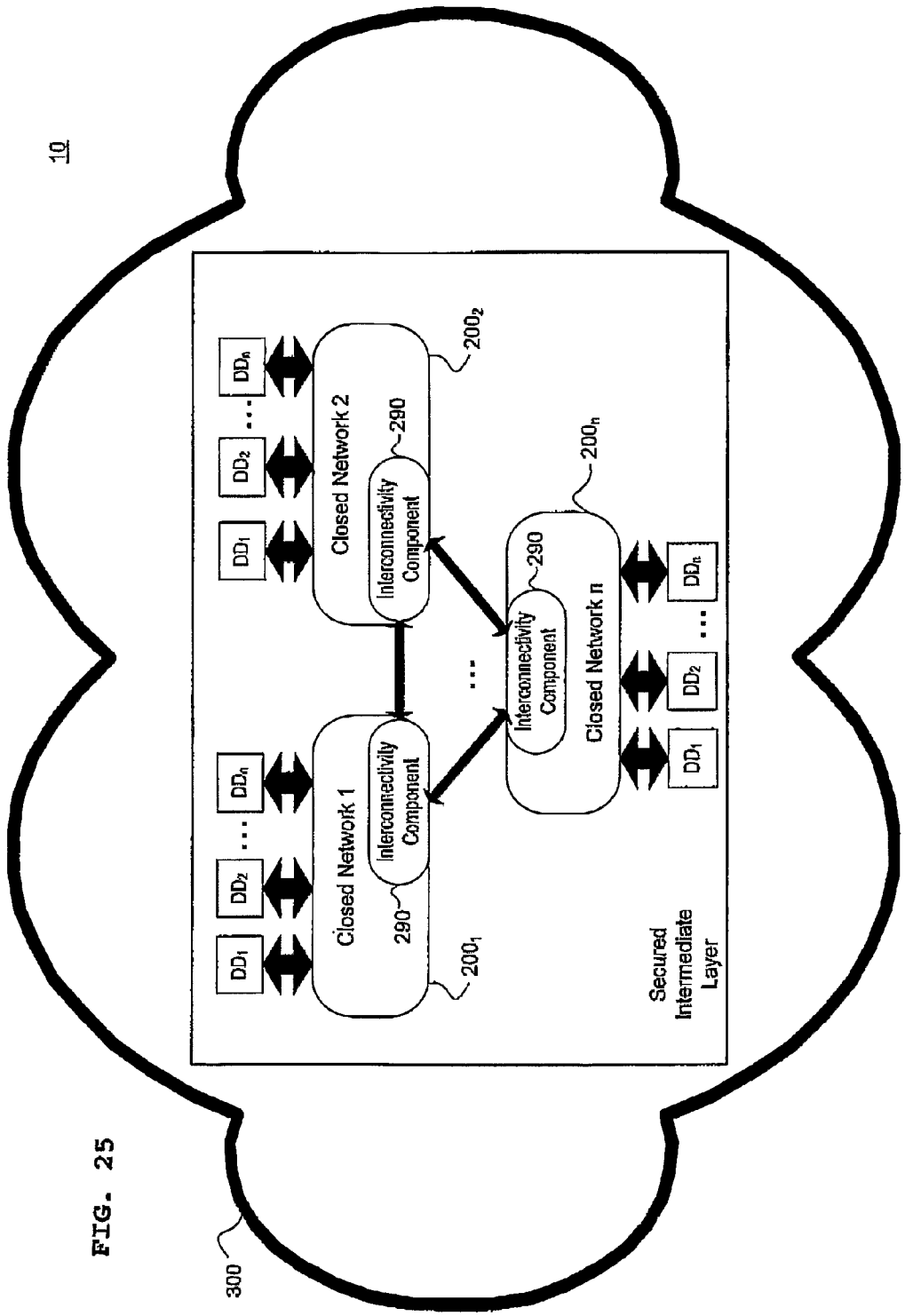
FIG. 25 is a block diagram of public network including multiple closed networks.
Figure 26:
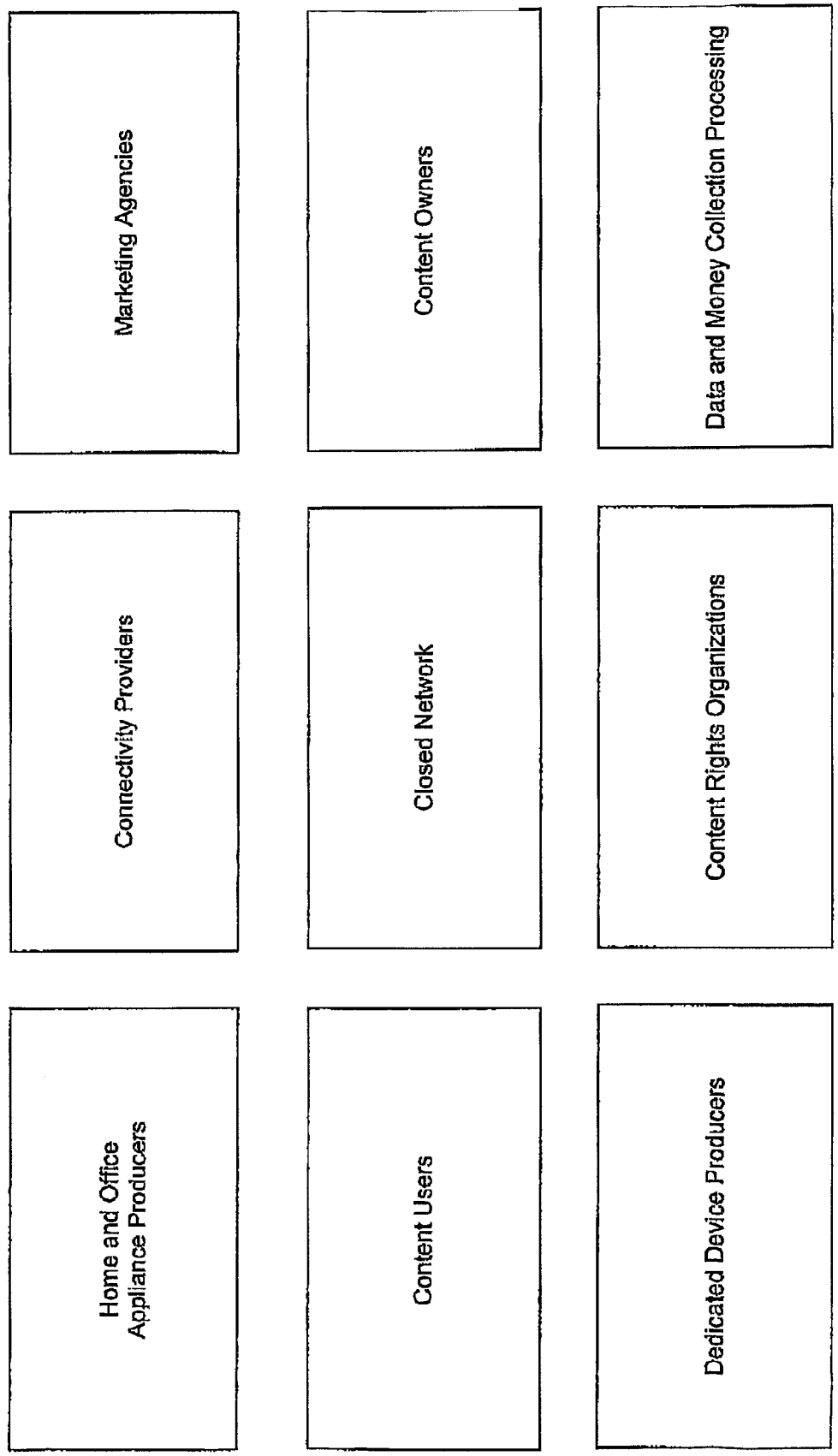
FIG. 26 is a block diagram which shows examples of potential users of the system.
Figure 27:
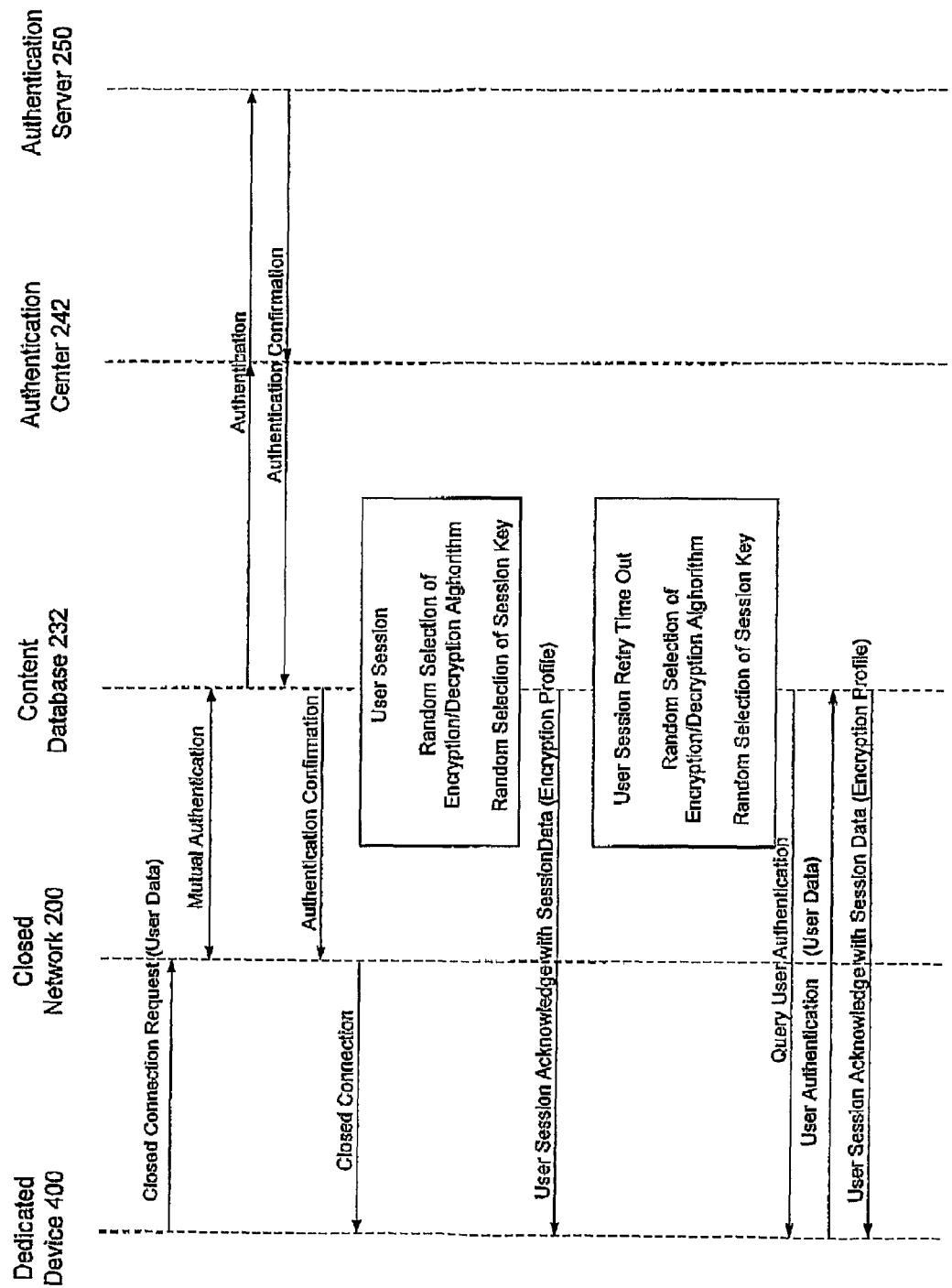
FIG. 27 is an example method of the present disclosure.
Figure 28:
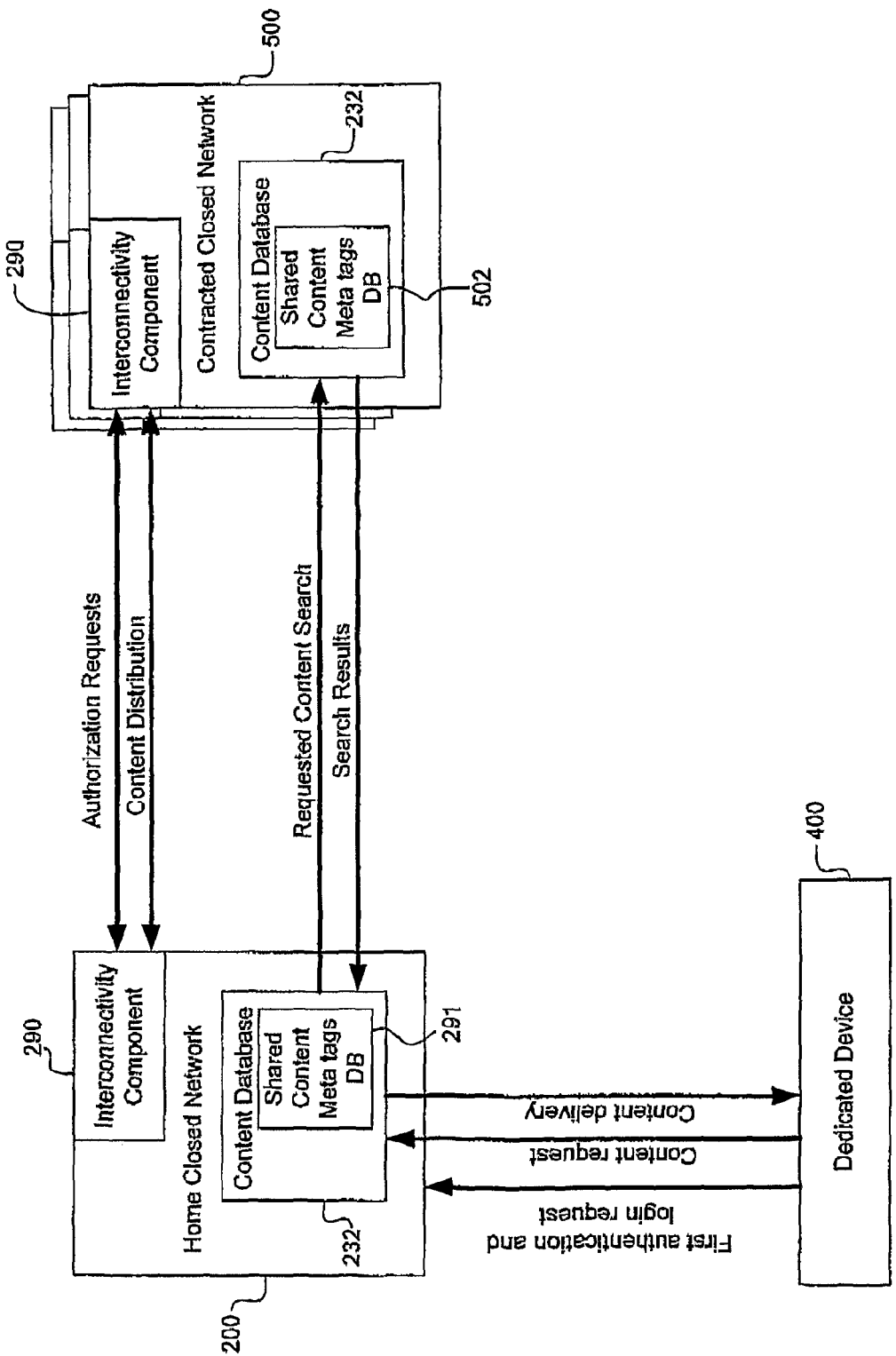
FIG. 28 is a conceptual diagram of accessing contracted closed network by home closed network and dedicated device.

FIG. 25 is a block diagram illustrating the components of the temporary accumulator component 480 comprised in the DCEC 430 and the communication functions of the components of the temporary accumulator component 480.

The temporary accumulator component 480 includes a temporary accumulator processor (TAC processor) 482, a temporary buffer unit 484, and a deletion unit 486. The temporary accumulator component 480 is configured temporarily accumulate encrypted (twice-encrypted or once-encrypted) streamed content received from a content database 232 for a predetermined period of time, and output the accumulated encrypted streamed content to the decryption unit 431 of the DCEC 430 within the predetermined period of time for the encrypted streamed content to be decrypted by the decryption unit 431.

According to an exemplary embodiment, when the user of a dedicated device 400 requests that streamed content be temporarily accumulated in the temporary accumulator component 480 for the predetermined period of time, the DCEC 430 may transmit a content request CR for the requested streamed content to the content database 232, via the first and second communication components 410, 210, together with a temporary accumulation request TAR indicating that the requested streamed content is requested to be temporarily accumulated in the temporary accumulator component 408 for the predetermined period of time.

The content database 232 may, upon receiving the content request CR and the temporary accumulation request TAR, notify the NCEC 220 of the requested streamed content identified in the content request and the predetermined period of time identified in the temporary accumulation request AR. The NCEC 220, upon being notified of the requested streamed content and the predetermined period of time for which the content is requested to be temporarily accumulated, may encrypt (once-encrypt or twice-encrypt) the requested streamed content and generate decryption session information.

The content database 232 is configured to stream the twice-encrypted streamed content together with the decryption session information generated by the NCEC 220 to the dedicated device 400. The temporary accumulator component 480 is configured to temporarily accumulate the encrypted streamed content received from the content database 232, in the temporary buffer unit 484, in accordance with the decryption session information, and output the encrypted streamed content to the decryption unit 431 to be decrypted by the decryption unit 431.

In addition to containing all the necessary data, such as decryption keys, to process the streamed data in the dedicated device 400, the decryption session information can also impose restrictions on the use of the streamed content by the dedicated device 400. In particular, the decryption session information may impose a time limit during which the content streamed from the content database 232 must be decrypted by the decryption unit 431 of the dedicated device 400. If the streamed content is not decrypted within this period of time, the TAC processor 482 outputs a deletion instruction DEL to the deletion unit 486, which causes the encrypted streamed content to be deleted. For example, the decryption session information can include a time stamp indicating the time that the content was transmitted to the dedicated device 400 and another time stamp indicating the predetermined time in which the encrypted content must be decrypted.

According to another exemplary embodiment, the temporarily accumulated content can reside in the temporary buffer unit 484 until the user releases it. In this case, the decryption session information would not impose a time limit in which the temporarily accumulated content must be decrypted. The capacity of the temporary buffer unit 484 can be limited so as to place limitations on the amount of streamed data that the user can acquire and store.

As described above, the DCEC 430 controls the dedicated device 400 so as not to permanently store streamed content when it is decrypted. Therefore, regardless of whether temporal limitations are placed on the use of the temporarily accumulated content, the encrypted streamed content is unusable unless it is decrypted by the DCEC 430, and only the DCEC 430 can decrypt the streamed data because the streamed content was encrypted so as to only be decrypted by the DCEC 430.

The decryption session information received from the content database 232 also causes the TAC processor 482 to perform certain processing in controlling the temporary buffer unit 484. The TAC processor 482 outputs a temporary accumulation instruction TAI to the temporary buffer unit 484, together with the encrypted streamed content EC. The temporary buffer unit 484 stores the encrypted content in accordance with the temporary accumulation instruction TAI. When instructed by the user of the dedicated device 400 to decrypt and output the accumulated content, the TAC processor 482 outputs a retrieval instruction RI. In response to the retrieval instruction RI, the temporary buffer unit 484 outputs the requested accumulated content ACC to the TAC processor 482, which in turn transmits the encrypted content to the to the decryption unit 431 together with the decryption session information.

While the temporary accumulator component 480 permits a user of a dedicated device 400 to temporarily accumulate content, the streamed content received from the content database 232 is temporarily accumulated in the temporary buffer unit 484 as encrypted data. As described above, when streamed content is to be received from the closed network 200, the NCEC 230 encrypts the content so that the content is unusable unless decrypted by the DCEC 430 of the particular dedicated device 400 that requested the streamed content. Therefore, any temporarily accumulated content obtained directly from the temporary buffer unit 484 by an infringing user is unusable to the infringing user, since the accumulated content was not decrypted by the decryption unit 431.

Method for Compiling Content Usage Data in Closed Network

An exemplary embodiment provides a computer-implemented method for compiling content usage data in the closed network 200. The method may be performed in the components of the exemplary system 10 as described above. The method securely communicates content usage data in the closed network 200. The exemplary method includes storing content in a secured, closed network 200 configured to distribute content to a device 400 dedicated for communication with the closed network 200, distributing content stored in the closed network to a dedicated device 400 of a user through a closed communication established between the dedicated device and the closed network 200, recording usage and transmission data for each content transmitted to the dedicated device 400, aggregating the recorded usage and transmission data for each dedicated device 400 to which content is distributed, and transmitting the aggregated data to an information agency 140, such as through the information collection and processing unit 150.

As described above, the content database 232 in the closed network 200 compiles usage statistics and payment information for each user, so that a marketing agency, ratings agency or information compiler, for example, is able to aggregate remarkably accurate statistics for users who reproduce particular types of content that each user requests and reproduces on his or her dedicated device 400. An advantageous feature of the present disclosure is that content owners will likely be enthusiastic about permitting their content to be distributed in a secure, global environment, since their content will be protected against piracy. As a result, a significant amount of content is expected to be available to the users of the dedicated devices 400. The users of the dedicated devices 400 would then constitute a truly representative sample of the population, because the users would be attracted by the high volume of content available in the closed network 200. As a result, the information content database 140 can obtain accurate content distribution statistics for which users are reproducing its advertisements, infomercials and other presentations.

As described above, the information content database 140 may be a database of a ratings organization or other information collection organization. Since usage statistics and payment information are recorded for each content distributed to each user of a dedicated device 400, the usage statistics and payment information are remarkably accurate with respect to each user and each user profile. As a result, remarkably accurate content usage and payment information can be aggregated and provided to ratings organization which are interested in the usage patterns of particular content. The information content database 140 may also be used by news services to determine the frequency of reproduction of particular news content by users of the dedicated devices 40. Usage statistics and payment information for each content streamed to a dedicated device can be compiled in the closed network 200 and provided to the information database 140.

Plurality of Closed Networks

Figure 29:
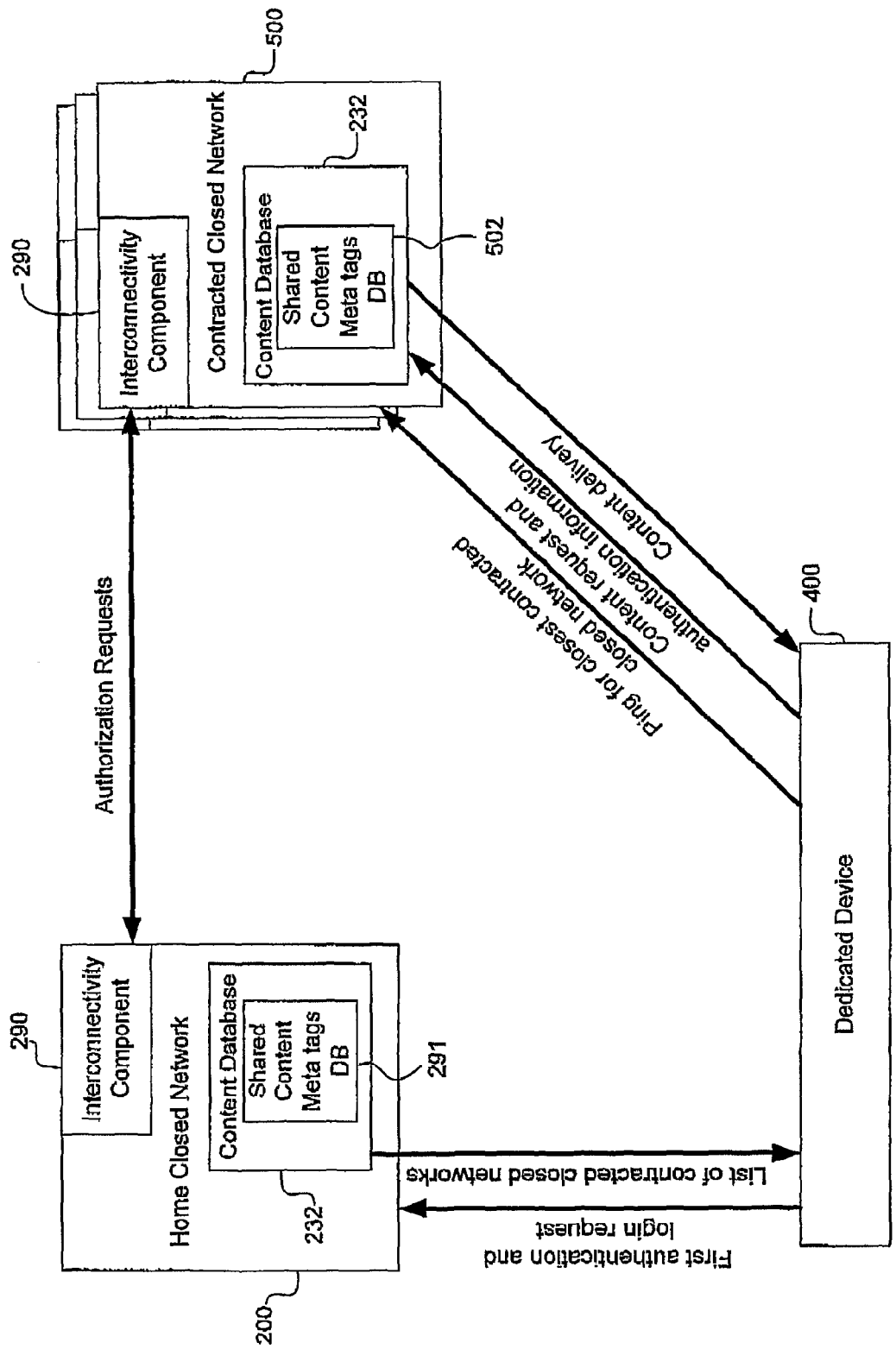
FIG. 29 is a conceptual diagram showing content delivery from contracted closed network.
Figure 30:
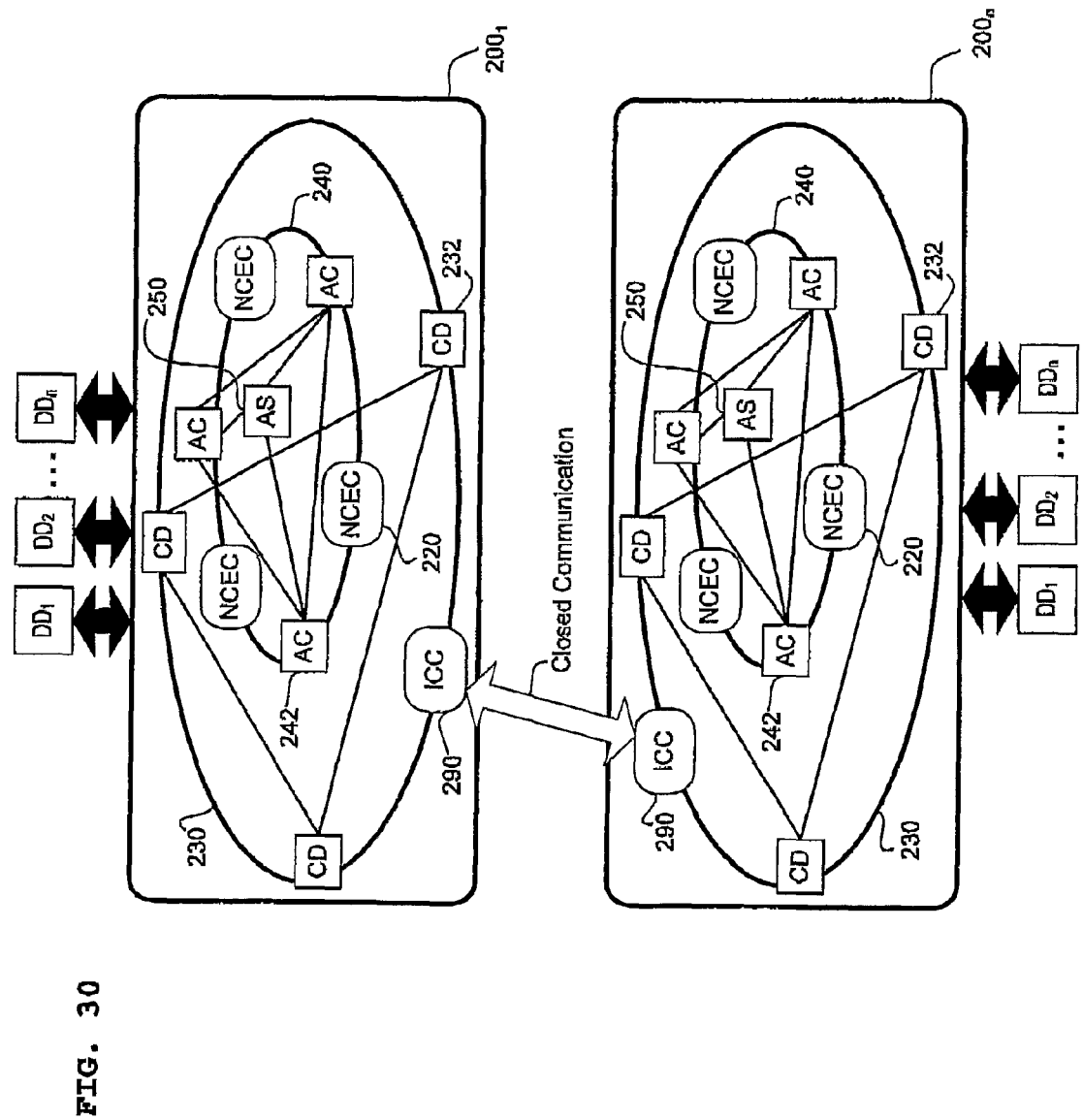
FIG. 30 is a block diagram which shows sharing of data between interconnectivity computers of two closed networks.
Figure 31:
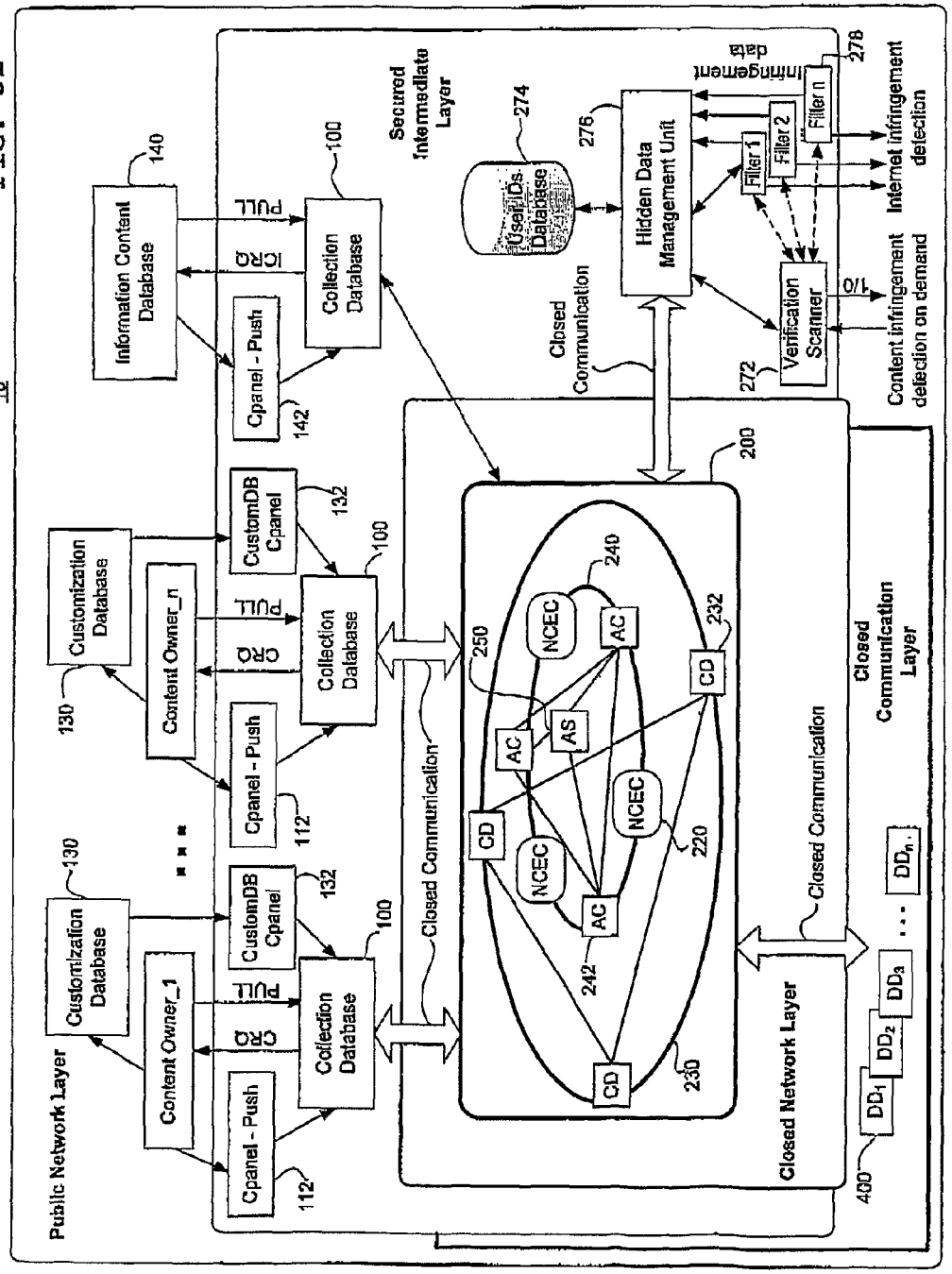
FIG. 31 is a block diagram of an example system for securely connecting content as streaming data.

According to an exemplary embodiment, the system 10 may include a plurality of closed networks which are independent from each other. FIG. 29 is an explanatory diagram illustrating a plurality of independent closed networks $200_1$, $200_2 \ldots 200_n$. Each of the plurality of closed networks $200_1$, $200_2 \ldots 200_n$ includes an interconnectivity component 290 comprised in the respective closed network 200. This exemplary embodiment provides secure distribution of content between interconnected closed networks 200 and dedicated devices 400 of each one of the interconnected closed networks 200. In the example of FIG. 29, each of the closed networks 200 is illustrated as having dedicated devices (DD) respectively associated therewith. The present embodiment provides a mechanism for the dedicated devices 400 to obtain on-demand streamed content from any of the closed networks 200 from which the dedicated devices 400 can be authenticated.

Figure 32:
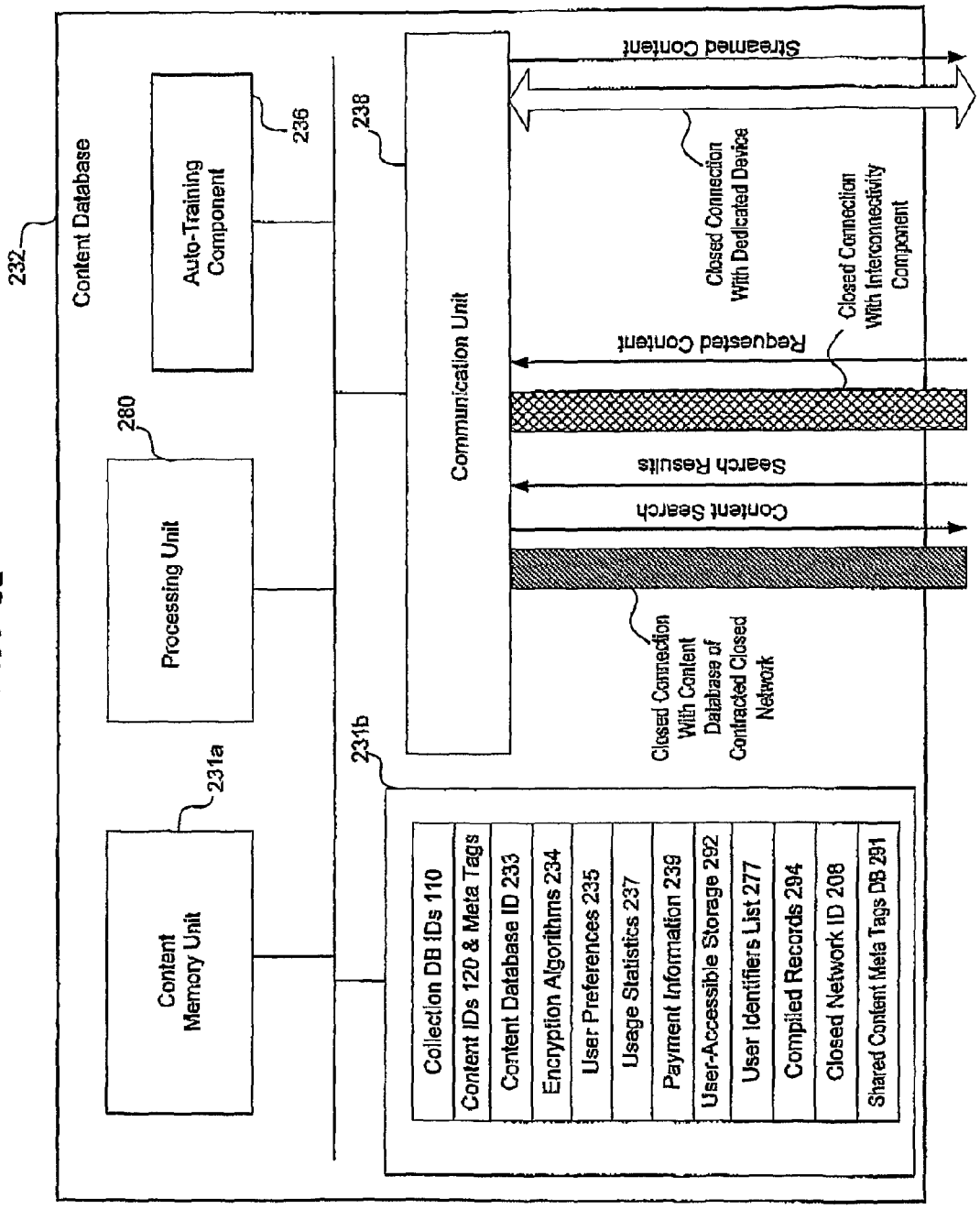
FIG. 32 is a block diagram of an example content database.

FIG. 32 illustrates one exemplary configuration of this embodiment, in which two or more independent closed networks 200 are linked to provide content from a dedicated device's "home" closed network 200 or a contracted closed network 500. For example, a user's home closed network 200 may be a closed network with which the user enters into a contractual agreement, and the user's home closed network 200 may have a contractual agreement with another closed network 500. In the exemplary configuration illustrated in FIG. 32, the user's home closed network 200 obtains requested content from the contracted closed network 500, and distributes the obtained content to the dedicated device 400 of the user. The user is first authenticated by his or her home closed network 200, and upon being authenticated, the user can transmit a content request CR via his or her dedicated device 400. The content request CR is transmitted to the content database(s) 232 of the home closed network 200.

Similar to the above-described embodiments, the content stored in the content database 232 is indexed to be searchable by the user (e.g., by meta tags). The home closed network 200 includes a content meta tags database 291 that is shared with a content meta tags database 502 of the contracted closed network 502. In the event that the user's home closed network 200 does not have a content requested by the user, the content database 232 can, via a closed communication established between the closed networks 200, 500, search for the content requested by the user, in the content database 232 of the contracted closed network 500. The content database 232 of the contracted closed network 500 may then transmit search results to the content database 232 of the home closed network 200. If the content requested by the user can be obtained from the contracted closed network 500, the home closed network 200 transmits an authorization request to the contracted closed network 500 for distribution of the requested content. If the home and contracted closed networks 200, 500 have a contractual arrangement for distribution of the content requested by the user of the home closed network 200, the home closed network 200 can obtain the requested content and stream it to the dedicated device 400 of the user.

Figure 33:
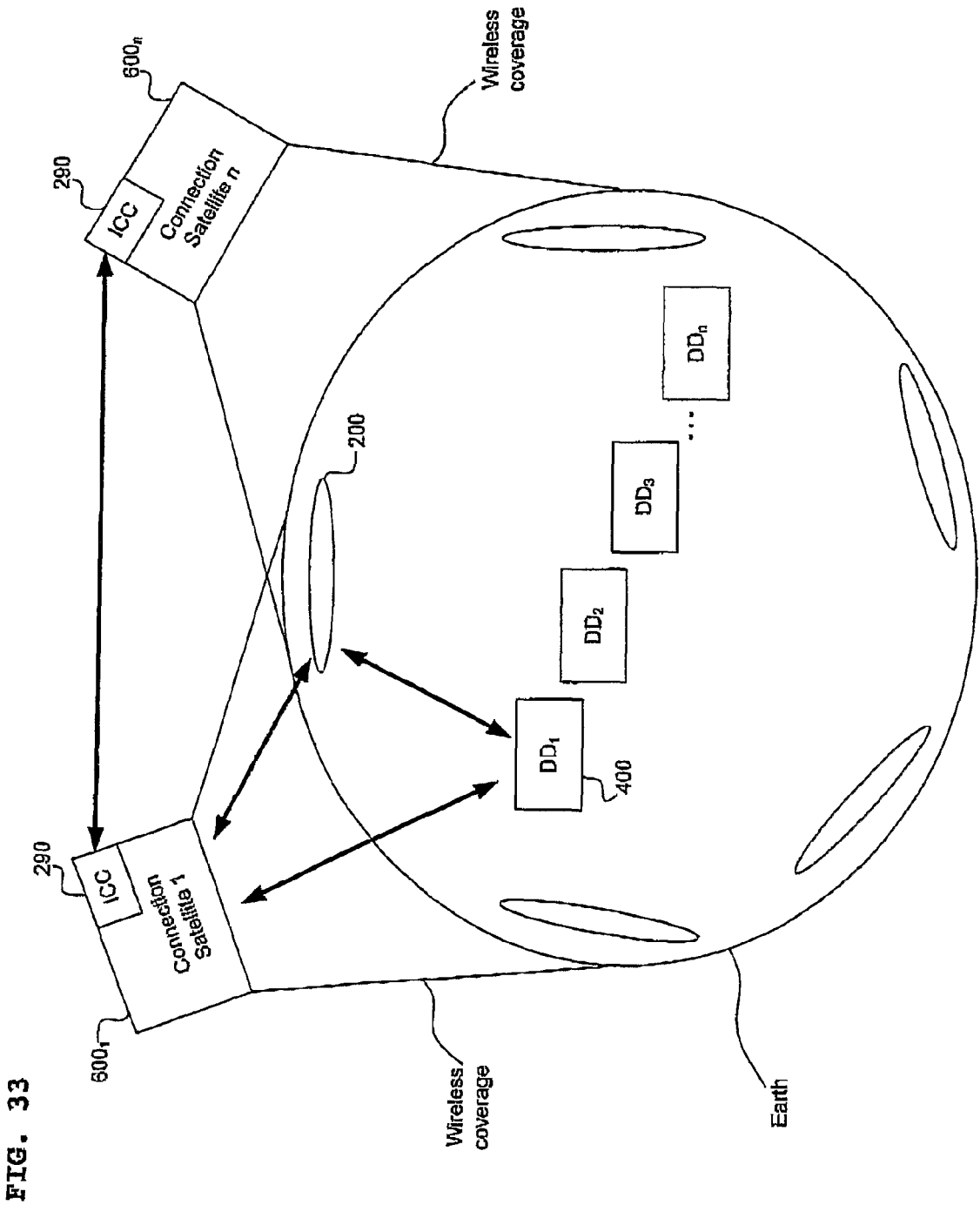
FIG. 33 is a bock diagram showing two connection satellites, a closed network, and a plurality of dedicated devices.

FIG. 33 illustrates an exemplary embodiment in which a user's home closed network 200 first authenticates the dedicated device 400, and then provides a list of contracted closed networks to the authenticated dedicated device 400. In the embodiment illustrated in FIG. 32, the home closed network obtains the content requested by the user from the contracted closed network 500. However, in the embodiment illustrated in FIG. 33, the user, once his or her dedicated device 400 is authenticated by the home closed network 200, then obtains the content directly from a contracted closed network 200 upon being authenticated by the contracted closed network 200. In this embodiment, the user of the dedicated device 400 can search for the closest contracted closed network based on pinging results, for example. The user must be authenticated by the contracted closed network 500 in order to be able to obtain the requested content from that closed network 500. The home closed network 200 and the contracted closed networks 500 can share list of authorized users and dedicated devices 400 respectively associated with each closed network, or the home closed network can provide authentication information to a contracted closed network 500 when providing the list of contracted closed networks to the user of the dedicated device 400.

As illustrated in FIG. 19, when multiple closed networks communicate with each other, they do so through a secure, closed communication. FIG. 33 illustrates an exemplary configuration in which the interconnectivity components 290 of interconnected and contracted closed networks operate via wireless communications, such as satellite communications, for example.

The above-described embodiments including plural closed networks include the principles and features described above with respect to the other exemplary embodiments disclosed herein.

The foregoing embodiments can additionally include the following features.

The dedicated device 400 device can be manufactured with the DCEC 430. Alternatively, the DCEC 430 can be added to any existing consumer or professional appliance, such as with a smart card, SD memory card or other memory device inserted into existing appliances. Therefore, any existing home appliance with memory slot can be accommodated with a DCEC memory card. The DCEC memory card can override controls of existing home appliance to prevent streamed content distributed from closed network 200 from being permanently stored in the appliance.

The closed network 200 provides a direct link between content owner and user of a dedicated device 400. The user of a dedicated device 400 is able to reproduce content without having to purchase rights to the content, unlike in conventional content distribution systems.

The dedicated devices 400 do not get viruses and there is no need to perform maintenance of dedicated device 400. A dedicated device acquires only requested (demanded) streamed content through the closed network 200.

Any change which happens or which is necessary in closed network 200 is immediately implemented in closed network 200. Closed network 200 is decentralized but it is updated according to commands issued by authentication server 250.

The processing unit 420 of dedicated device may be comprised in DCEC 430.

It is possible to have a plurality of mirrored authentication servers 250. The plurality of mirrored authentication servers 250 may be respectively provided for each one of the plurality of authentication centers 242 to enable each one of the authentication centers 242 to communicate with a corresponding one of the plurality of authentication servers 250. Alternatively, the plurality of authentication centers 242 may communicate with any one of the plurality of authentication servers 250. Since the plurality of authentication servers 250 are mirrored and possess the same content as each other, the plurality of authentication centers 242 will be able to seamlessly communicate with any one of the plurality of authentication servers 250.

When there are two or more closed networks 200, the communication component 410 of the dedicated device 400 can have a communication speed component which, upon detecting an insufficient connection speed with one closed network 200 (content database 232), can automatically connect with another closed network 200 (content database 232).

The dedicated device 400 is equipped to be able to identify geographic locations, and the geographic location of a user of a dedicated device 400 can be determined, based on internet address and pinging, for example. GPS chips may be used. Accordingly, closed network 200 can find out where user is from host closed network 200

When there are two or more closed networks 200, DCEC 430 has a communication speed detection unit 492 which, upon detecting an insufficient connection speed, automatically connects with another closed network 200. Communication speed detection unit 492 may alternatively be comprised in the communication component 410 of the dedicated device 400.

Processing unit 420 of dedicated device 400 may be comprised in DCEC 430. The dedicated device 400 can include an external device control unit 494 for controlling and monitoring residential information, and the user of the dedicated device 400 can be alerted for requested actions.

Habit information is recorded (e.g., in summertime users request ads on summer vacations (regarding information content) and times of day or year that users request regular content.

Plurality of closed networks 200 may share list 277 of user identifiers (infringing users) with other closed networks 200 so as to prevent the infringing users from obtaining content from each contracted closed network 200.

Any number of communication mediums may be used to distribute content between the various components of the exemplary system 10, such as wireless, wired or satellite communications.

While the exemplary embodiments have been particularly described with reference to the various drawings, it is to be understood that the drawings and the exemplary embodiments are provided for illustration only and should not be construed as limiting the scope of the present disclosure. Combinations of the above-described exemplary embodiments, and other embodiments not specifically described herein will be apparent to those skilled in the art upon reviewing the above description. The scope of the exemplary embodiments of the invention includes various other applications in which the above structures and methods are used.

It will be appreciated by those skilled in the art that the exemplary embodiments can be embodied in other specific forms without departing from the spirit or essential characteristics thereof. The presently disclosed embodiments are therefore considered in all respects to be illustrative and not restrictive. The scope of the present disclosure is indicated by the appended claims rather than the foregoing description, and all changes that come within the meaning and range of equivalents thereof are intended to be embraced therein.

What is claimed is:

1. A system for securely communicating content as streaming data, said system comprising:
 a collection database for collecting content, said collection database having a unique collection database identifier, and each content collected in said collection database having a respectively unique content identifier;
 a closed network created on a public network, said closed network for twice-encrypting streamed content to be streamed to an authenticated device, and transmitting the twice-encrypted streamed content to the authenticated device during a closed network communication session established between said closed network and the authenticated device and through a closed connection established between said closed network and the authenticated device; and
 a dedicated device connected to said closed network, said dedicated device having a unique user identifier assigned to a user of said dedicated device, a unique content enabling component identifier, and a unique decryption key;
 wherein said dedicated device comprises:
  a first connection component for communicating with said closed network;
  a processing unit for requesting streamed content from said closed network via said first connection unit, and receiving twice-encrypted streamed content from said closed network via said first connection unit; and a first content enabling component for decrypting the twice-encrypted streamed content received by said processing unit, said first content enabling component having the unique content enabling component identifier and the unique decryption key for decrypting the twice-encrypted streamed content received from said processing unit;

wherein said closed network comprises:

a second connection component for establishing a closed connection between said first connection component of said dedicated device 400 and said closed network;

a first network including at least one content database for encrypting and storing each streamed content collected in said collection database with the collection database identifier and its respective content identifier, the streamed content encrypted by said at least one content database with the collection database identifier and its respective content identifier constituting once-encrypted streamed content, and streaming requested twice-encrypted streamed content to said dedicated device;

a second content enabling component for twice-encrypting the once-encrypted streamed content requested by said dedicated device; a second network including a plurality of mirrored authentication centers, each of said plurality of authentication centers having a respectively unique authentication center identifier; and an authentication server for storing a user identifier of each dedicated device authorized to communicate with said closed network, and performing authentication of dedicated devices authorized to communicate with said closed network;

wherein said first content enabling component is operable to initiate communication with said closed network by transmitting, via said first connection component, an authentication request AR including the content enabling component identifier of said first content enabling component to said second connection component, and said second connection component is operable to establish a closed connection between said dedicated device and said closed network upon authentication of said first content enabling component;

wherein said first content enabling component is operable to transmit, via said first connection component, the user identifier of said dedicated device to one of said plurality of authentication centers through the established closed connection;

wherein the one of said plurality of authentication centers is operable to:

authenticate said dedicated device by determining whether the user identifier received from said dedicated device matches a user identifier stored in said authentication server;

establish a closed network communication session with said dedicated device, upon authenticating said dedicated device, to enable said dedicated device to transmit, to said at least one content database through the established closed connection, a content request CR for streamed content stored in said at least one content database;

randomly select the authentication center identifier of another one of said plurality of authentication centers upon establishing the closed network communication session;

notify said first content enabling component of the authentication center identifier of the randomly chosen authentication center through the established closed connection; and notify said second content enabling component of the authentication center identifier of the randomly chosen authentication center;

wherein said at least one content database is operable to, upon receiving the content request CR, notify said second content enabling component of the requested streamed content identified in the content request CR;

wherein said second content enabling component, upon being notified of the requested streamed content, is operable to twice-encrypt the requested once-encrypted streamed content stored in said at least one content database with the authentication center identifier of the randomly chosen authentication center;

wherein said at least one content database is operable to stream the twice-encrypted streamed content to said dedicated device via said second communication component through the established closed connection; and wherein said first content enabling component is operable to decrypt the twice-encrypted streamed content by using the decryption key of said first content enabling component and the notified authentication center identifier of the randomly chosen authentication center, transmit the decrypted streamed content to said processing unit to be output by said processing unit, and control said dedicated device so as not to permanently store the streamed content.

2. The system of claim 1, wherein:

said authentication server is operable to store a content enabling component identifier of each dedicated device authorized to communicate with said closed network;

when said first content enabling component transmits the authentication request AR including the content enabling component identifier of said first content enabling component to said second connection component, said second connection component is operable to transfer the received content enabling component identifier to said authentication server through a closed connection established between said second connection component and said authentication server in said closed network;

said authentication server is operable to transmit an authentication message to said second connection component when the content enabling component identifier of said first content enabling component transmitted from said second connection component matches a content enabling component identifier stored in said authentication server; and said second connection component is operable to establish the closed connection between said dedicated device and said closed network upon receiving the authentication message from said authentication server.

3. The system of claim 1, wherein:

said at least one content database is operable to store a plurality of first encryption algorithms, and each of said plurality of authentication centers is operable to store a plurality of second encryption algorithms;

said second content enabling component, upon being notified of the requested streamed content, is operable to:

randomly select one of the plurality of first encryption algorithms stored in said at least one content database;

randomly select one of the plurality of second encryption algorithms stored in the one of said plurality of authentication centers; and combine the randomly selected one of the first and second encryption algorithms to form, during the established closed network communication session, a present encryption algorithm for twice-encrypting the once-encrypted streamed content requested by said dedicated device;

said at least one content database is operable to stream the twice-encrypted streamed content together with a present decryption algorithm corresponding to the present encryption algorithm to said processing unit through the established tunnel connection; and said first content enabling component is operable to decrypt the twice-encrypted content by using the present decryption algorithm corresponding to the formed present encryption algorithm.

4. The system of claim 1, wherein said first content enabling component, in decrypting the twice-encrypted stream content, is operable to determine whether an encryption rate of the twice-encrypted streamed content is equal to or greater than a predetermined rate, automatically spread the twice-encrypted streamed content into a predetermined number of channels to decrypt the twice-encrypted streamed content upon determining that the encryption rate is equal to or greater than the predetermined rate, and reassemble the decrypted streamed content spread into the predetermined number of channels to compose the decrypted streamed content into one channel in the order in which the twice-encrypted stream content was received by said processing unit.

5. The system of claim 1, wherein each content stored in said at least one content database is encrypted so as to be prevented from being reproduced unless decrypted by said first content enabling component of said dedicated device.

6. The system of claim 1, wherein said closed network further comprises:

a first tunnel connection established between said at least one content database in said first network and said plurality of authentication centers in said second network;

a second tunnel connection established between said plurality of authentication centers and said authentication server;

a third tunnel connection established between said second content enabling component and said at least one content database; and a fourth tunnel connection established between said second content enabling component and said plurality of authentication centers, wherein each of said first to fourth tunnel connections are secure connections inaccessible to any unauthorized access thereto.

7. The system of claim 1, further comprising a plurality of said second content enabling components respectively comprised in said plurality of authentication centers, wherein said closed network further comprises:

a first tunnel connection established between said at least one content database in said first network and said plurality of authentication centers in said second network; and a second tunnel connection established between said plurality of authentication centers and said authentication server, wherein each of said first and second tunnel connections is a secure connection inaccessible to any unauthorized access thereto.

8. The system of claim 1, wherein the one of said plurality of authentication centers is operable to assign a session identifier SID for the closed network communication session established between said dedicated device and said closed network, and said second connection component is operable to terminate the established closed connection between said dedicated device and said closed network when said dedicated device does not transmit any information or request for streamed content within a predetermined period of time identified in the session identifier SID.

9. The system of claim 1, wherein:

upon authenticating said dedicated device, the one of said plurality of authentication centers is operable to assign a session identifier SID for the closed network communication session established between said dedicated device and said closed network;

said at least one content database is operable to compile a record of each streamed content requested and received by said dedicated device and a length of the streamed content that the user viewed and/or listened to, and associate the compiled record with the user identifier assigned to the user of said device with reference to the assigned session identifier SID when the user completes viewing of and/or listening to the steamed content; and said second connection component is operable to terminate the established closed connection between said device and said closed network when one of (i) said dedicated device, does not transmit any information or request for streamed content data within a predetermined period of time identified in the session identifier SID, and (iii) after receiving the streamed content, the completion of viewing of or listening to the decrypted stream content is not added to the compiled record stored in said at least one content database within the predetermined period of time identified in the session identifier SID.

10. The system of claim 1, wherein, upon authenticating said dedicated device, the one of said plurality of authentication centers is operable to;

notify said first content enabling component of the authentication center identifier of the one of said plurality of authentication centers through the established closed connection; and notify said second content enabling component of the content enabling component identifier of said first content enabling component identifier, the user identifier of said dedicated device, and the authentication center identifier of the one of said plurality of authentication centers.

11. The system of claim 1, wherein said content enabling component, upon being notified of the requested streamed content, is operable to twice-encrypt the requested once-encrypted streamed content stored in said at least one content database with the content enabling component identifier of said first content enabling component, the user identifier of said dedicated device, the authentication center identifier of the one of said plurality of authentication centers, and the authentication center identifier of the randomly chosen authentication center.

12. The system of claim 1, wherein said at least one content database is operable to stream the twice-encrypted streamed content to said dedicated device via said second communication component through the established closed communication and during the closed network communication session established between said closed network and said dedicated device.

13. The system of claim 1, wherein;

the one of said plurality of authentication centers is operable to communicate with said at least one content database through a closed communication established between the one of said plurality of authentication centers and said at least one content database, and notify said at least one content database of the authentication center identifier of the randomly chosen authentication center; and said at least one content database is operable to notify said first content enabling component of the authentication center identifier of the randomly chosen authentication center when streaming the twice-encrypted streamed content to said dedicated device through the established closed connection and during the closed network communication session established between said closed network and said dedicated device.

14. The system of claim 1, wherein:

the one of said plurality of authentication centers is operable to notify said second content enabling component of the authentication center identifier of the one of said plurality of authentication centers;

said first content enabling component is operable to obtain the authentication center identifier of the one of said plurality of authentication centers when transmitting the authentication request AR to the one of said plurality of authentication centers;

said second content enabling component, upon being notified of the requested streamed content, is operable to twice-encrypt the requested once-encrypted streamed content stored in said at least one content database with the content enabling component identifier of said first content enabling component, the user identifier of said dedicated device, the authentication center identifier of the of the one of said plurality of authentication centers, and the authentication center identifier of the randomly chosen authentication center; and said first content enabling component is operable to decrypt the twice-encrypted streamed content streamed to said first content enabling component by said at least one content database, by using the decryption key of said first content enabling component, the content enabling component identifier of said first content enabling component, the user identifier of said dedicated device, the obtained authentication center identifier of the of the one of said plurality of authentication centers, and the notified authentication center identifier of the randomly chosen authentication center.

15. A system for securely communicating encrypted content as streaming data to an authenticated device, said system comprising:

a closed network created on a public network, said closed network for encrypting streamed content according to an encryption algorithm formed from combining two randomly chosen encryption algorithms, and transmitting the encrypted streamed content to an authenticated device during a closed network communication session established between said closed network and the authenticated device and through a closed connection established between said closed network and the authenticated device; and a dedicated device connected to said closed network, said dedicated device having a unique user identifier assigned to a user of said dedicated device, a unique content enabling component identifier, and a unique decryption key;

wherein said dedicated device comprises:

a first connection component for communicating with said closed network;

a processing unit for requesting streamed content from said closed network, and receiving encrypted streamed content from said closed network via said first connection unit; and a first content enabling component for decrypting the encrypted streamed content received by said processing unit, said first content enabling component having the unique content enabling component identifier and the unique decryption key for decrypting the encrypted stream content received from said processing unit;

wherein said closed network comprises:

a second connection component for establishing a closed connection between said first connection component of said dedicated device and said closed network;

a second content enabling component for encrypting streamed content to be streamed to said dedicated device;

a first network including at least one content database for storing streamed content and a plurality of first encryption algorithms, and streaming encrypted streamed content to said dedicated device;

a second network including a plurality of mirrored authentication centers, each of said plurality of authentication centers storing a plurality of second encryption algorithms, and having a respectively unique authentication center identifier, and an authentication server for storing a user identifier of each dedicated device authorized to communicate with said closed network, and performing authentication of dedicated devices authorized to communicate with said closed network;

wherein said first content enabling component is operable to initiate communication with said closed network by transmitting, via said first connection component, an authentication request AR including the content enabling component identifier of said first content enabling component to said second connection component, and said second connection component is operable to establish a closed connection between said dedicated device and said closed network upon authentication of said first content enabling component;

wherein said first content enabling component is operable to transmit, via said first connection component, the user identifier of said dedicated device to one of said plurality of authentication centers through the established closed connection;

wherein the one of said plurality of authentication centers is operable, to:

authenticate said dedicated device by determining whether the user identifier received from said dedicated device matches a user identifier stored in said authentication server;

upon authenticating said dedicated device, establish a closed network communication session with said dedicated device to enable said dedicated device to transmit, to said at least one content database through the established closed connection during the established closed network communication session, a content request CR for streamed content stored in said at least one content database;

randomly select the authentication center identifier of another one of said plurality of authentication centers upon establishing the closed network communication session;

notify said first content enabling component of the authentication center identifier of the randomly chosen authentication center through the established closed connection; and notify said second content enabling component of the authentication center identifier of the randomly chosen authentication center;

wherein said at least one content database, upon receiving the content request CR, is operable to notify said second content enabling component of the content identified in the content request;

wherein said second content enabling component, upon being notified of the requested streamed content, is operable to:

randomly select one of the plurality of first encryption algorithms stored in said at least one content database, randomly select one of the plurality of second encryption algorithms stored in stored in the one of said plurality of authentication centers, combine the randomly selected one of the first and second encryption algorithms to form, during the established closed network communication session, a present encryption algorithm for encrypting the streamed content requested by said dedicated device; and encrypt, according to the formed present encryption algorithm, the streamed content identified in the content request with the content enabling component identifier of said first content enabling component, the user identifier of said dedicated device, the authentication center identifier of the one of said plurality of authentication centers, and the authentication center identifier of the randomly chosen authentication center wherein said at least one content database is operable to stream the encrypted streamed content and notify said first content enabling component of a present decryption algorithm corresponding to the present encryption algorithm through the established tunnel connection; and wherein said first content enabling component is operable to decrypt the encrypted streamed content by using the present decryption algorithm corresponding to the formed present encryption algorithm, and control said dedicated device so as not to permanently store the streamed content.

16. A system for securely communicating content as streaming data, said system comprising:

a collection database for collecting content, said collection database having a unique collection database identifier, and each content collected in said collection database having a respectively unique content identifier said collection database being operable to encrypt each content collected therein with the collection database identifier and its respective content identifier, the content encrypted by said collection database constituting once-encrypted streamed content;

a closed network created on a public network said closed network for twice-encrypting streamed content to be streamed to an authenticated device, and transmitting the twice-encrypted streamed content to the authenticated device during a closed network communication session established between said closed network and the authenticated device and through a closed connection established between said closed network and the authenticated device; and a dedicated device connected to said closed network said dedicated device having a unique user identifier assigned to a user of said dedicated device, a unique content enabling component identifier, and a unique decryption key;

wherein said dedicated device comprises:

a first connection component for communicating with said closed network;

a processing unit for requesting streamed content from said closed network via said first connection unit and receiving twice-encrypted streamed content from said closed network via said first connection unit; and a first content enabling component for decrypting the twice-encrypted streamed content received by said processing unit said first content enabling component having the unique content enabling component identifier and the unique decryption key for decrypting the twice-encrypted streamed content received from said processing unit;

wherein said closed network comprises:

a second connection component for establishing a closed connection between said first connection component of said dedicated device and said closed network;

a first network including at least one content database for receiving and storing each once-encrypted streamed content collected in said collection database, and streaming requested twice-encrypted streamed content to said dedicated device;

a second content enabling component for twice-encrypting the once-encrypted streamed content requested by said dedicated device;

a second network including a plurality of mirrored authentication centers, each of said plurality of authentication centers having a respectively unique authentication center identifier; and an authentication server for storing a user identifier of each dedicated device authorized to communicate with said closed network, and performing authentication of dedicated devices authorized to communicate with said closed network;

wherein said first content enabling component is operable to initiate communication with said closed network by transmitting, via said first connection component, an authentication request AR including the content enabling component identifier of said first content enabling component to said second connection component, and said second connection component is operable to establish a closed connection between said dedicated device and said closed network upon authentication of said first content enabling component;

wherein said first content enabling component is operable to transmit, via said first connection component, the user identifier of said dedicated device to one of said plurality of authentication centers through the established closed connection;

wherein the one of said plurality of authentication centers is operable to:

authenticate said dedicated device by determining whether the user identifier received from said dedicated device matches a user identifier stored in said authentication server;

establish a closed network communication session with said dedicated device, upon authenticating said dedicated device to enable said dedicated device to transmit, to said at least one content database through the established closed connection, a content request CR for once-encrypted streamed content stored in said at least one content database;

randomly select the authentication center identifier of another one of said plurality of authentication centers upon establishing the closed network communication session;

notify said first content enabling component of the authentication center identifier of the randomly chosen authentication center through the established closed connection; and notify said second content enabling component of the authentication center identifier of the randomly chosen authentication center;

wherein said at least one content database is operable to, upon receiving the content request CR, notify said second content enabling component of the requested once-encrypted streamed content identified in the content request CR;

wherein said second content enabling component, upon being notified of the requested streamed content, is operable to twice-encrypt the requested once-encrypted streamed content stored in said at least one content database with the authentication center identifier of the randomly chosen authentication center;

wherein said at least one content database is operable to stream the twice-encrypted streamed content to said dedicated device via said second communication component through the established closed connection; and wherein said first content enabling component is operable to decrypt the twice-encrypted streamed content by using the decryption key of said first content enabling component and the notified authentication center identifier of the randomly chosen authentication center transmit the decrypted streamed content to said processing unit to be output by said processing unit, and control said dedicated device so as not to permanently store the streamed content.

17. A method for securely communicating content usage data in a closed network securely communicating content to dedicated devices, the method comprising:

storing content in a secured, closed network configured to distribute content to a first dedicated device for communication with the closed network;

authenticating the first dedicated device by determining whether a user identifier received from the dedicated device matches a user identifier stored in an authentication server in the closed network;

establishing a closed network communication session with the first dedicated device, upon authenticating the first dedicated device, enabling the first dedicated device to transmit, to a content database through the established closed connection, a content request CR for streamed content stored in the content database;

randomly selecting an authentication center identifier of another authentication server upon establishing the closed network communication session;

notifying a first content enabling component of the authentication center identifier of the randomly chosen authentication server through the established closed connection; and notifying a second content enabling component of the authentication center identifier of the randomly chosen authentication server;

distributing content stored in the closed network to a the dedicated device through the closed network communication session established between the dedicated device and the closed network;

recording usage and transmission data for each content transmitted to the dedicated device;

aggregating the recorded usage and transmission data for each dedicated device to which content is distributed; and transmitting the aggregated data to an information agency.

* * * * *